(12) United States Patent
Horiuchi

(10) Patent No.: US 9,967,876 B2
(45) Date of Patent: May 8, 2018

(54) BASE STATION DEVICE, MOBILE STATION DEVICE, AND COMMUNICATION METHOD

(71) Applicant: Panasonic Intellectual Property Corporation of America, Torrance, CA (US)

(72) Inventor: Ayako Horiuchi, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 113 days.

(21) Appl. No.: 15/003,229

(22) Filed: Jan. 21, 2016

(65) Prior Publication Data
US 2016/0143032 A1 May 19, 2016

Related U.S. Application Data

(63) Continuation of application No. PCT/JP2014/003633, filed on Jul. 9, 2014.

(30) Foreign Application Priority Data

Sep. 26, 2013 (JP) .................................. 2013-199742

(51) Int. Cl.
*H04W 72/04* (2009.01)
*H04W 72/12* (2009.01)
*H04L 1/18* (2006.01)

(52) U.S. Cl.
CPC ....... *H04W 72/0446* (2013.01); *H04L 1/1854* (2013.01); *H04W 72/042* (2013.01);
(Continued)

(58) Field of Classification Search
CPC ..... H04L 1/18; H04L 5/0078; H04W 72/0413
See application file for complete search history.

(56) References Cited

U.S. PATENT DOCUMENTS

2008/0137562 A1* 6/2008 Li .................. H04B 7/2656
370/280
2009/0296609 A1* 12/2009 Choi ................. H04W 72/121
370/281
(Continued)

OTHER PUBLICATIONS

International Search Report of PCT application No. PCT/JP2014/003633 dated Oct. 14, 2014.
(Continued)

*Primary Examiner* — Edan Orgad
*Assistant Examiner* — Emmanuel Maglo
(74) *Attorney, Agent, or Firm* — Seed IP Law Group LLP

(57) ABSTRACT

Base stations in a system where a mobile station communicates with one of multiple base stations at each subframe using one of multiple UL-DL configurations include: a signal assigner and a separator. The signal assigner assigns signals to be transmitted to the mobile station, based on assignment information, the assignment information indicating assignment of subframes included in a UL-DL configuration that is configured to the mobile station, for each of the multiple base stations. Multiple subframes included in a UL-DL configuration are assigned to each of the multiple base station devices, for each DL/Sp/UL set made up of subframes correlated by a UL grant-PUSCH timing and a DL assignment(PDSCH)-HARQ ACK timing.

12 Claims, 35 Drawing Sheets

(52) U.S. Cl.
CPC ... *H04W 72/0413* (2013.01); *H04W 72/1268* (2013.01); *H04W 72/1273* (2013.01)

(56) References Cited

U.S. PATENT DOCUMENTS

| | | | | |
|---|---|---|---|---|
| 2011/0211503 A1* | 9/2011 | Che | ...................... | H04L 5/0005 370/280 |
| 2012/0127948 A1* | 5/2012 | Chung | ................. | H04L 5/0053 370/329 |
| 2012/0230272 A1* | 9/2012 | Kim | ..................... | H04L 1/1861 370/329 |
| 2012/0300681 A1* | 11/2012 | Ji | ......................... | H04W 56/00 370/280 |
| 2013/0028149 A1* | 1/2013 | Chen | .................... | H04L 5/0005 370/280 |
| 2013/0077543 A1* | 3/2013 | Kim | ................. | H04B 7/15507 370/281 |
| 2013/0114472 A1* | 5/2013 | Tamaki | ................ | H04L 1/1854 370/280 |
| 2013/0114505 A1* | 5/2013 | Haim | ................ | H04W 52/146 370/328 |
| 2013/0148622 A1* | 6/2013 | Lee | ...................... | H04L 1/1887 370/329 |
| 2013/0188473 A1* | 7/2013 | Dinan | .............. | H04W 56/0005 370/216 |
| 2013/0188569 A1* | 7/2013 | He | ........................ | H04W 28/16 370/329 |
| 2013/0194980 A1* | 8/2013 | Yin | ....................... | H04L 1/1854 370/280 |
| 2013/0194982 A1* | 8/2013 | Fwu | ...................... | H04L 5/0035 370/280 |
| 2013/0250772 A1* | 9/2013 | Yin | ........................... | H04L 5/16 370/241 |
| 2013/0250847 A1* | 9/2013 | Lee | ...................... | H04L 5/0051 370/315 |
| 2014/0003400 A1* | 1/2014 | Lim | ..................... | H04L 1/1861 370/336 |
| 2015/0043434 A1* | 2/2015 | Yamada | ........... | H04W 72/0446 370/329 |
| 2015/0271837 A1* | 9/2015 | Larsson | ................ | H04L 1/1861 370/329 |

OTHER PUBLICATIONS

3GPP TR 36.842 V0.2.0 (May 2013) "Study on Small Cell Enhancements for E-UTRA and E-UTRAN—Higher layer aspects (Relese 12)".

3GPP TSG RAN WG2 Meeting #83 Barcelona, Spain, Aug. 19-23, 2013 R2-132860, "Challenges in the uplink to support dual connectivity" Intel Corporation.

* cited by examiner

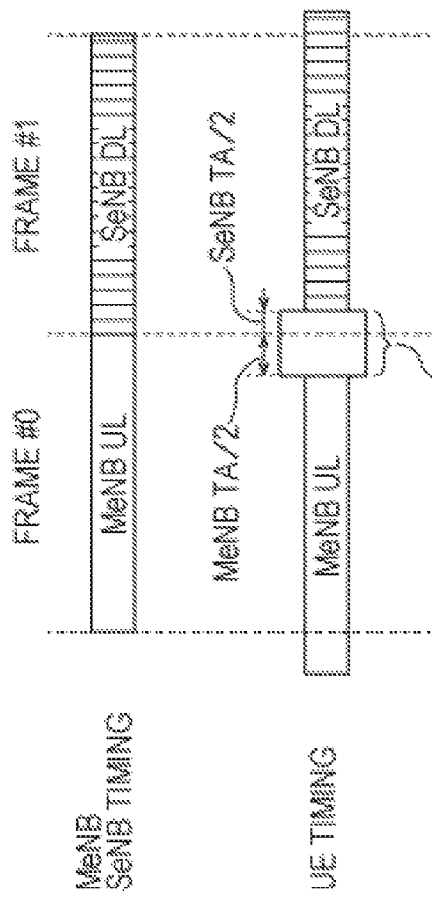

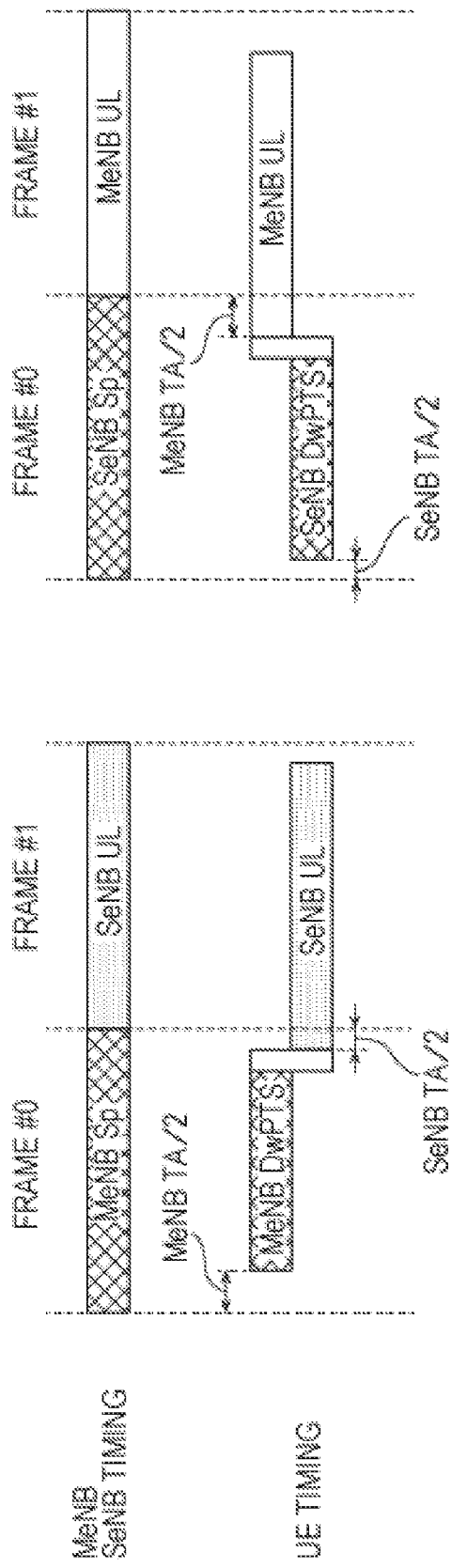

BASE STATION DEVICE, MOBILE STATION DEVICE, AND COMMUNICATION METHOD

BACKGROUND

1. Technical Field

The present disclosure relates to a base station device, a mobile station device, and a communication method.

2. Description of the Related Art

Transmitting not only audio data but large-sized data such as still image data, moving image data, and so forth, over cellular mobile communication systems, has become commonplace in recent years, as multimedia has become a more common form of information. In Long Term Evolution Advanced (LTE-Advanced), there is active study ongoing to realize high transmission rates using wireless broadband, Multiple-Input Multiple-Output (MIMO) transmission technology, and interference control technology.

There further is being undertaken study in LTE-Advanced to install small cells which are base station devices with low transmission power (also called "e Node B (eNB) cells, hereinafter referred to simply as "base station") to realize high transmission rates at hot spots. Now, a case where a small cell, and a micro cell which is a base station with high transmission power, use the same frequency band, will be referred to as a "small cell scenario 1". A case where a small cell and a micro cell use different frequency bands will be referred to as a "small cell scenario 2". A case where no micro cell exists and only a small cell exists will be referred to as a "small cell scenario 3" (e.g., see 3GPP TR 36.842 V0.2.0, "Study on Small Cell Enhancements for E-UTRA and E-UTRAN—Higher layer aspects").

An arrangement relating to small cells is being studied regarding allocating resources of multiple base stations, connected to mobile station devices (sometimes also referred to as User Equipment (UE); hereinafter referred to simply as "mobile station") via non-ideal backhaul. This is called "dual connectivity". In dual connectivity, a base station that manages mobility of a mobile station is called a "Master eNB" (eNB is an abbreviation of "evolved Node B"), which is abbreviated to "MeNB", and base stations other than the MeNB that allocate resources to mobile stations are called "Secondary eNB" (SeNB). A mobile station can use resources of both MeNB and SeNB.

The following four are conceivable as capabilities of mobile stations to which dual connectivity is applied.
a) Single Rx/Tx (which means a UE having a single Rx and a single Tx chain)
b) Single Rx/Multiple Tx
c) Multiple Rx/Single Tx
d) Multiple Rx/Tx (which means a UE having multiple Rx and multiple Tx chains)

Specifically, Multiple Rx means the mobile station being able to simultaneously receive signals from an MeNB and signals from an SeNB. On the other hand, Single Rx means that the mobile station is not able to simultaneously receive signals from an MeNB and signals from an SeNB. In other words, the mobile station has to switch between receiving signals from the MeNB and the SeNB in a case of Single Rx. Further, Multiple Tx means that the mobile station is able to simultaneously transmit signals to the MeNB and to the SeNB. On the other hand, Single Tx means that the mobile station is not able to simultaneously transmit signals to the MeNB and the SeNB. In other words, the mobile station has to switch between transmitting signals to the MeNB and the SeNB in a case of Single Tx.

The following subframes have to be decided in order for a mobile station having the above-described Single Rx/Tx capability to support dual connectivity in a time division duplex (TDD) system, namely, subframe for transmission/reception to/from the MeNB (hereinafter may be referred to as "MeNB subframe"), and subframe for transmission/reception to/from the SeNB (hereinafter may be referred to as "SeNB subframe"). A method of allocating MeNB subframes and SeNB subframes to a mobile station that communicates with a base station by switching between MeNB and SeNB has been proposed (e.g., "Challenges in the uplink to support dual connectivity," Intel Corporation, hereinafter referred to as "Intel"). Intel discloses one of multiple configuration patterns defining communication timing of uplink and downlink (UL-DL configurations) in communication frames, this one being Config#1. Intel describes that multiple UL subframes that are consecutive in a Config#1 communication frame are allocated to the same eNB, with MeNB subframes being switched to SeNB subframes and the timing of switching from UL subframes to DL subframes.

However, the arrangement described in Intel has a problem in that resource (subframe) allocation is inflexible, due to consecutive UL subframes included in a communication frame being allocated to the same eNB.

SUMMARY

One non-limiting and exemplary embodiment provides a base station device, a mobile station device, and a communication method, capable of improving flexibility in resource allocation, in a case of a mobile station device having Single Rx/Tx capability supporting dual connectivity.

In one general aspect, the techniques disclosed here feature a base station device including: an assigner that maps a signal to be transmitted to a mobile station device, in a subframe that is assigned based on assignment information, the assignment information indicating assignment of a plurality of subframes included in a configuration pattern that is configured to the mobile station device that communicates with a plurality of base station devices, the configuration pattern being one of a plurality of configuration patterns for a frame made up of a plurality of subframes including a downlink subframe and an uplink subframe; and a separator that receives signals from the mobile station device, and separates a signal addressed to its own device from the received signals, based on the assignment information. Each of the plurality of configuration patterns is configured to define: a first correlation correlating a downlink subframe on which uplink assignment information is transmitted, with an uplink subframe on which an uplink signal assigned by the uplink assignment information is transmitted, and a second correlation correlating a downlink subframe on which downlink assignment information and a downlink signal assigned by the downlink assignment information are transmitted, with an uplink subframe on which an acknowledgement signal corresponding to the downlink signal is transmitted. Each of the plurality of configuration patterns includes a plurality of sets, each set being made up of subframes correlated by the first correlation and/or the second correlation, the plurality of subframes being assigned to the plurality of base station devices in a set unit.

According to the present disclosure, flexibility of resource allocation can be improved in a case of a mobile station device having Single Rx/Tx capability supporting dual connectivity.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 15A and 15B are diagrams illustrating eNB switching timing according to the first embodiment of the present disclosure (UL to DL);

FIGS. 19A and 19B are diagrams illustrating eNB switching timing according to the first embodiment of the present disclosure (Sp to UL);

DETAILED DESCRIPTION

Figure 1:
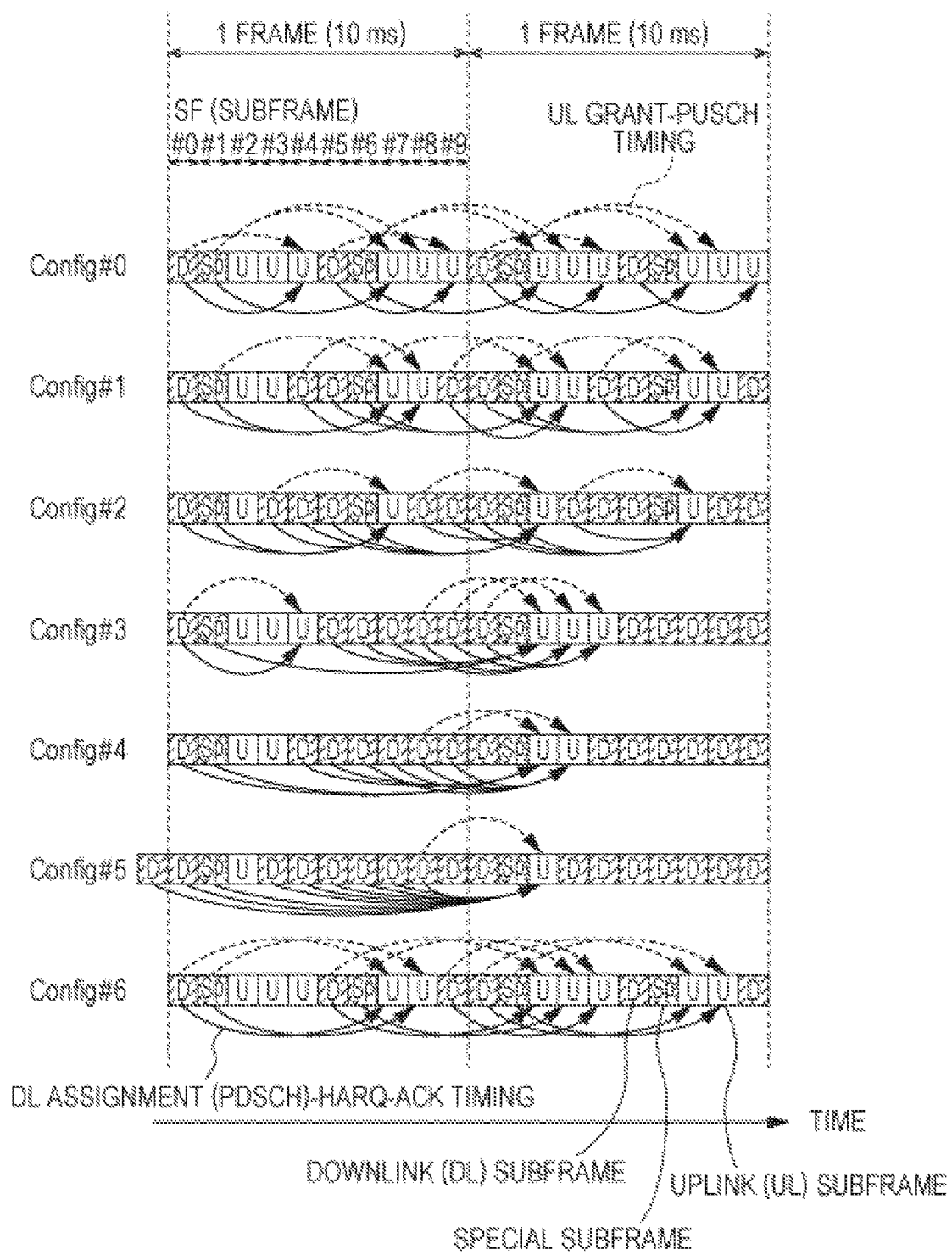
FIG. 1 is a diagram illustrating UL-DL configurations.

Embodiments of the present disclosure will be described in detail with reference to the drawings. Components in the embodiments which are the same are denoted by the same reference numerals, and redundant description thereof will be omitted.

Underlying Knowledge Forming Basis of the Present Disclosure

LTE has a frequency division duplex (FDD) system and a TDD system. In the FDD system, uplink unit band (also called "uplink component carrier (CC)" and downlink unit band (also called "downlink CC") are assigned different frequency bands. In the TDD system, the downlink unit band and uplink unit band are assigned the same frequency band. Downlink communication and uplink communication are performed by switching between downlink (DL) and uplink (UL) using time division. Accordingly, in the TDD system, the downlink unit band can also be restated as being "downlink communication timing of the unit band", and the uplink unit band can also be restated as being "uplink communication timing of the unit band". Switching between the downlink unit band and uplink unit band is performed following a configuration pattern (UL-DL configurations) such as illustrated in FIG. 1, for example.

Which UL-DL configuration to use is notified to the mobile station using a broadcast signal called System Information Block Type 1 (SIB1). In each UL-DL configuration illustrated in FIG. 1, downlink timings and uplink timings are set in a subframe unit (i.e., in 1 msec unit) for each frame (10 msec). The percentage of downlink subframes and uplink subframes can be changed in each UL-DL configuration. Accordingly, a communication system can be configured which can flexibly handle requests regarding throughput for downlink communication and throughput for uplink communication. For example, FIG. 1 illustrates an example of multiple UL-DL configurations (Config#0 through 6), each of which have different percentages between downlink subframes and uplink subframes. The downlink subframes (DL subframes) are represented by "D", and the uplink subframes (UL subframes) are represented by "U" in FIG. 11. "Sp" indicates a special subframe, which is a subframe for switching from downstream communication subframes to upstream communication subframes. Downlink data communication may be performed in some cases with special subframes, in the same way as with downlink communication subframes.

The following timings have been stipulated for the UL-DL configurations in the TDD system.

UL grant-PUSCH timing
DL assignment(PDSCH)-HARQ ACK timing
PUSCH-PHICH(ACK) timing The dotted line arrows illustrated in FIG. 1 represent the correlation between DL subframes and UL subframes at the UL grant-PUSCH timing. The solid arrows represent the correlation between DL subframes and UL subframes, or correlation between special subframes and UL subframes, at the DL assignment(PDSCH)-HARQ ACK timing.

UL grant is uplink assignment information indicating a resource to which uplink data (physical uplink shared channel (PUSCH)) is assigned. The UL grant is notified using a physical downlink control channel (PDCCH) or enhanced PCDDH (EPDCCH) set in the DL subframes or special subframe. The PUSCH is set in a subframe four subframes or more downstream from the subframe where the UL grant is set. The reason is to ensure enough time to generate the PUSCH after the mobile station has received the UL grant. At the PUSCH-PHICH(ACK) timing, the physical hybrid-ARQ indicator channel (PHICH) corresponding to the PUSCH is set in a subframe four subframes or more downstream from the subframe where the PUSCH is set. The reason is to ensure enough time to generate the PHICH after the base station has demodulated and decoded the PUSCH.

DL assignment is downlink assignment information indicating a resource to which downlink data (physical downlink shared channel (PDSCH)) is to be assigned. The DL assignment is notified using the PDCCH or EPDCCH set in a DL subframe or special subframe, in the same way as the case of the UL grant. The PDSCH is set in the same subframe as the subframe where the DL assignment is set. An ACK/NACK (response signal) to the PDSCH is set in a subframe four subframes or more downstream from the subframe where the DL assignment (PDSCH) is set, in accordance with the DL assignment(PDSCH)-HARQ ACK timing. The reason is to ensure enough time to demodulate and decode the PDSCH, and determine ACK/NACK, after the base station has received the DL assignment. However, the following problem occurs in the UL-DL configurations 3 and 4 (Config#3 and #4 in FIG. 1), so the positions of the subframes to assign the ACK/NACK to have been scattered. If the ACK/NACK is set in the first UL subframe after the four subframes downstream from the DL subframe where the DL assignment is set in Config#3 and #4, multiple ACK/NACKs are concentrated in a single UL subframe, meaning that multiple ACK/NACKs for multiple PDSCHs are set in a concentrated manner in a single UL subframe. Accordingly, ACK/NACKs are also assigned to UL subframes downstream from the first UL subframe after the four subframes downstream from the DL subframe where the DL assignment is set, in Config#3 and #4.

The Inventors gained the following knowledge through diligent study of the above-described problem, and accordingly arrived at embodiments of the present disclosure. That is to say, each of the multiple configuration patterns (UL-DL configurations) can be broken down into one or multiple DL/Sp/UL sets made up of subframes correlated by a first correlation and the a second correlation. Each DL/Sp/UL set is defined as a combination including at least part of DL subframes, special subframes, and UL subframes. Allocating subframes to the base stations in DL/Sp/UL set units enables flexibility of resource allocation to be improved even in a case of a mobile station device having Single Rx/Tx capability supporting dual connectivity.

First Embodiment

Configuration of Communication System

Figure 2:
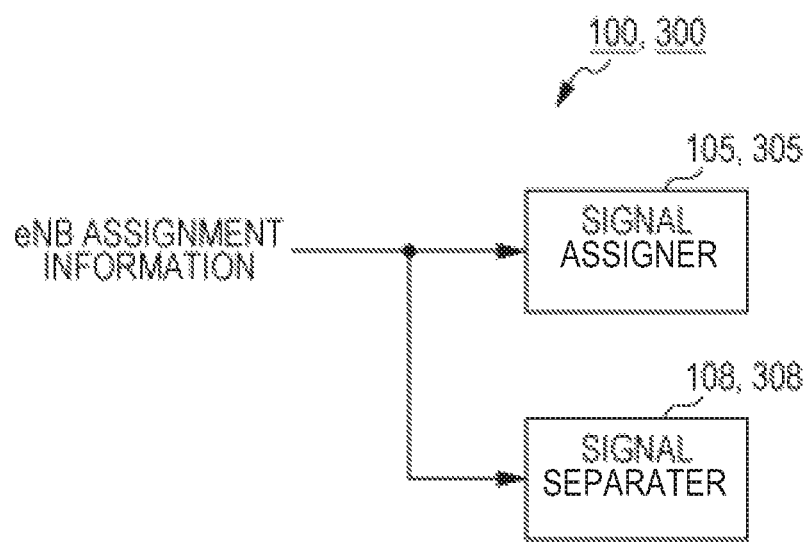
FIG. 2 is a block diagram illustrating principal components of a base station according to a first embodiment of the present disclosure.
Figure 3:
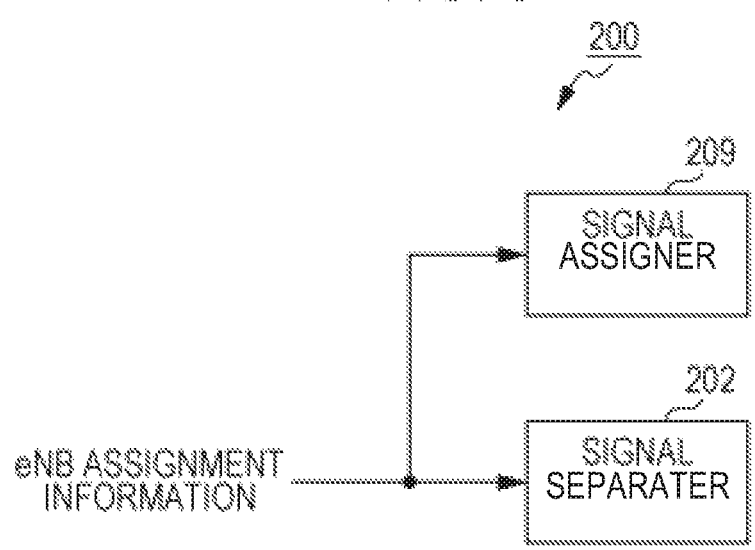
FIG. 3 is a block diagram illustrating principal components of a mobile station according to the first embodiment of the present disclosure.

The communication system according to a first embodiment is an LTE-Advances system, for example, including base stations 100 and 300, and mobile station 200 (see FIGS. 2 and 3). The base station 100 is a MeNB for example, and the base station 300 is an SeNB. That is to say, the base station 100 manages the mobility of the mobile station 200.

The mobile station 200 supports dual connectivity, and has Single Rx/Tx functions. That is to say, the mobile station 200 cannot simultaneously transmit and receive signals to and from the base station 100 and the base station 300. Accordingly, the mobile station 200 switches between the base station 100 and the base station 300 to transmit/receive signals.

That is to say, the communication system according to the present embodiment uses one of multiple configuration patterns (UL-DL configurations) to carry out communication between one of the multiple base stations 100 and 300 and the mobile station 200 for each subframe. Each configuration pattern defines multiple subframes making up one frame, the multiple subframes including DL subframes used for downlink communication and special subframes, and UL subframes used for uplink communication.

Configuration of Primary Components of Base Stations 100 and 300 and Mobile Station 200

FIG. 2 is a block diagram illustrating the configuration of principal components of base stations 100 and 300 according to the present embodiment. Signal assigners 105 and 305 assign signals for each of the multiple base stations 100 and 300 to transmit to the mobile station 200, based on eNB assignment information. This eNB assignment information indicates assignment of multiple subframes included in the UL-DL configuration set to the mobile station 200. Signal separators 108 and 308 each separate, from signals transmitted from the mobile station 200, signals addressed to itself, based on the eNB assignment information.

FIG. 3 is a block diagram illustrating the principal components of the mobile station 200 according to the present embodiment. A signal separator 202 of the mobile station 200 separates, from signals transmitted from the multiple base stations, signals addressed to itself, based on the eNB assignment information. A signal assigner 209 assigns signals to be transmitted to each of the multiple base stations, based on the eNB assignment information.

Each of the multiple UL-DL configurations has set thereto multiple first correlations (UL grant-PUSCH timing) and multiple second correlations (DL assignment(PDSCH)-HARQ ACK timing). The UL grant-PUSCH timing correlates a DL subframe or special subframe by which uplink assignment information (UL grant) is transmitted, with a UL subframe by which a signal (PUSCH) assigned by this UL grant is transmitted. Further, the DL assignment(PDSCH)-HARQ ACK timing correlates a DL subframe or special subframe by which downlink assignment information (DL assignment) and a signal (PDSCH) assigned by this DL assignment are transmitted, with a UL subframe by which a response signal (ACK/NACK) corresponding to this PDSCH is transmitted.

The Inventors found that each UL-DL configuration can be can be broken down into DL/Sp/UL sets made up of multiple subframes correlated by the UL grant-PUSCH timing and the DL assignment(PDSCH)-HARQ ACK timing. The Inventors thus arrived at the idea that allocating subframes included in each UL-DL configuration to the base stations in a DL/Sp/UL set units is effective in realizing flexibility of resource allocation.

Configuration of Base Stations 100 and 300

Figure 4:
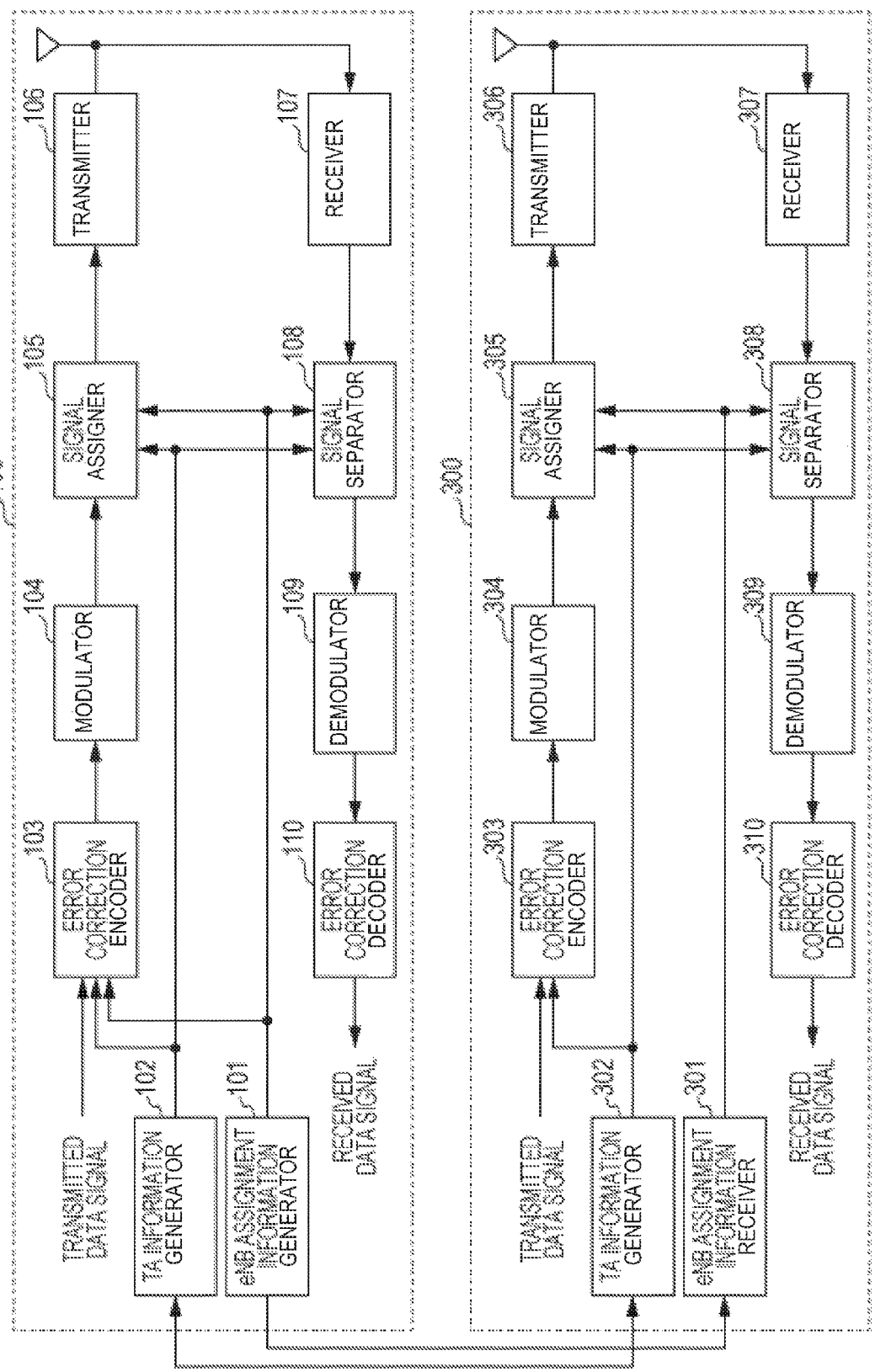
FIG. 4 is a block diagram illustrating the configuration of a base station according to an embodiment of the present disclosure.

FIG. 4 is a block diagram illustrating the configuration of base stations 100 and 300 according to embodiments of the present disclosure. In FIG. 4, the base station 100 includes an eNB assignment information generator 101, a timing advance (TA) information generator 102, an error correction encoder 103, a modulator 104, the signal assigner 105, a transmitter 106, a receiver 107, the signal separator 108, a demodulator 109, and an error correction decoding unit 110.

Also, in FIG. 4, the base station 300 includes an eNB assignment information receiver 301, a TA information generator 302, an error correction encoder 303, a modulator 304, the signal assigner 305, a transmitter 306, a receiver 307, the signal separator 308, a demodulator 309, and an error correction decoding unit 310. That is to say, except for the configuration of the eNB assignment information receiver 301, components of the base station 300 are the same as the components of the base station 100. Hereinafter, the primary components of the base station 100 will primarily be described, while only the component of the base station 300 that differs from its counterpart in the base station 100 will be described (i.e., the eNB assignment information receiver 301).

The eNB assignment information generator 101 of the base station 100 sets a DL/Sp/UL set to assign to the MeNB (base station 100) and a DL/Sp/UL set to assign to the SeNB (base station 300), and generates eNB assignment information including the set DL/Sp/UL sets. The eNB assignment information generator 101 outputs the generated eNB assignment information to the error correction encoder 103 as upper layer signaling. The eNB assignment information generator 101 outputs the eNB assignment information to the signal assigner 105 and the signal separator 108 to instruct the base station 100 regarding subframes FOR transmission/reception OF SIGNALS. The eNB assignment information generator 101 also notifies the eNB assignment information receiver 301 of the base station 300 (SeNB) of the eNB assignment information. Notification of the eNB assignment information from the base station 100 to the base station 300 is performed by inter-base station interfaces such as X2 interface, Xn interface, S1 interface, or the like, for example.

The eNB assignment information receiver 301 of the base station 300 receives the eNB assignment information that the eNB assignment information generator 101 of the base station 100 has generated. The eNB assignment information receiver 301 outputs the eNB assignment information to the signal assigner 305 and the signal separator 308 to instruct the base station 300 regarding subframes for transmission/reception of signals.

Note that the "DL/Sp/UL set" is used as an increment of subframe assignment of each of the multiple base stations 100 and 300. That is to say, this DL/Sp/UL set is used to assign to the base stations part of multiple subframes included in the UL-DL configuration set to the mobile station 200. A DL/Sp/UL set is defined as a combination of DL subframes assignable to each eNB, special subframes, and UL subframes in each UL-DL configuration. A DL/Sp/UL set also includes a DL subframe or special subframe and a UL subframe correlated in each UL-DL configuration in accordance with the UL grant-PUSCH timing and DL assignment(PDSCH)-HARQ ACK timing. That is to say, a DL/Sp/UL set is a set of multiple subframes correlated by the UL grant-PUSCH timing and DL assignment(PDSCH)-HARQ ACK timing.

The eNB assignment information generator 101 assigns, to the base station 100 and the base station 300, subframes included in the UL-DL configuration set to the mobile station 200 in a DL/Sp/UL set units. The eNB assignment information generator 101 then generates the eNB assignment information indicating the one or more DL/Sp/UL sets assigned to the base stations. The number of bits necessary for the eNB assignment information differs depending on the number of DL/Sp/UL sets set for each UL-DL configuration, and the number of frames notified to the terminal.

The TA information generator 102 sets a TA in accordance with propagation latency between the base station 100 and the mobile station 200, and generates TA information including the generated TA. The TA information generator 102 outputs the generated TA information to the error correction encoder 103 as upper layer signaling. The TA information generator 102 also notifies the TA information generator 302 of the base station 300 regarding the TA information of the base station 100. The TA information generator 102 further receives TA information of the base station 300 from the TA information generator 302 of the base station 300. Notification of the TA information between base stations is performed by inter-base station interfaces such as X2 interface, Xn interface, S1 interface, or the like, for example. Thus, TA information of the base stations is shared between the base station 100 and the base station 300.

TA is set in LTE in accordance with the propagation latency between base station and mobile station, such that the reception timing of uplink signals (UL signals) transmitted from multiple mobile stations match at the base station. TA represents, for example, the difference between the timing of a DL subframe or special subframe receiving a downlink signal (DL signal) in a mobile station, and the timing of a UL subframe transmitting a UL signal. A value around twice the propagation latency between base station and mobile station is set as the TA, for example. The mobile station starts transmission of UL subframes at a timing earlier than the receipt timing of DL subframes, by an amount of time equivalent to the TA.

The TA information generator 102 also determines whether or not the subframe format at the time of switching base stations to communicate with the mobile station 200 is "short format". In a case where determination is made that a short format is necessary, the TA information generator 102 decides the number of symbols to be reduced from this subframe. Now, the short format is a format where the number of single carrier frequency division multiple access (SC-FDMA) symbols or orthogonal frequency division multiplexing (OFDM) symbols used in transmission/reception of signals has been reduced. The short format is used here to secure time necessary for the processing to switch base stations with which the mobile station 200 communicates (hereinafter referred to as "guard period"). A guard period is set as the total time of time to switch radio frequency (RF), and transient time necessary for adjustment to transmit/receive signals of different power, between the base station 100 and the base station 300, for example.

The TA information generator 102 determines whether or not to reduce the number of symbols in a subframe immediately before or immediately before the switching to set a guard period (whether or not the short format is necessary), and the number of symbols to be reduced. Determination of whether or not short format, and the number of symbols to be reduced, is performed based on the following information. For example, this determination is performed based on the TA between the base station 100 (MeNB) and mobile station 200, and the TA between the base station 300 and the mobile station 200. The determination is further based on the subframe at the time of switching between subframes assigned to the base station 100 and subframes assigned to the base station 300 (i.e., at which subframe the switching is to take place). Specifically, examples of the timing for the subframe at the time of switching between the base station 100 and the base station 300 include the timings of switching from UL subframe to DL subframe, from UL subframe to UL subframe, from DL subframe to DL subframe, from DL subframe to special subframe, and from special subframe to UL subframe. The TA information generator 102 determines whether or not the subframe format at the time of switching will be short format, and the number of symbols reduced in the case of short format, with regard to the combination of switching between the base station 100 and the base station 300. The method of determining at the TA information generator 102 whether or not short format, and the number of symbols reduced, will be described later in detail. The TA information generator 102 outputs the combination of subframes for short format, and the number of symbols to be reduced, to the signal assigner 105 and the signal separator 108.

The error correction encoder 103 receives the eNB assignment information from the eNB assignment information generator 101, and receives the TA information from the TA information generator 102. The eNB assignment information and TA information are types of control information. The error correction encoder 103 then performs error-correction encoding of the transmitted data signals (i.e., downlink data), eNB assignment information, and TA information, and outputs the encoded signals to the modulator 104. The modulator 104 modulates the signals received from the error correction encoder 103, and outputs the modulated signals to the signal assigner 105.

The signal assigner 105 assigns signals to be transmitted to the mobile station 200, based on the eNB assignment information input from the eNB assignment information generator 101 (the eNB assignment information receiver 301 in the case of the base station 300). Specifically, the signal assigner 105 determines subframes which the base station 100 itself can use, based on the eNB assignment information. The signal assigner 105 also determines whether or not to use short format of signal assignment, based on the information input from the TA information generator 102 (whether or not short format, and the number of symbols reduced if short format). The signal assigner 105 then assigns, to the predetermined downlink resource, the modulated signals received from the modulator 104 (data signals or control signals) in the decided subframe.

Signals including downlink data and control information (including eNB assignment information and TA information) are assigned to predetermined resources, thereby generating transmission signals. The generated transmission signals are output to the transmitter 106. The transmitter 106 subjects the transmitted signals received from the signal assigner 105 to predetermined transmission processing such as upconverting, and so forth, and transmits to the mobile station 200 via an antenna.

The receiver 107 receives the signals transmitted from the mobile station 200 via an antenna, and subjects the received signals to predetermined reception processing such as downconverting and so forth. The receiver 107 then outputs the signals that have been subjected to reception processing to the signal separator 108.

The signal separator 108 separates signals addressed to the base station 100 itself, from the reception signals from the receiver 107 (the signals transmitted from the mobile station 200), based on the eNB assignment information input from the eNB assignment information generator 101. Specifically, the signal separator 108 determines subframes usable by the base station 100 itself, based on the eNB assignment information and information input from the TA information generator 102. The information input from the TA information generator 102 includes whether or not short form, and the number of symbols to be reduced if short format. The signal separator 108 then separates, from the reception signals that have been received at the receiver 107, signals of the decided subframes, and outputs the separated signals to the demodulator 109. For example, the signal separator 108 outputs signals where the SC-FDMA symbols have been reduced, to the demodulator 109, if a short format subframe.

The demodulator 109 subjects the signals received from the signal separator 108 to demodulation processing, and outputs the obtained demodulated signals to the error correction decoding unit 110. The error correction decoding unit 110 decodes the demodulated signals received from the demodulator 109, thereby yielding received data signals (i.e., uplink data).

Configuration of Mobile Station 200

Figure 5:
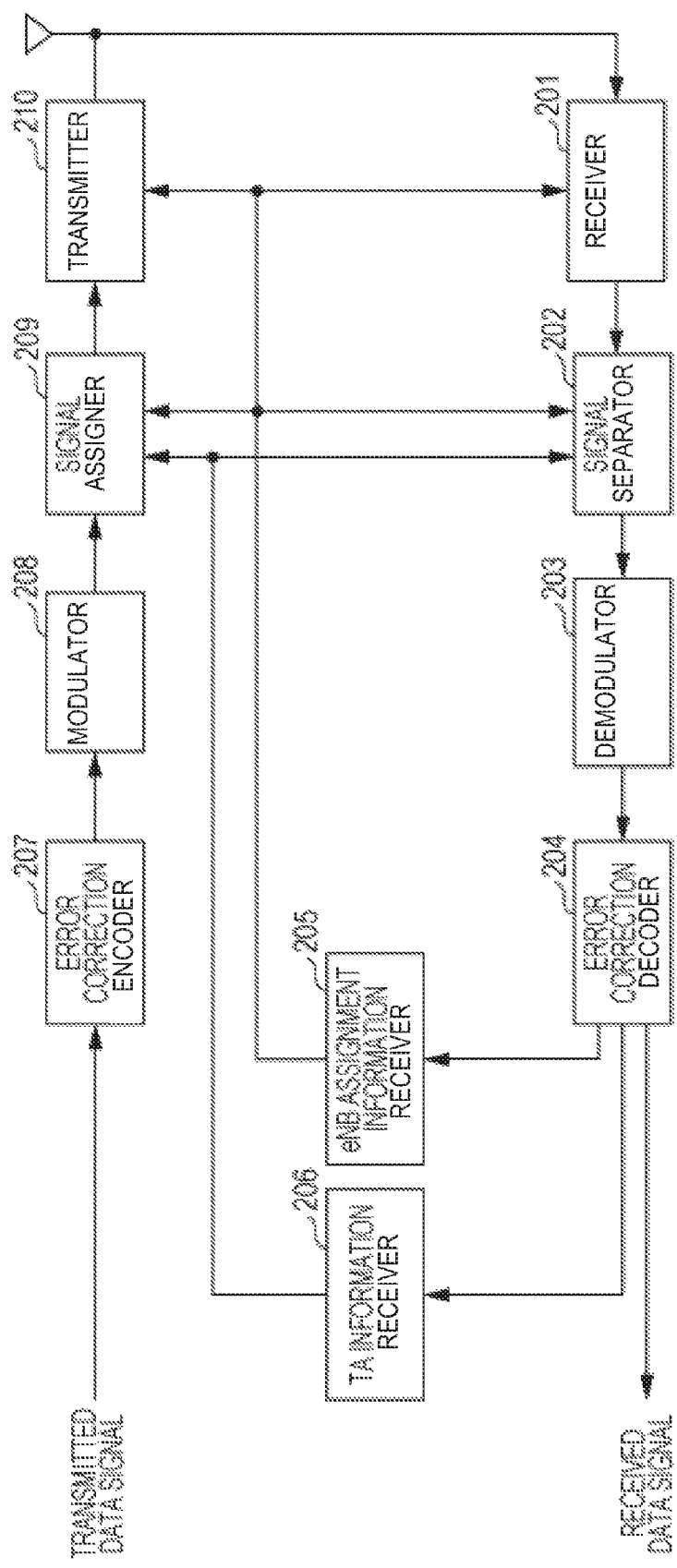
FIG. 5 is a block diagram illustrating the configuration of a mobile station according to an embodiment of the present disclosure.

FIG. 5 is a block diagram illustrating the configuration of the base station 100 according to the present embodiment. The mobile station 200 in FIG. 5 includes a receiver 201, a signal separator 202, a demodulator 203, an error correction decoding unit 204, an eNB assignment information receiver 205, a TA information receiver 206, an error correction encoder 207, a modulator 208, a signal assignment unit 209, and a transmitter 210.

The receiver 201 receives the signals transmitted from the base station 100 or base station 300 every subframe, via an antenna, in accordance with the eNB assignment information (DL/Sp/UL sets assigned to the base stations) received from the eNB assignment information receiver 205. The receiver 201 then subjects the received signals to predetermined reception processing such as downconverting and so forth, and outputs the signals that have been subjected to the reception processing to the signal separator 202. The received signals include downlink data, eNB assignment information, TA information, and so forth.

The signal separator 202 separates, from the received signals received from the receiver 201, the signals received from each of the base station 100 and the base station 300, based on the eNB assignment information (DL/Sp/UL sets) received from the eNB assignment information receiver 205. Specifically, the signal separator 202 separates the signals from the base station 100 and the signals from the base station 300 out of the received signals, based on the eNB assignment information and the TA information received from the TA information receiver 206. The TA information includes information of subframes of which the format is to be short format, and the number of symbols to be reduced. The signal separator 202 then outputs the separated signals to the demodulator 203. For example, the signal separator 202 outputs signals from which OFDMA symbols have been reduced to the demodulator 203 in the case of subframes of which the format is short format.

The demodulator 203 demodulates the signals received from the signal separator 202, and outputs the demodulated signals to the error correction decoding unit 204. The error correction decoding unit 204 decodes the demodulated signals received from the demodulator 203 and outputs the obtained received data signals. The error correction decoding unit 204 also outputs the eNB assignment information received at the upper layer to the eNB assignment information receiver 205, and outputs the TA information to the TA information receiver 206.

The eNB assignment information receiver 205 decides a DL/Sp/UL set to be assigned to the base station 100 (MeNB) and a DL/Sp/UL set to be assigned to the base station 300 (SeNB), based on the eNB assignment information received from the error correction decoding unit 204. The eNB assignment information receiver 205 then outputs the decided DL/Sp/UL sets to the receiver 201, signal separator 202, signal assignment unit 209, and transmitter 210.

The TA information receiver 206 receives the TA information of both the base station 100 and the base station 300 from the error correction decoding unit 204. In the same way as with the TA information generator 102, the error correction decoding unit 204 then determines whether or not the subframes which the mobile station 200 can transmit/receive include subframes of the short format, and the number of symbols to be reduced for the short format, based on the TA information of each. The TA information receiver 206 outputs information of subframes of which the format is to be short format, and the number of symbols to be reduced, to the signal separator 202 and signal assignment unit 209.

The error correction encoder 207 performs error-correction encoding of the transmitted data signals (uplink data), and outputs the encoded signals to the modulator 208. The modulator 208 modulates the signals received from the error correction encoder 207, and outputs the modulated signals to the signal assignment unit 209.

The signal assignment unit 209 assigns signals to be transmitted to each of the base station 100 and the base station 300, based on the eNB assignment information (information indicating the DL/Sp/UL sets assigned to the base stations) received from the eNB assignment information receiver 205. Specifically, the signal assignment unit 209 decides subframes for signals to be transmitted to the base station 100 (MeNB), and subframes for signals to be transmitted to the base station 300 (SeNB), based on the eNB assignment information. The signal assignment unit 209 also decides whether or not to use the short format at the time of assigning signals, based on the information received from the TA information receiver 206 (information of subframes of which the format is to be short format, and the number of symbols to be reduced). The signal assignment unit 209 then assigns the modulated signals (data signals) received from the modulator 208 to downlink resources set beforehand, in the decided subframes, and outputs to the transmitter 210.

The transmitter 210 receives the eNB assignment information (DL/Sp/UL sets) from the eNB assignment information receiver 205. The transmitter 210 then, in accordance with the eNB assignment information, subjects the transmission signals received from the signal assignment unit 209 to predetermined transmission processing such as upconverting and so forth, and transmits to the base station 100 or the base station 300 via the antenna.

Operations of Base Stations 100 and 300 and Mobile Station 200

The operations of the base stations 100 and 300 and mobile station 200, configured as described above, will be described in detail.

Definition of DL/Sp/UL Set

Each UL-DL configuration in the present embodiment has a combination of a DL subframe or special subframe and a UL subframes defined as a DL/Sp/UL set. In each UL-DL configuration, the DL/Sp/UL set is defined according to the UL grant-PUSCH timing (first correlation) and DL assignment(PDSCH)-HARQ ACK timing (second correlation).

Specifically, each DL/Sp/UL set is made up of multiple subframes correlated by the UL grant-PUSCH timing and the DL assignment(PDSCH)-HARQ ACK timing. These multiple subframes include DL subframes and UL subframes. A DL/Sp/UL set may also include a special subframe in some cases. Here, each UL-DL configuration has correlated therein a DL subframe or a special subframe whereby the UL grant is transmitted at the UL grant-PUSCH timing, and a UL subframe by which the PUSCH assigned by the UL grant is transmitted. Each UL-DL configuration also has correlated therein a DL subframe or a special subframe by which a DL assignment (PDSCH) is transmitted, and a UL subframe by which an ACK/NACK corresponding to the PDSCH is transmitted, by the DL assignment(PDSCH)-HARQ ACK timing.

That is to say, a DL subframe or special subframe notifying a UL grant indicating the PUSCH assignment, and a UL subframe whereby the PUSCH assigned by this UL grant is transmitted, are included in the same DL/Sp/UL set. Also, a DL subframe or special subframe notifying a DL assignment, and a UL subframe whereby an ACK/NACK as to the PDSCH assigned by this DL assignment is transmitted, are included in the same DL/Sp/UL set.

The following is a detailed description of the DL/Sp/UL sets defined in the UL-DL configurations (Config#0 through Config#6), with reference to FIGS. 6 through 12. Note that in the following description, the number of DL/Sp/UL sets per frame is the total number of DL/Sp/UL sets of which the leading subframe of the subframes included in each DL/Sp/UL set is located within that one frame. The leading subframe is a DL subframe or a special subframe. Note that the DL subframe or special subframe in one DL/Sp/UL set, and the UL subframe in that DL/Sp/UL set, may straddle multiple frames. While frames #0 and #1 are illustrated in FIG. 6 through 12, description will be made focusing on the configuration pattern (UL-DL configuration) in frame #0.

Figure 6:
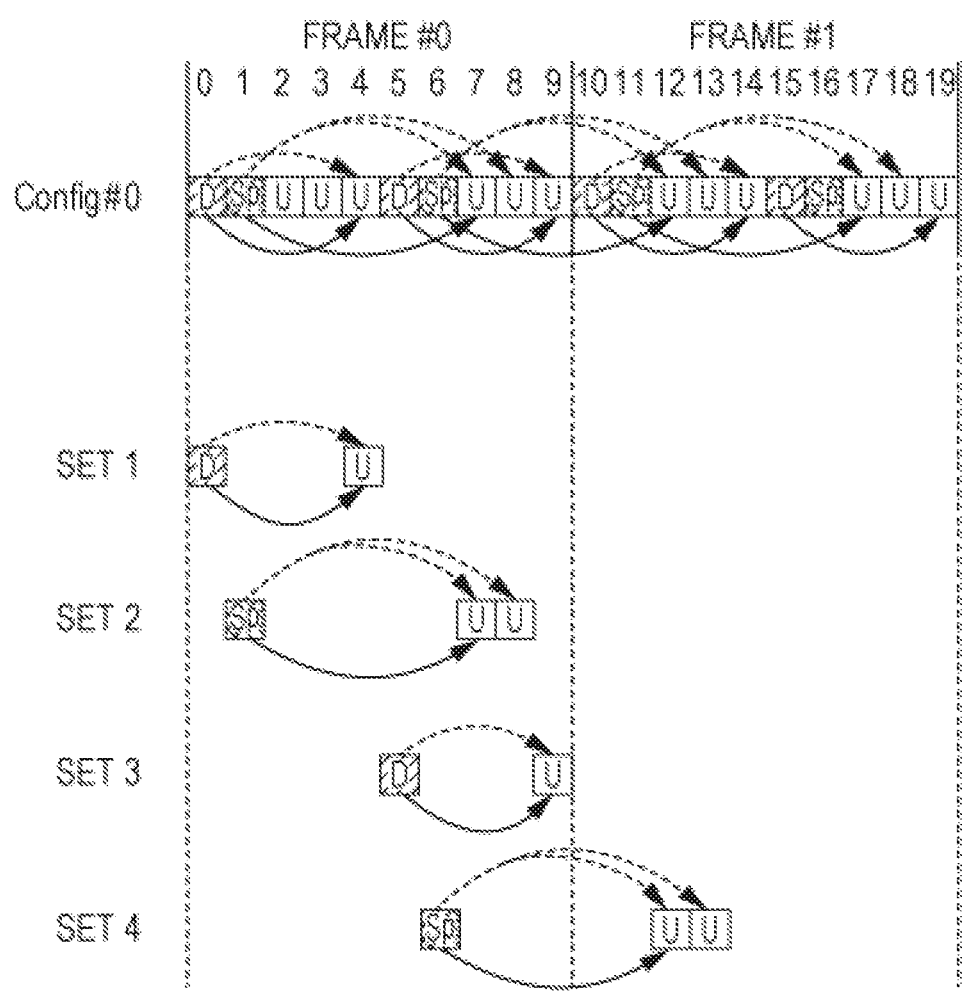
FIG. 6 is a diagram illustrating a subframe set in Config#0 according to the first embodiment of the present disclosure.

Config#0 (FIG. 6)

FIG. 6 illustrates DL/Sp/UL sets included in Config#0. As illustrated in FIG. 6, a DL subframe #0 is correlated with a UL subframe #4 by the UL grant-PUSCH timing and DL assignment(PDSCH)-HARQ ACK timing. On the other hand, these subframes #0 and #4 have no correlation with other subframes, other than the above correlation. Accordingly, a Set 1, which is one of the DL/Sp/UL sets, is made up of subframes #0 and #4, as illustrated in FIG. 6.

In the same way, as illustrated in FIG. 6, a special subframe #1 is correlated with UL subframes #7 and #8 by the UL grant-PUSCH timing. Further, the special subframe #1 is correlated with the UL subframe #7 by the DL assignment(PDSCH)-HARQ ACK timing. On the other hand, these subframes #1, #7, and #8 have no correlation with other subframes, other than the above correlation. Accordingly, a Set 2, which is one of the DL/Sp/UL sets, is made up of subframes #1, #7, and #8, as illustrated in FIG. 6.

The same holds true for the other DL/Sp/UL sets as well. That is to say, Set 3 is made up of subframes #5 and #9, and Set 4 is made up of subframe #6, and subframes #12 and #13 that are located in the subsequent frame, as illustrated in FIG. 6.

Thus, as illustrated in FIG. 6, of the subframes included in the DL/Sp/UL sets, there are four leading subframes in the frame #0. Accordingly, the number of DL/Sp/UL sets included in one frame in Config#0 is four. Note that the leading frame is either a DL subframe or a special subframe in each of Config#0 through #6.

Figure 7:
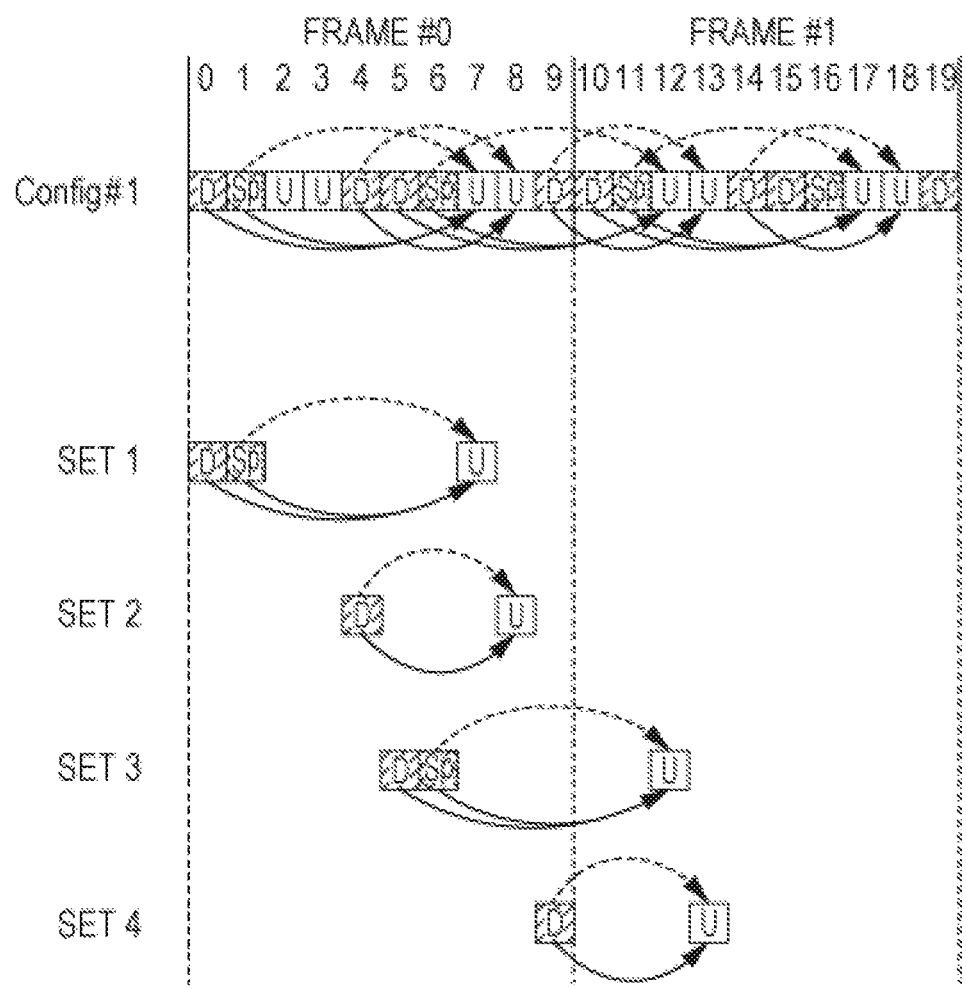
FIG. 7 is a diagram illustrating a subframe set in Config#1 according to the first embodiment of the present disclosure.

Config#1 (FIG. 7)

FIG. 7 illustrates DL/Sp/UL sets included in Config#1. As illustrated in FIG. 7, DL subframe #0 is correlated with UL subframe #7 by the DL assignment(PDSCH)-HARQ ACK timing. Also, UL subframe #7 is correlated with special subframe #1 by the UL grant-PUSCH timing. On the other hand, these subframes #0, #1, and #7 have no correlation with other subframes, other than the above correlation. Accordingly, Set 1, which is one of the DL/Sp/UL sets, is made up of subframes #0, #1, and #7, as illustrated in FIG. 7.

In the same way, as illustrated in FIG. 7, DL subframe #4 is correlated with UL subframe #8 by the UL grant-PUSCH timing and DL assignment(PDSCH)-HARQ ACK timing. On the other hand, these subframes #4 and #8 have no correlation with other subframes, other than the above correlation. Accordingly, Set 2, which is one of the DL/Sp/UL sets, is made up of subframes #4 and #8, as illustrated in FIG. 7.

The same holds true for the other DL/Sp/UL sets as well. That is to say, Set 3 is made up of subframes #5 and #6, and subframe #12 located in frame #1, and Set 4 is made up of subframe #9, and subframe #13 located in frame #1, as illustrated in FIG. 7.

Thus, as illustrated in FIG. 7, of the subframes included in the DL/Sp/UL sets, there are four leading subframes in the frame #0. Accordingly, the number of DL/Sp/UL sets included in one frame in Config#1 is four.

Figure 8:
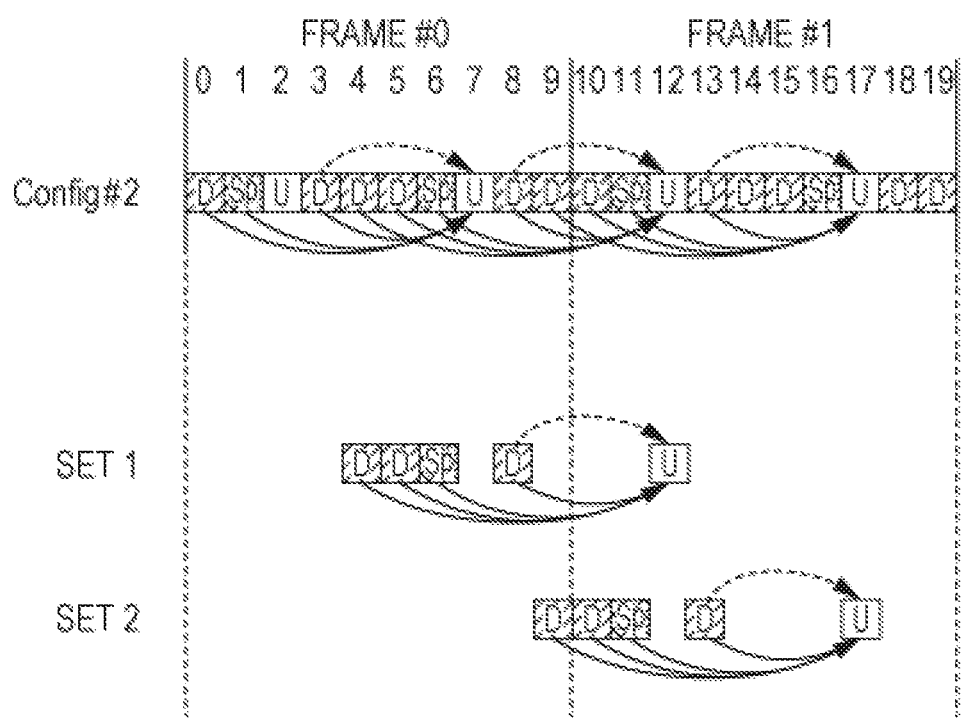
FIG. 8 is a diagram illustrating a subframe set in Config#2 according to the first embodiment of the present disclosure.

Config#2 (FIG. 8)

FIG. 8 illustrates DL/Sp/UL sets included in Config#2. As illustrated in FIG. 8, DL subframe #4 within frame #0 is correlated with UL subframe #12 in frame #1 by the DL assignment(PDSCH)-HARQ ACK timing. Also, UL subframe #12 is correlated with DL subframes #5 and #8 and special subframe #6 by the DL assignment(PDSCH)-HARQ ACK timing. UL subframe #12 also is correlated with DL subframe #8 by the UL grant-PUSCH timing. On the other hand, these subframes #4, #5, #6, #8, and #12 have no correlation with other subframes, other than the above correlation. Accordingly, Set 1, which is one of the DL/Sp/UL sets, is made up of subframes #4, #5, #6, #8, and #12, as illustrated in FIG. 8.

The same holds true for other DL/Sp/UL sets as well. That is to say, Set 2 is made up of subframes #9, #10, #11, #13, and #17, as illustrated in FIG. 8.

Thus, as illustrated in FIG. 8, of the subframes included in the DL/Sp/UL sets, there are two leading subframes in the frame #0. Accordingly, the number of DL/Sp/UL sets included in one frame in Config#2 is two.

Figure 9:
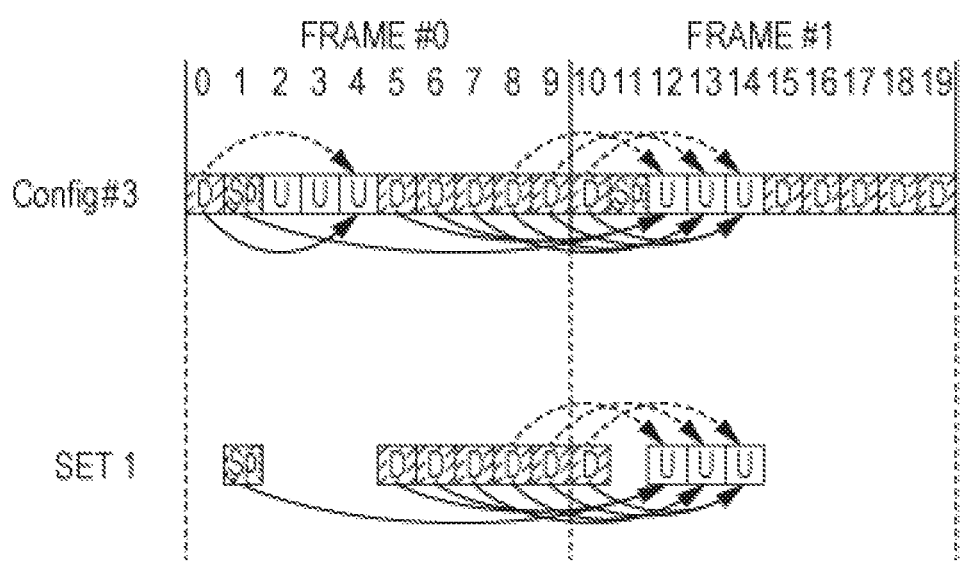
FIG. 9 is a diagram illustrating a subframe set in Config#3 according to the first embodiment of the present disclosure.

Config#3 (FIG. 9)

FIG. 9 illustrates a DL/Sp/UL set included in Config#3. As illustrated in FIG. 9, special subframe #1 in frame #0 is correlated with UL subframe #12 in frame #1 by the DL assignment(PDSCH)-HARQ ACK timing. Also, UL subframe #12 is correlated with DL subframes #5 and #6 by the DL assignment(PDSCH)-HARQ ACK timing. UL subframe #12 also is further correlated with DL subframe #8 by the UL grant-PUSCH timing.

DL subframe #8 is also correlated with UL subframe #13 by the DL assignment(PDSCH)-HARQ ACK timing. UL subframe #13 is also correlated with DL subframe #7 by the DL assignment(PDSCH)-HARQ ACK timing, as well as being correlated with the DL subframe #9 by the UL grant-PUSCH timing.

Further, DL subframe #9 is correlated with UL subframe #14 by the DL assignment(PDSCH)-HARQ ACK timing. UL subframe #14 is also correlated with DL subframe #10 by UL grant-PUSCH timing and DL assignment(PDSCH)-HARQ ACK timing.

Thus, the subframes #1, #5 through #10, and #12 through #14 are correlated with each other in Config#3. On the other hand, these subframes #1, #5 through #10, and #12 through #14 have no correlation with other subframes, other than the above correlation. Accordingly, Set 1, which is a DL/Sp/UL set, is made up of subframes #1, #5 through #10, and #12 through #14, as illustrated in FIG. 9.

Thus, as illustrated in FIG. 9, of the subframes included in the DL/Sp/UL sets, there is only one leading subframe in the frame #0. Accordingly, the number of DL/Sp/UL sets included in one frame in Config#3 is one.

Figure 10:
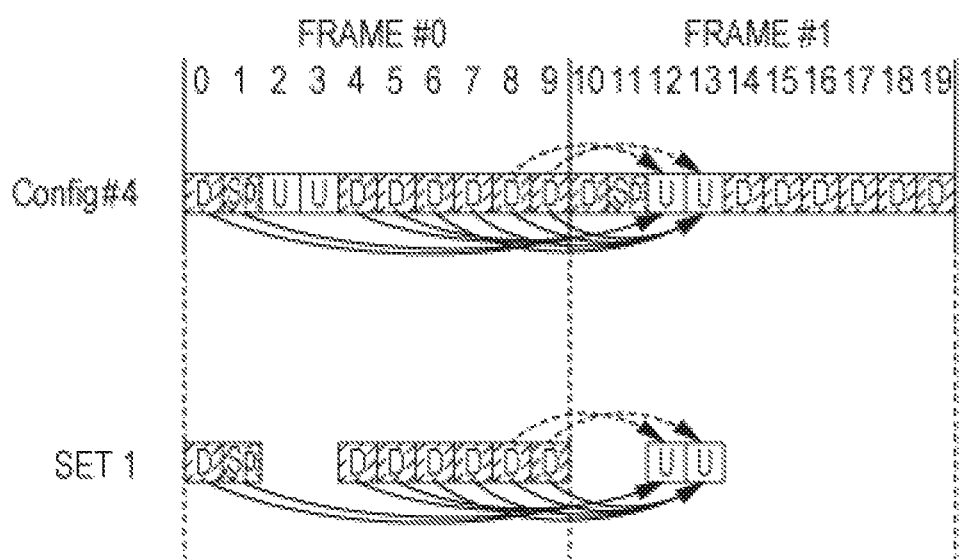
FIG. 10 is a diagram illustrating a subframe set in Config#4 according to the first embodiment of the present disclosure.

Config#4 (FIG. 10)

FIG. 10 illustrates a DL/Sp/UL set included in Config#4. As illustrated in FIG. 10, the subframes #0, #1, #4 through #9, #12, and #13 are correlated with each other in Config#4 by UL grant-PUSCH timing and DL assignment(PDSCH)-HARQ ACK timing, in the same way as in Config#3. On the other hand, these subframes #0, #1, #4 through #9, #12, and #13 have no correlation with other subframes, other than the above correlation. Accordingly, Set 1, which is a DL/Sp/UL set, is made up of subframes #0, #1, #4 through #9, #12, and #13, as illustrated in FIG. 10.

Thus, as illustrated in FIG. 10, of the DL subframes and special subframes included in the DL/Sp/UL sets, there is only one leading subframe in the frame #0. Accordingly, the number of DL/Sp/UL sets included in one frame in Config#4 is one.

Figure 11:
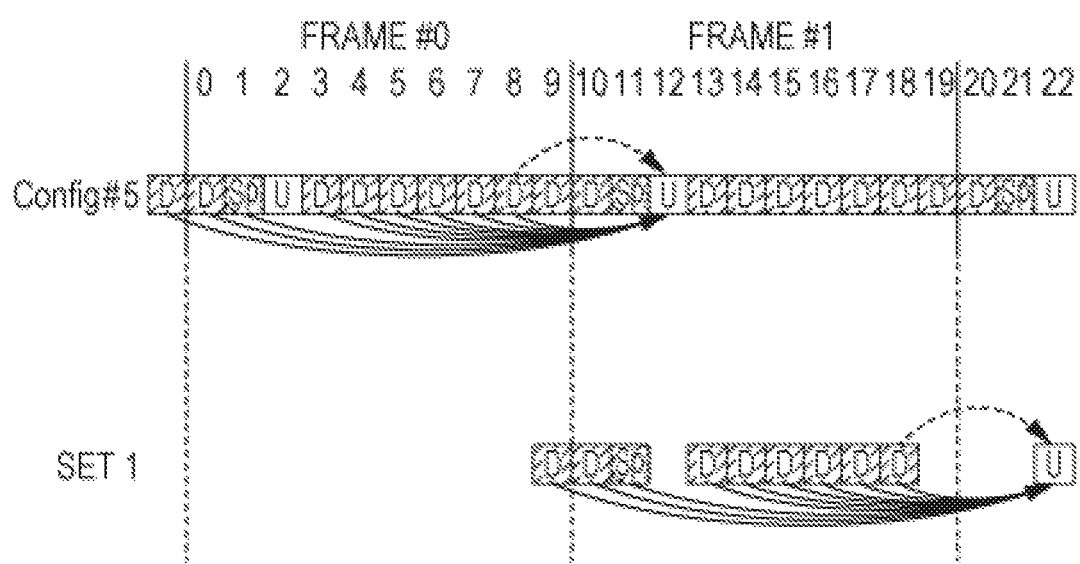
FIG. 11 is a diagram illustrating a subframe set in Config#5 according to the first embodiment of the present disclosure.

Config#5 (FIG. 11)

FIG. 11 illustrates a DL/Sp/UL set included in Config#5. As illustrated in FIG. 11, the subframes #9 through #11, #13 through #18, and #22 are correlated with each other in Config#5 by UL grant-PUSCH timing and DL assignment (PDSCH)-HARQ ACK timing, in the same way as in Config#3. On the other hand, these subframes #9 through #11, #13 through #18, and #22 have no correlation with other subframes, other than the above correlation. Accordingly, Set 1, which is a DL/Sp/UL set, is made up of subframes #9 through #11, #13 through #18, and #22, as illustrated in FIG. 11.

Thus, as illustrated in FIG. 11, of the subframes included in the DL/Sp/UL sets, there is only one leading subframe in the frame #0. Accordingly, the number of DL/Sp/UL sets included in one frame in Config#5 is one.

Figure 12:
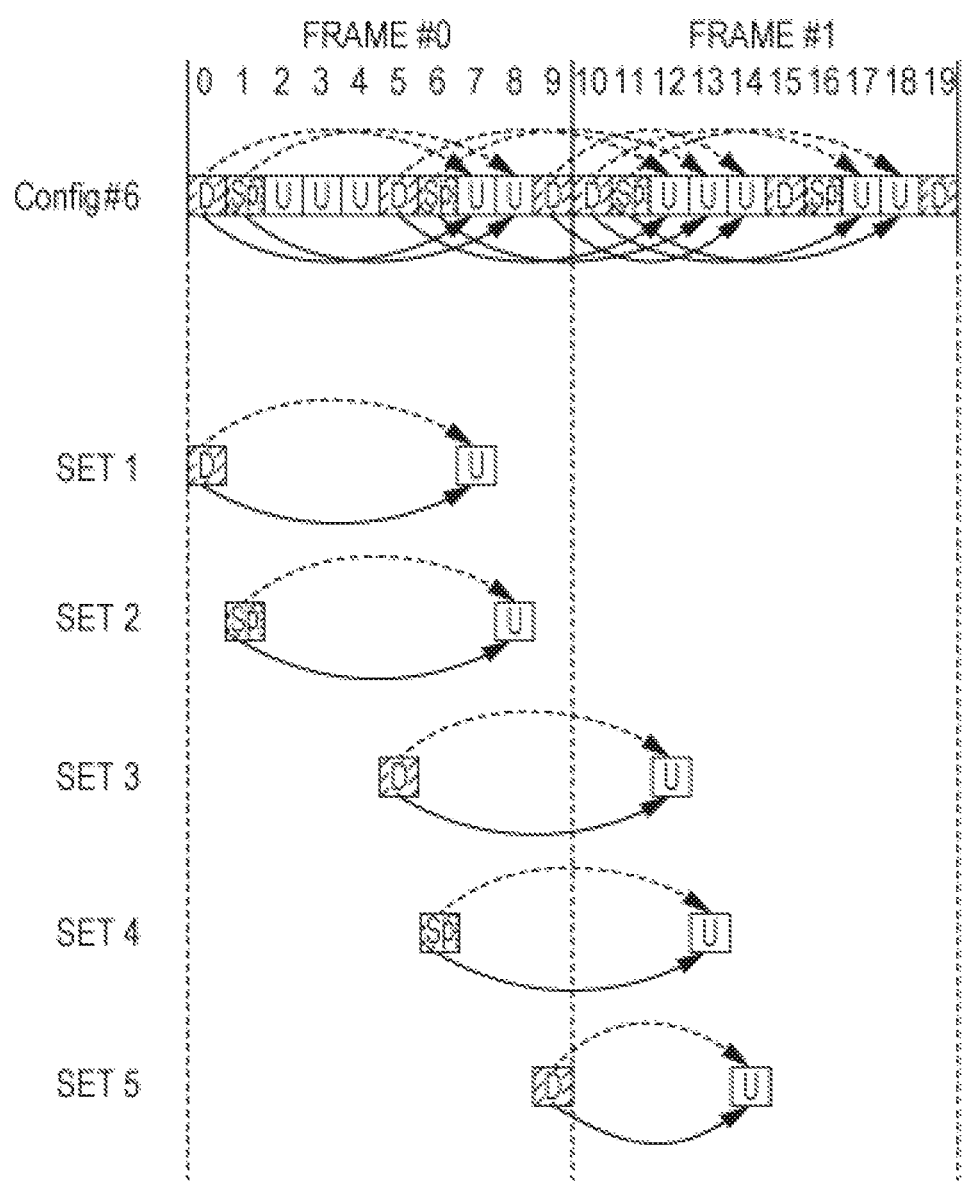
FIG. 12 is a diagram illustrating a subframe set in Config#6 according to the first embodiment of the present disclosure.

Config#6 (FIG. 12)

FIG. 12 illustrates DL/Sp/UL sets included in Config#6. As illustrated in FIG. 12, DL subframe #0 is correlated with UL subframe #7 by UL grant-PUSCH timing and DL assignment(PDSCH)-HARQ ACK timing. On the other hand, these subframes #0 and #7 have no correlation with other subframes, other than the above correlation. Accordingly, Set 1, which is one of the DL/Sp/UL sets, is made up of subframes #0 and #7, as illustrated in FIG. 12.

In the same way, as illustrated in FIG. 12, special subframe #1 is correlated with UL subframe #8 by UL grant-PUSCH timing and DL assignment(PDSCH)-HARQ ACK timing. On the other hand, these subframes #1 and #8 have no correlation with other subframes, other than the above correlation. Accordingly, Set 2, which is one of the DL/Sp/UL sets, is made up of subframes #1 and #8, as illustrated in FIG. 12.

The same holds true for other DL/Sp/UL sets as well. That is to say, Set 3 is made up of subframes #5 and #12, Set 4 is made up of subframes #6 and #13, and Set 5 is made up of subframes #9 and #14, as illustrated in FIG. 12.

Thus, as illustrated in FIG. 12, of the subframes included in the DL/Sp/UL sets, there are five leading subframes in the frame #0. Accordingly, the number of DL/Sp/UL sets included in one frame in Config#6 is five.

The above has been a description of DL/Sp/UL sets defined in the UL-DL configurations (Config#0 through Config#6). It should be noted, however, that to consideration has been given to the PUSCH-PHICH(ACK) timing (omitted from illustration in FIG. 1) in the above description of DL/Sp/UL set definitions. Depending on the UL-DL configuration, there are cases where PHICHs as to multiple PUSCHs are transmitted at different DL subframes. In such a case, giving consideration to the PUSCH-PHICH timing in the DL/Sp/UL set definition will increase the number of subframes included in the same DL/Sp/UL set, resulting in reduced flexibility of signal assignment. Accordingly, in a case where a DL subframe, by which a PHICH corresponding to a PUSCH is to be transmitted, has been assigned to a base station different from the UL subframe by which the PUSCH is transmitted, the mobile station 200 does not receive the PHICH. In a case that a PHICH is not received, the mobile station 200 assumes that an ACK has been received. According to this arrangement, non-adaptive HARQ where retransmission is performed using a NACK without transmitting a UL grant cannot be operated, but adaptive HARQ where retransmission is instructed by UL grant is operable.

OPERATION EXAMPLES

Figure 13:
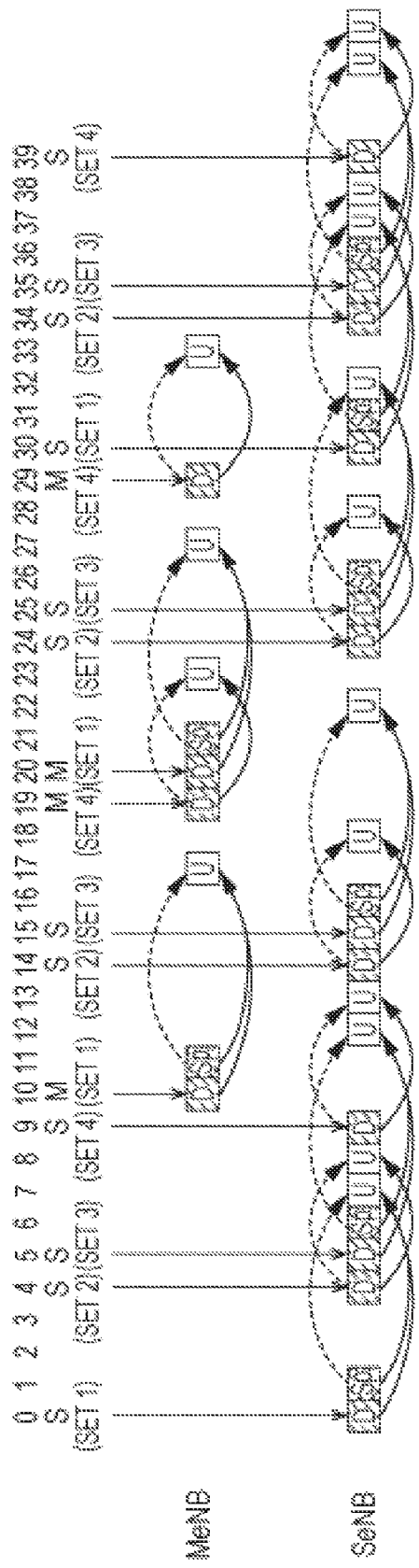
FIG. 13 is a diagram illustrating a resource allocation example in Config#1 according to the first embodiment of the present disclosure.

The eNB assignment information generator 101 of the base station 100 assigns, to the base station 100 (MeNB) and base station 300 (SeNB), the subframes included in the UL-DL configuration set to the mobile station 200, for each of the above-described DL/Sp/UL sets. As one example, FIG. 13 illustrates an operation example in a case where Config#1 has been set to the mobile station 200. The number of DL/Sp/UL sets per frame is four for Config#1, as illustrated in FIG. 7. Accordingly, in a case of allocating resources to MeNB and SeNB at four-frame (40 msec) cycles, the eNB assignment information generator 101 decides allocation of 16 sets (four sets×four frames).

For example, the symbol "M" below the subframe Nos. 0 through 39 in FIG. 13 indicates that the DL/Sp/UL set is to be assigned to the base station 100 (MeNB), and "S" indicates that the DL/Sp/UL set is to be assigned to the base station 300 (SeNB). Subframes #0 through #39 in FIG. 13 are assigned to the MeNB and SeNB in each DL/Sp/UL set (Set 1 through Set 4) in Config#1.

Figure 14:
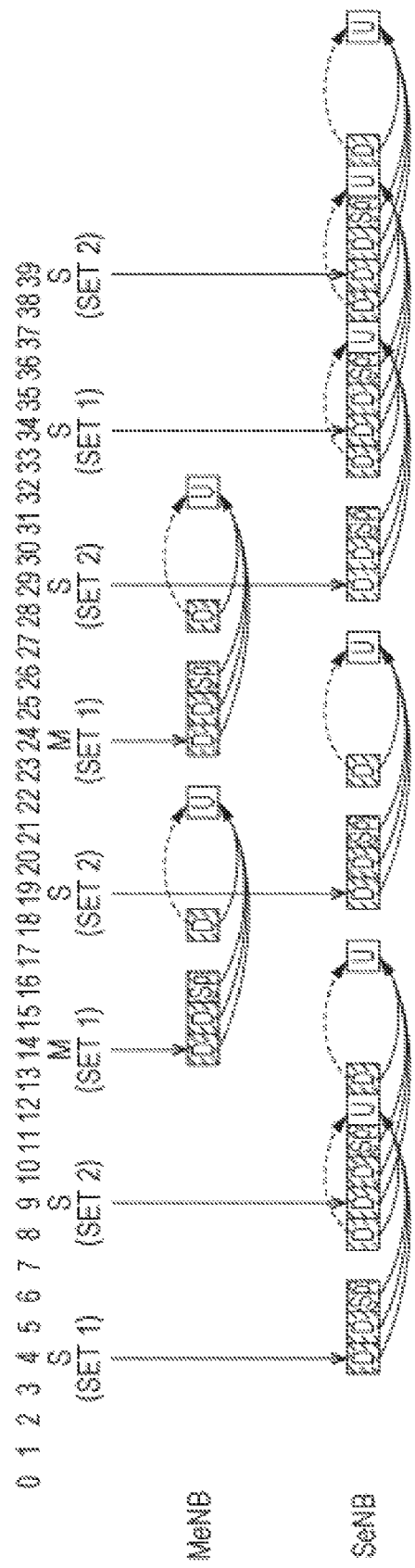
FIG. 14 is a diagram illustrating a resource allocation example in Config#1 according to the first embodiment of the present disclosure.

As another example, FIG. 14 illustrates an operation example in a case where Config#2 has been set to the mobile station 200. The number of DL/Sp/UL sets per frame is two for Config#2, as illustrated in FIG. 8. Accordingly, in a case of allocating resources to MeNB and SeNB at four-frame (40 msec) cycles, the TA information generator 102 decides allocation of 8 sets (two sets×four frames). For example, the subframes #0 through #39 in FIG. 14 are assigned to the MeNB and SeNB in each DL/Sp/UL set (Set 1 and Set 2) in Config#2. In the other UL-DL configurations (Config#0 and #3 through #6) as well, the subframes are assigned to the MeNB and SeNB in each DL/Sp/UL set, in the same way.

As described above, according to the present embodiment, combinations of DL subframes or special subframes and UL subframes are defined as DL/Sp/UL sets in each UL-DL configuration. Specifically, a DL/Sp/UL set is made up of subframes that have been correlated by UL grant-PUSCH timing and DL assignment(PDSCH)-HARQ ACK timing. The subframes included in the UL-DL configuration are assigned to multiple base stations (MeNB and SeNB) in each DL/Sp/UL set.

Particularly, consecutive UL subframes are included in different DL/Sp/UL sets in Config#0 (FIG. 6), Config#1 (FIG. 7), and Config#6 (FIG. 12). Accordingly, assigning subframes in a DL/Sp/UL set unit as described in the present embodiment enables the terminal to assign consecutive UL subframes to multiple base stations (eNB). Specifically, Set 4 including UL subframe #3 (subframe #13 in FIG. 6) and Set 1 including UL subframe #4 can be assigned to different base stations, and Set 2 including UL subframe #8 and Set 3 including UL subframe #9 can be assigned to different base stations, in Config#0.

Thus, while consecutive UL subframes could only be assigned to the same base station in the related art, consecutive UL subframes can be assigned to multiple base stations in the present embodiment. That is to say, flexibility of resource assignment is improved by the present embodiment in comparison with the related art.

Due to subframes being assigned to the MeNB and SeNB in each DL/Sp/UL set, the following advantage can also be obtained even in a case where the base station communicating with the mobile station 200 is switched between the base station 100 and the base station 300. That is to say, DL subframes, special subframes, and UL subframes correlated by UL grant-PUSCH timing and DL assignment(PDSCH)-HARQ ACK timing are assigned to the same base station. In other words, a situation can be avoided where multiple subframes correlated by UL grant-PUSCH timing and DL assignment(PDSCH)-HARQ ACK timing are assigned to different base stations in a case where the base station communicating with the mobile station 200 is switched between the base station 100 and the base station 300, which would render transmission/reception of these subframes impossible.

Accordingly, flexibility of resource allocation can be improved while maintaining correlation of DL subframes or special subframes and UL subframes at UL grant-PUSCH timings and DL assignment(PDSCH)-HARQ ACK timings. Thus, flexibility in resource allocation can be improved by the present embodiment in a case of the mobile station device 200, having Single Rx/Tx capability, supporting dual connectivity.

Note that assignment instructions of DL/Sp/UL sets may be notified from the base station 100 (MeNB) to the mobile station 200 using upper layer signaling such as radio resource control (RRC) or the like. In a case of using upper layer signaling, the mobile station 200 repeatedly (cyclically) uses the notified DL/Sp/UL set assignment, since assignment of subframes cannot be frequently updated. For example, in a case of notifying in four-frame units as in the operation example illustrated in FIG. 13 or FIG. 14, the number of bits necessary for notifying is the same as the number of DL/Sp/UL sets included in the four frames. For example, the number of bits necessary of instructing assignment of subframes is 16 in the case of Config#1 illustrated in FIG. 13 (16 sets), and is eight in the case Config#2 (eight sets). In this case, subframes assigned to each base station are instructed in each bit with MeNB as "0" and SeNB as "1" (or vice versa).

For example, the 16 bits representing the assignment instruction of DL/Sp/UL sets (i.e., eNB assignment information) is "1111011001101111" in the operation example illustrated in FIG. 13. The eight bits representing the assignment instruction of DL/Sp/UL sets (eNB assignment information) is "11010111" in the operation example illustrated in FIG. 14. Additionally, multiple DL/Sp/UL sets may be handled as a single set to reduce the number of bits necessary for assignment instruction.

Setting Guard Period

Next, the guard period, which becomes necessary in a case where the base station communicating with the mobile station 200 is switched between the base station 100 (MeNB) and the base station 300 (SeNB) will be described in detail. The base station 100 (or more particularly, the signal assigner 105 and signal separator 108 thereof) identifies at which subframe the base station will be switched, based on the assignment of DL/Sp/UL sets indicated in the eNB assignment information. In the same way, the base station 300 (or more particularly, the signal assigner 305 and signal separator 308 thereof) identifies at which subframe the base station will be switched. Similarly, the mobile station 200 (or more particularly, the signal separator 202 and signal assignment unit 209 thereof) identifies at which subframe the base station will be switched. The base stations 100 and 300, and the mobile station 200, further determine whether or not short format is necessary, based on the subframe at the time of switching base stations, the guard period, and the TA of the base stations. In a case where short format is necessary, the base stations 100 and 300 and the mobile station 200 decide the number of symbols to reduce.

The method of determining whether or not short format is necessary at the timing of switching the base station communicating with the mobile station 200, and the method of deciding the number of symbols to be reduced in a case where short format is necessary, will be described. In the following description, a case will be assumed where the TA between the base station 100 (MeNB) and the mobile station 200 (hereinafter referred to as "TA of MeNB") is longer than the TA between the base station 300 (SeNB) and the mobile station 200 (hereinafter referred to as "TA of SeNB"). The following cases (1) through (5) will be described in order.

(1) The base station communicating with the terminal is switched at the timing of switching from a UL subframe to a DL subframe (UL to DL).

(2) The base stations are switched at the timing of switching from a UL subframe to a UL subframe (UL to UL).

(3) The base stations are switched at the timing of switching from a DL subframe to a DL subframe (DL to DL).

(4) The base stations are switched at the timing of switching from a DL subframe to a special subframe (DL to Sp).

(5) The base stations are switched at the timing of switching from a special subframe to a UL subframe (Sp to UL).

(1) UL to DL (FIGS. 15A and 15B)

FIG. 15A illustrates a case of switching from the MeNB to the SeNB, and FIG. 15B illustrates a case of switching from the SeNB to the MeNB. In a case of switching the base station communicating with the mobile station 200 at the timing of switching from a UL subframe to a DL subframe, a period during which the mobile station 200 does not transmit/receive is set as follows. A value obtained by halving the total value of the TA of the MeNB and the TA of the SeNB (i.e., the sum of half of the TA of the MeNB and half of the value of the TA of the SeNB) is set as the period during which the mobile station 200 does not transmit/receive.

That is to say, in a case where the guard period can be contained within the period during which the mobile station 200 does not transmit/receive, the switching processing of bases at the mobile station 200 can be completed within this period, so short format is unnecessary. Accordingly, whether or not short format is necessary is determined according to the following expressions.

Case where short format is unnecessary guard period≤(MeNB TA+SeNB TA)/2

Case where short format is necessary guard period>(MeNB TA+SeNB TA)/2

That is to say, in a case where the guard period (time necessary for switching processing of the base stations) is not greater than half of the total value of the TA of the MeNB and the Ta of the SeNB, no symbols within the subframe immediately before switching base stations and the subframe immediately after switching are reduced. On the other hand, in a case where the guard period is greater than half of the total value of the TA of the MeNB and the Ta of the SeNB, symbols within the subframe immediately before switching base stations or the subframe immediately after switching are reduced (i.e., short format is set).

The number of symbols reduced from a short format subframe in a case where short format is necessary is determined according to the expression number of symbols to be reduced=Ceil {(guard period−(MeNB TA+SeNB TA)/2)/symbol length} where Ceil{ } is a ceiling function. That is to say, symbols of an amount corresponding to the duration of the guard period exceeding the period during which the mobile station 200 does not transmit/receive are reduced.

When switching base stations at the timing of switching from a UL subframe to a DL subframe, OFDM symbols are reduced as follows. SC-FDMA symbols located at the end of the UL signal (UL subframe), or OFDM symbols located at the head of the DL signal (DL subframe), are reduced.

Figure 16B:
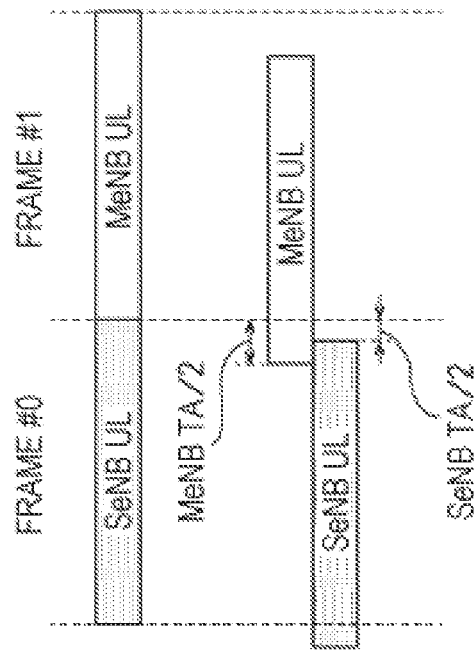
FIGS. 16A and 16B are diagrams illustrating eNB switching timing according to the first embodiment of the present disclosure (UL to UL)
Figure 16A:
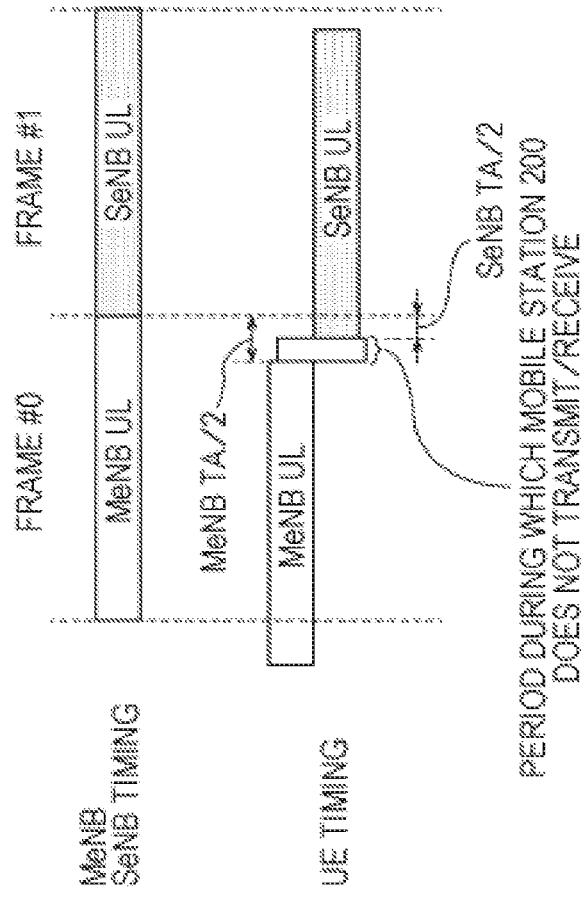

(2) UL to UL (FIGS. 16A and 16B)

FIG. 16A illustrates a case of switching from the MeNB to the SeNB, and FIG. 16B illustrates a case of switching from the SeNB to the MeNB. In a case of switching the base station communicating with the mobile station 200 at the timing of switching from a UL subframe of the MeNB to a UL subframe of the SeNB, a period during which the mobile station 200 does not transmit/receive is set as follows, as illustrated in FIG. 16A. A value obtained by halving the total value of the TA of the MeNB and the TA of the SeNB (i.e., the difference between half of the TA of the MeNB and half of the value of the TA of the SeNB) is set as the period during which the mobile station 200 does not transmit/receive. The TA of the MeNB is longer than the TA of the SeNB, which enables the above-described settings.

That is to say, in a case where the guard period can be contained within the period during which the mobile station 200 does not transmit/receive, the switching processing of base stations at the mobile station 200 can be completed within this period, so short format is unnecessary. Accordingly, whether or not short format is necessary is determined according to the following expressions.

Case where short format is unnecessary guard period≤(MeNB TA−SeNB TA)/2

Case where short format is necessary guard period>(MeNB TA−SeNB TA)/2

That is to say, in a case where the guard period is not greater than half of the total value of the TA of the MeNB and the TA of the SeNB, no symbols within the subframes at the time of switching are reduced. On the other hand, in a case where the guard period is greater than half of the total value of the TA of the MeNB and the TA of the SeNB, symbols within the subframes at the time of switching base stations are reduced.

The number of symbols reduced from a short format subframe in a case where short format is necessary is determined according to the expression number of symbols to be reduced=Ceil {(guard period−½(MeNB TA−SeNB TA))/symbol length}.

On the other hand, when switching base stations at the timing of switching from a UL subframe of the SeNB to a UL subframe of the MeNB, there is no period in which the mobile station 200 does not transmit/receive. The reason is that the TA of the MeNB is longer than the TA of the SeNB, as illustrated in FIG. 16B. Accordingly, the short format is always necessary. The number of symbols reduced from a short format subframe is determined according to the expression number of symbols to be reduced=Ceil {(guard period+(MeNB TA−SeNB TA)/2)/symbol length}.

OFDM symbols are reduced as follows when switching base stations at the timing of switching from a UL subframe to a UL subframe. SC-FDMA symbols located at the end of the UL signal (UL subframe) before switching, or SC-FDMA symbols located at the head of the UL signal (UL subframe) after switching, are reduced.

Figure 17A:
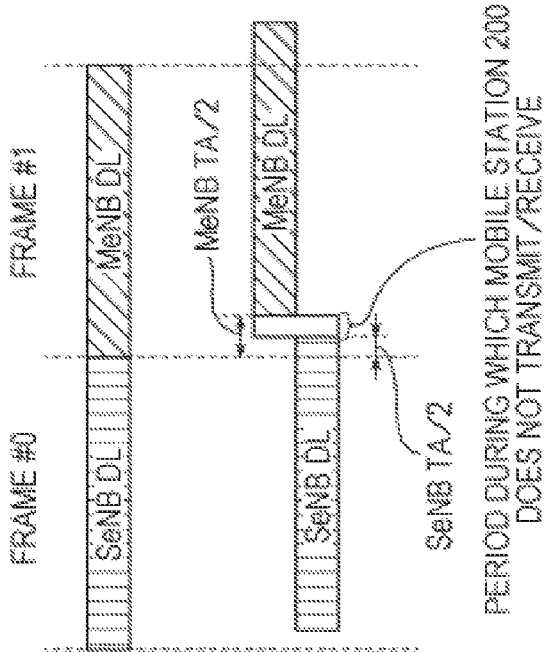
FIGS. 17A and 17B are diagrams illustrating eNB switching timing according to the first embodiment of the present disclosure (DL to DL)
Figure 17B:
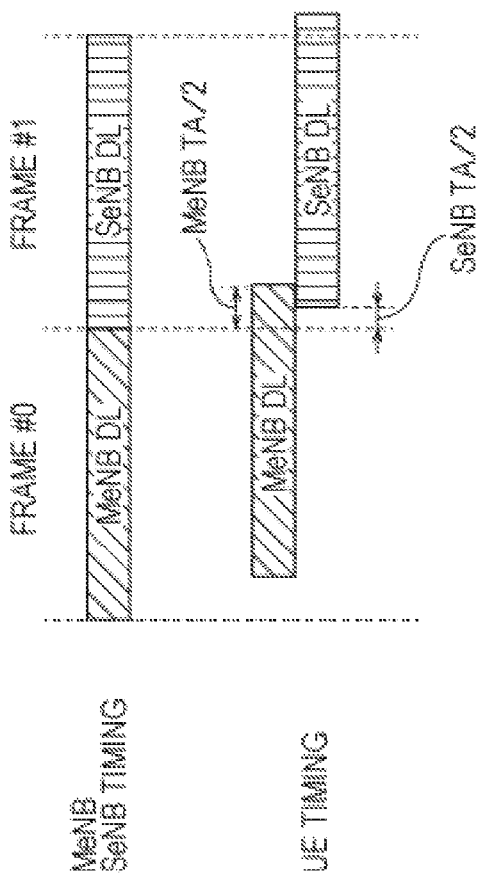

(3) DL to DL (FIGS. 17A and 17B)

FIG. 17A illustrates a case of switching from the MeNB to the SeNB, and FIG. 17B illustrates a case of switching from the SeNB to the MeNB. When switching the base station communicating with the mobile station 200 at the timing of switching from a DL subframe of the MeNB to a DL subframe of the SeNB, there is no period in which the mobile station 200 does not transmit/receive, as illustrated in FIG. 17A. The reason is that the TA of the MeNB is longer than the TA of the SeNB. Accordingly, the short format is always necessary. The number of symbols reduced from a short format subframe is determined according to the expression number of symbols to be reduced=Ceil {(guard period+(MeNB TA−SeNB TA)/2)/symbol length}.

On the other hand, in a case of switching base stations at the timing of switching from a DL subframe of the SeNB to a DL subframe of the MeNB, a period during which the mobile station 200 does not transmit/receive is set as follows, as illustrated in FIG. 17B. A value obtained by halving the total value of the TA of the MeNB and the TA of the SeNB (i.e., the difference between half of the TA of the MeNB and half of the value of the TA of the SeNB) is set as the period during which the mobile station 200 does not transmit/receive. The TA of the MeNB is longer than the TA of the SeNB, which enables the above-described settings.

That is to say, in a case where the guard period can be contained within the period during which the mobile station 200 does not transmit/receive, the switching processing of bases at the mobile station 200 can be completed within this period, so short format is unnecessary. Accordingly, whether or not short format is necessary is determined according to the following expressions.

Case where short format is unnecessary guard period≤(MeNB TA−SeNB TA)/2

Case where short format is necessary guard period>(MeNB TA−SeNB TA)/2

That is to say, in a case where the guard period is not greater than half of the total value of the TA of the MeNB and the Ta of the SeNB, no symbols within the subframes at the time of switching base stations are reduced. On the other hand, in a case where the guard period is greater than half of the total value of the TA of the MeNB and the Ta of the SeNB, symbols within the subframes at the time of switching base stations are reduced.

The number of symbols reduced from a short format subframe in a case where short format is necessary is determined according to the expression number of symbols to be reduced=Ceil {(guard period−½(MeNB TA−SeNB TA))/symbol length}.

When switching base stations at the timing of switching from a DL subframe to a DL subframe, OFDM symbols located at the end of the DL signal (DL subframe or special subframe) before switching, or OFDM symbols located at the head of the DL signal (DL subframe or special subframe) after switching, are reduced.

Figure 18A:
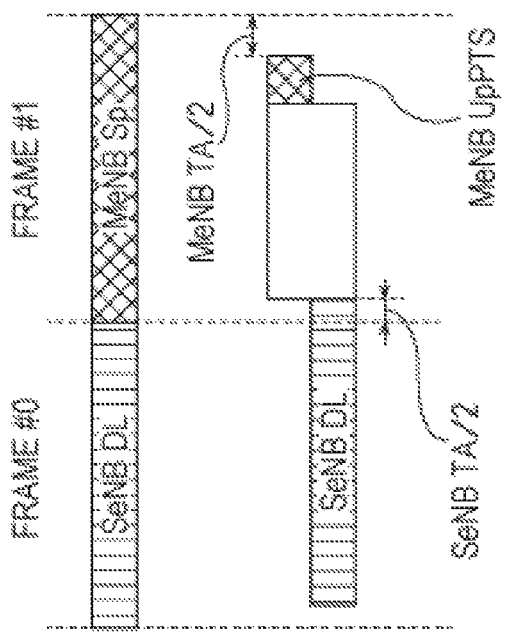
FIGS. 18A and 18B are diagrams illustrating eNB switching timing according to the first embodiment of the present disclosure (DL to Sp)
Figure 18B:
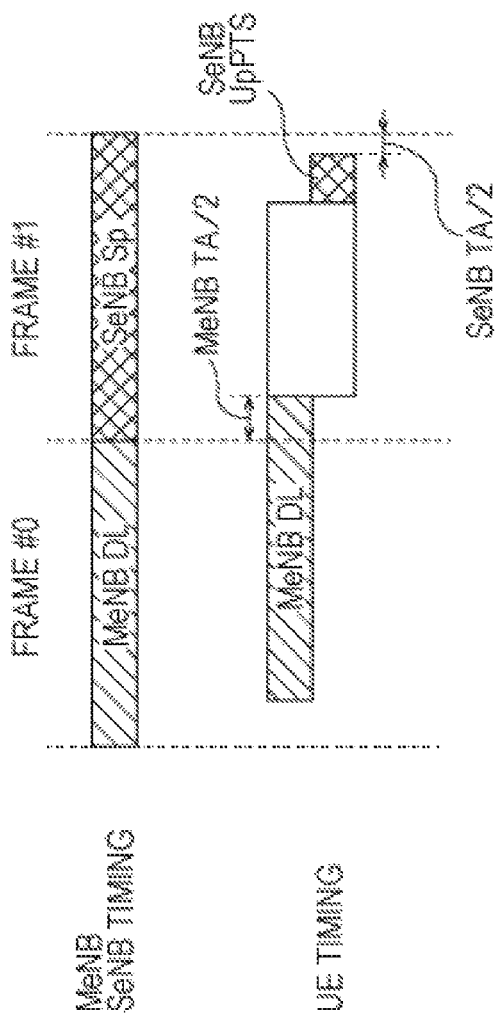

(4) DL to Sp (FIGS. 18A and 18B)

FIG. 18A illustrates a case of switching from the MeNB to the SeNB, and FIG. 18B illustrates a case of switching from the SeNB to the MeNB. When switching the base station communicating with the mobile station 200 at the timing of switching from a DL subframe to a special subframe, operations the same as in (3) described above can be applied. That is to say, operations the same as those of switching at the timing of switching from a DL subframe to a DL subframe (FIGS. 17A and 17B) can be applied. Note, however, that a guard period is secure here, as illustrated in FIGS. 18A and 18B. The guard period is secured for the special subframe by using only Uplink Pilot Time Slot (UpPTS), which is an uplink region, and not using other regions (including downlink region) in FIGS. 18A and 18B. Now, cases where a UpPTS can be transmitted and cases where a UpPTS cannot be transmitted are determined according to the expressions > Case where UpPTS can be transmitted guard period
> 1−(MeNB TA+SeNB TA)/2−UpPTS length
>
> Case where UpPTS cannot be transmitted guard
> period>1−(MeNB TA+SeNB TA)/2−UpPTS
> length where UpPTS length represents the duration of the UpPTS period.

(5) SP to UL (FIGS. 19A and 19B)

FIG. 19A illustrates a case of switching from the MeNB to the SeNB, and FIG. 19B illustrates a case of switching from the SeNB to the MeNB. When switching the base station communicating with the mobile station 200 at the timing of switching from a special subframe to a UL subframe, operations the same as in (2) described above can be applied. That is to say, operations the same as those of switching at the timing of switching from a UL subframe to a UL subframe can be applied. Note, however, that a guard period is secure here, as illustrated in FIGS. 19A and 19B. The guard period is secured for the special subframe by using only Downlink Pilot Time Slot (DwPTS), which is a downlink region, and not using other regions (including uplink region) in FIGS. 19A and 19B. Now, cases where a DwPTS can be transmitted and cases where a DwPTS cannot be transmitted are determined according to the expressions > Case where DwPTS can be transmitted guard period
> 1−(MeNB TA+SeNB TA)/2−DwPTS length
>
> Case where DwPTS cannot be transmitted guard
> period>1−(MeNB TA+SeNB TA)/2−DwPTS
> length where DwPTS length represents the duration of the DwPTS period.

The method of determining whether or not short format is necessary at the timing of switching the base station communicating with the mobile station 200, and the method of deciding the number of symbols to be reduced in a case where short format is necessary, have been described so far. Now, a cyclic prefix (CP) included in each symbol may be used as a guar period. In this case, the period during which the mobile station 200 does not transmit/receive+the CP length can be allocated to the guard period. That is to say, in a case where the guard period can be contained within this (period during which the mobile station 200 does not transmit/receive+CP length), the short format is unnecessary. Also, even in a case where the short format is used, the number of symbols to be reduced from the short format subframe can be further lessened as compared a case where the CP is not used.

As described above, the short format where the number of SC-FDMA symbols that the mobile station 200 transmits, or the number of OFDM symbols that the mobile station 200 receives, has been reduced, is used to secure a guard period at the time of switching base stations. Note however, that in the present embodiment, determining whether or not short format is necessary and the number of symbols to be reduced in the short format, are decided based on the Ta of the MeNB, the TA of the SeNB, and the subframes at the time of switching base stations. Specifically, the base stations 100 and 300 and mobile station 200 decide whether or not short format is necessary and the number of symbols to be reduced in the short format, by comparing the period during which the mobile station 200 does not transmit/receive, obtained based on the relationship between the TA of the MeNB and the TA of the SeNB in the subframes at the time of switching base stations, with the guard period.

Thus, according to the present embodiment, the number of symbols to be reduced in the short format can be minimized, by deciding whether or not short format is necessary and the number of symbols to be reduced in the short format based on the TAs and the subframes at the time of switching base stations.

Particularly, Intel discloses switching the base station with which the mobile station communicates, at the timing of switching from a DL subframe to a DL subframe. However, how a guard period is set at the time of switching base stations is not disclosed. According to Intel, at the switching timing from a DL subframe to a DL subframe, whether or not there is a the period during which the mobile station 200 does not transmit/receive depends on the relationship in magnitude of TAs among the base stations, as can be seen from FIGS. 17A and 17B. Conversely, according to the present embodiment, in a case where the base station with which the mobile station communication is to be switched at the timing of switching from a DL subframe to a DL subframe (FIGS. 17A and 17B), whether or not a short format is necessary is determined as follows. In a case where a value obtained by halving the different between the TA of the MeNB and the TA of the SeNB is no greater than the guard period, determination is made that short format is necessary, and in a case where this value is greater than the guard period, determination is made that short format is not necessary. That is to say, a guard period can be suitably set with a minimal number of symbols to be reduced in the short format, even in a case where base stations are switched at the timing of switching from a DL subframe to a DL subframe.

Second Embodiment

A second embodiment differs from the first embodiment with regard to the point that subframes are assigned to the MeNB and SeNB in a frame unit, and the point that the short format is not used.

Configuration of Base Stations 100 and 300 (FIG. 4)

In the same way as in the first embodiment, components of the base station 300 according to the present embodiment are the same as the components of the base station 100 except for the configuration of the eNB assignment information receiver 301. Hereinafter, only the component of the base station 300 that differs from its counterpart in the base station 100 will be described, and description of operations of components the same as those of the base station 100 will be omitted.

The eNB assignment information generator 101 of the base station 100 sets a frame to assign to the MeNB (base station 100) and a frame to assign to the MeNB (base station 300), and generates eNB assignment information including the set frames. The number of bits necessary for the eNB assignment information is one bit per frame.

The eNB assignment information generator 101 outputs the generated eNB information to the error correction encoder 103 as upper layer signaling. The eNB assignment information generator 101 outputs the eNB assignment information to the signal assigner 105 and the signal separator 108 to instruct the base station 100 regarding subframes for transmission/reception. The eNB assignment information generator 101 also notifies the eNB assignment information receiver 301 of the base station 300 (SeNB) of the eNB assignment information. Notification of the eNB assignment information from the base station 100 to the base station 300 is performed by inter-base station interfaces such as X2 interface, Xn interface, S1 interface, or the like, for example.

The eNB assignment information receiver 301 of the base station 300 receives the eNB assignment information that the eNB assignment information generator 101 of the base station 100 has generated. The eNB assignment information receiver 301 outputs the eNB assignment information to the signal assigner 305 and the signal separator 308 to instruct the base station 300 regarding subframes for transmission/reception.

The TA information generator 102 sets a TA in accordance with propagation latency between the base station 100 and the mobile station 200, and generates TA information including the generated TA. The TA information generator 102 also determines whether or not data assignment can be performed with the subframes at the time of switching base stations. For example, the TA information generator 102 whether or not subframes can be assigned, based on the TA between the base station 100 (MeNB) and mobile station 200, the TA between the base station 300 and the mobile station 200, and the subframes at the time of switching between a subframes assigned to the base station 100 and subframes assigned to the base station 300. Specifically, since the short format is not used in the present embodiment, the TA information generator 102 determines that the subframe assignment can be performed in a case where a guard period necessary for the switching processing of base stations can be secured with the subframes at the time of switching base stations, and that the subframe assignment cannot be performed in a case where a guard period cannot be secured. The TA information generator 102 outputs the combination of subframes where subframe assignment cannot be performed to the signal assigner 105 and the signal separator 108.

The signal assigner 105 decides subframes usable for signal assignment, based on the eNB assignment information input from the eNB assignment information generator 101 (the eNB assignment information receiver 301 in the case of the base station 300), and the information input from the TA information generator 102 (subframes which cannot be assigned). The signal assigner 105 then assigns, to the predetermined downlink resource, the modulated signals received from the modulator 104 (data signals or control signals) in the usable subframe.

The signal separator 108 decides subframes usable by the base station 100 itself, based on the eNB assignment information input from the eNB assignment information generator 101 (eNB assignment information receiver 301 in the case of the base station 300), and the information input from the TA information generator 102 (subframes which cannot be assigned). The signal separator 108 then separates, from the reception signals that have been received at the receiver 107, signals of the decided subframes, and outputs the separated signals to the demodulator 109.

Configuration of Mobile Station 200 (FIG. 5)

The signal separator 202 of the mobile station 200 according to the present embodiment decides, from the received signals received from the receiver 201, subframes to be received, based on the eNB assignment information received from the eNB assignment information receiver 205, and information received from the TA information receiver 206 (subframes that cannot be assigned). The signal separator 202 then separates the signals from the base station 100 and the signals from the base station 300 out of the decided subframes, and outputs the separated signals to the demodulator 203.

The eNB assignment information receiver 205 decides a frame to be assigned to the base station 100 (MeNB) and a frame to be assigned to the base station 300 (SeNB), based on the eNB assignment information received from the error correction decoding unit 204. The eNB assignment information receiver 205 then outputs the decided frames to the receiver 201, signal separator 202, signal assignment unit 209, and transmitter 210.

In the same way as with the TA information generator 102, the TA information receiver 206 then determines whether or not data assignment can be performed with the subframes at the time of switching the base stations, based on the TA information received from both the base station 100 and the base station 300. The TA information receiver 206 outputs a combination of subframes regarding which subframe assignment cannot be performed, to the signal separator 202 and signal assignment unit 209.

The signal assignment unit 209 decides subframes that cannot be used, based on the eNB assignment information (frames assigned to the base stations) received from the eNB assignment information receiver 205, and information received from the TA information receiver 206 (subframes that cannot be assigned). The signal assignment unit 209 then assigns the modulated signals (data signals) received from the modulator 208 to downlink resources set beforehand in subframes that can be used, and outputs to the transmitter 210.

Operations of Base Stations 100 and 300 and Mobile Station 200

The operations of the base stations 100 and 300 and mobile station 200, configured as described above, will be described in detail.

Operation Example 1

In the following description, switching processing of the base station communicating with the mobile station 200, between the base station 100 (MeNB) and the base station 300 (SeNB), is performed in a single frame unit (10 msec).

In each of the UL-DL configurations, the timing at which the base station communicating with the mobile station 200 is switched (switching timing) is the timing of switching from a UL subframe to a DL subframe. One reason is that a relatively long period can be secured for the period during which the mobile station 200 does not transmit/receive, which will be described below. In switching from a UL subframe to a DL subframe, the mobile station 200 transmits signals earlier in UL subframes, and receives signals later in subsequent DL, as described with reference to FIGS. 15A and 15B. Accordingly, a relatively long period can be secured as the period during which the mobile station 200 does not transmit/receive, in comparison with other subframe switching (e.g., see FIGS. 16A through 19B).

Note, however, in a case where there are multiple candidates for switching the base stations in a single frame, the timing within the frame of which the DL subframe No. is the smallest is set as the base station switching timing. That is to say, in each of the UL-DL configurations, the timing for switching processing of the base stations is the timing of the DL subframe with the smallest subframe No. out of all switching timings from UL subframes to DL subframes. Accordingly, the timing for switching between the base station 100 (MeNB) and base station 300 (SeNB) differs for each UL-DL configuration. Also, operation example 1 does not use the short format as described above, so in a case that a guard period cannot be secured, transmission/reception is stopped in a frame unit.

In a case where a DL subframe or special subframe by which a UL grant is notified, and a UL subframe by which a PUSCH assigned by this UL grant, span from before switching base stations to after switching base stations, a UL subframe or DL subframe is not used as a subframe for assigning PUSCHs and PDSCHs. This is the same for cases where a DL subframe by which a DL assignment(PDSCH) and a UL subframe by which an ACK/NACK corresponding to this PDSCH is transmitted, span from before switching base stations to after switching base stations. As a result, in Config#0, #1, #2, and #6 (FIGS. 6 through 8 and 12) where multiple DL/Sp/UL set sets are defined in a frame as described in the first embodiment, subframes which are not assigned to the mobile station 200 in a DL/Sp/UL set unit are selected as the above-described subframes that are not used. Details of the subframes not used will be described later.

Operations of switching between the base station 100 (MeNB) and base station 300 (SeNB) for each UL-DL configuration (Config#0 through Config#6) in operation example 1 will be described in detail with reference to FIGS. 20 through 28. Note that "guard period≤½(MeNB TA+SeNB TA" is assumed to be satisfied in the following description. That is to say, the description assumes that a guard period has been secured for the period during which the mobile station 200 does not transmit/receive when switching base stations at the timing of switching from a UL subframe to a DL subframe.

Figure 20:
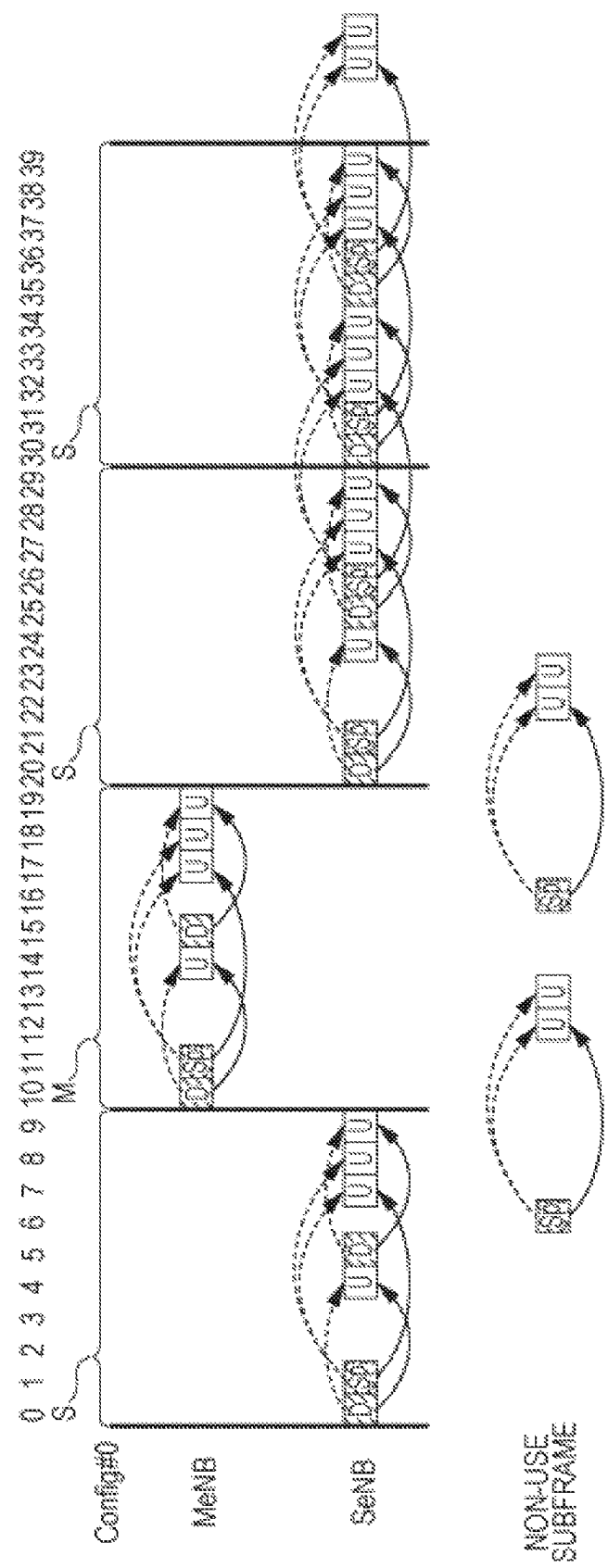
FIG. 20 is a diagram illustrating a resource allocation example for Config#0 according to a second embodiment of the present disclosure (operation example 1)

Config#0 (FIG. 20)

The timings of switching from a UL subframe to a DL subframe in FIG. 20 is as follows. One switching timing is the timing of switching from UL subframe #($10n+9$) (e.g., subframes #9, #19, #29, and #39) to DL subframe #($10n$) (e.g., subframes #0, #10, #20, and #30). Another switching timing is the timing of switching from UL subframe #($10n+4$) (e.g., subframes #4, #14, #24, and #34) to DL subframe #($10n+5$) (e.g., subframes #5, #15, #25, and #35). Note that in the above, n is an integer of 0 or larger (0, 1, 2, 3 . . . ). Of these, the DL subframe #($10n$) that has the smallest DL subframe No. in one frame serves as the timing to switch between the base station 100 (MeNB) and the base station 300 (SeNB). Accordingly, the base station 100 (MeNB, denoted by 'M') and the base station 300 (SeNB, denoted by 'S') are switched in a single frame unit at subframe #($10n$), as illustrated in FIG. 20.

The following DL/Sp/UL sets out of the multiple DL/Sp/UL sets in FIG. 20 span a frame before switching base stations and a frame after switching, and accordingly are not used. A DL/Sp/UL set here is multiple subframes correlated by and DL assignment(PDSCH)-HARQ ACK timing. The DL/Sp/UL sets spanning a frame before switching base stations and a frame after switching are made up of subframe #($10n+6$) in a certain frame, and subframes #($10n+12$) and #($10n+13$) in the subsequent frame. These are subframes #6, #12, and #13, and subframes #16, #22, and #23, in FIG. 20. These subframes are subframes not used with regard to the mobile station 200 (Non-use subframe). The combination of these subframes corresponds to Set 4 of the DL/Sp/UL sets in FIG. 6.

That is to say, of the DL/Sp/UL sets illustrated in FIG. 6, Set 4 is not assigned to the mobile station 200 in operation example 1. Note however, that in a case where consecutive frames are assigned to the same base station (subframes #20 through #39 in FIG. 20), no switching of base stations is performed during these frames. Accordingly, Set 4 (subframes #26, #32, and #33, and subframes #36, #42, and #43, in FIG. 20) can also be assigned to the mobile station 200.

Figure 21:
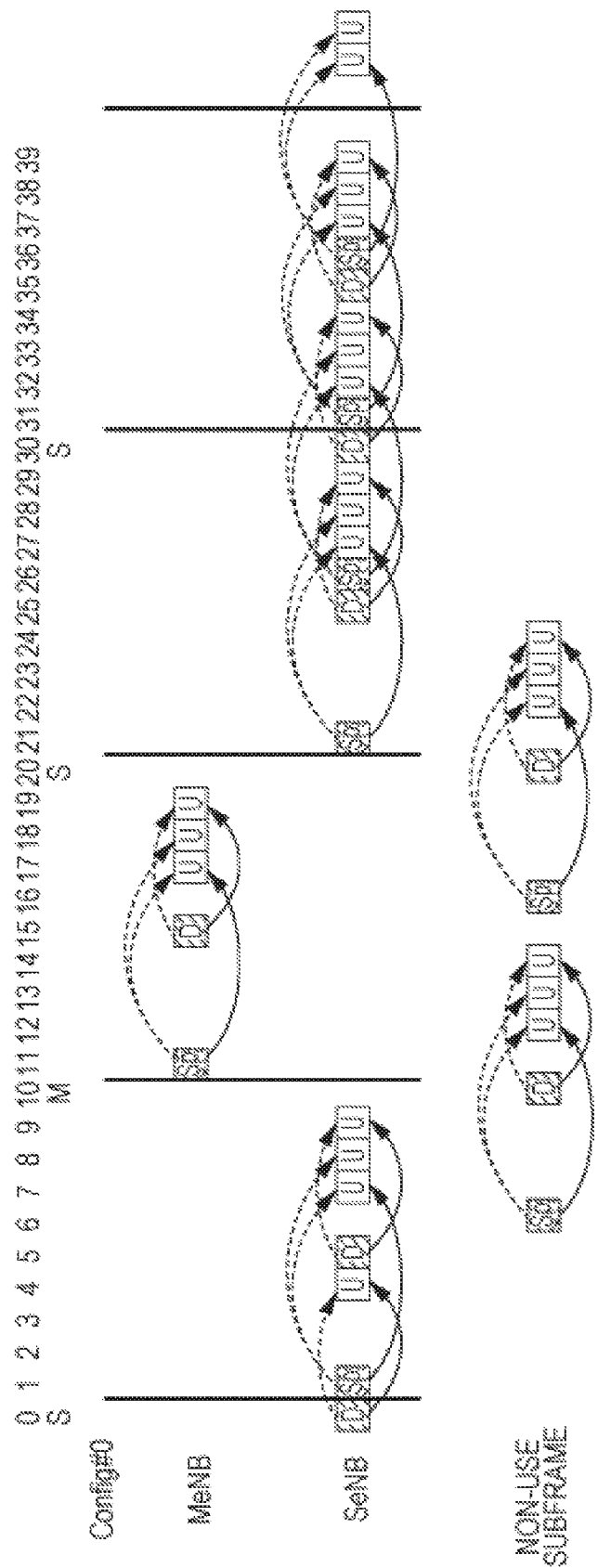
FIG. 21 is a diagram illustrating another resource allocation example for Config#0.

As described above, the base station communicating with the terminal is switched at the timing of switching from UL subframes to DL subframes in operation example 1. In comparison, FIG. 21 illustrates an example of a case where the base station communicating with the terminal is switched at the timing of switching from a DL subframe to a special subframe. There are many cases in FIG. 21 where a DL subframe by which a UL grant is notified, and a UL subframe by which the PUSCH assigned by this UL grant is transmitted, span from before switching base stations to after switching base stations. There also is an undesirable increase in cases where a DL subframe by which a DL assignment(PDSCH) is notified, and a UL subframe by which the ACK/NACK as to this PDSCH, span from before switching base stations to after switching base stations. As a result, the arrangement in FIG. 21 has more subframes that cannot be used in comparison with the operation example 1. In other words, the operation example 1 can suppress increase in the number of unusable subframes.

Figure 22:
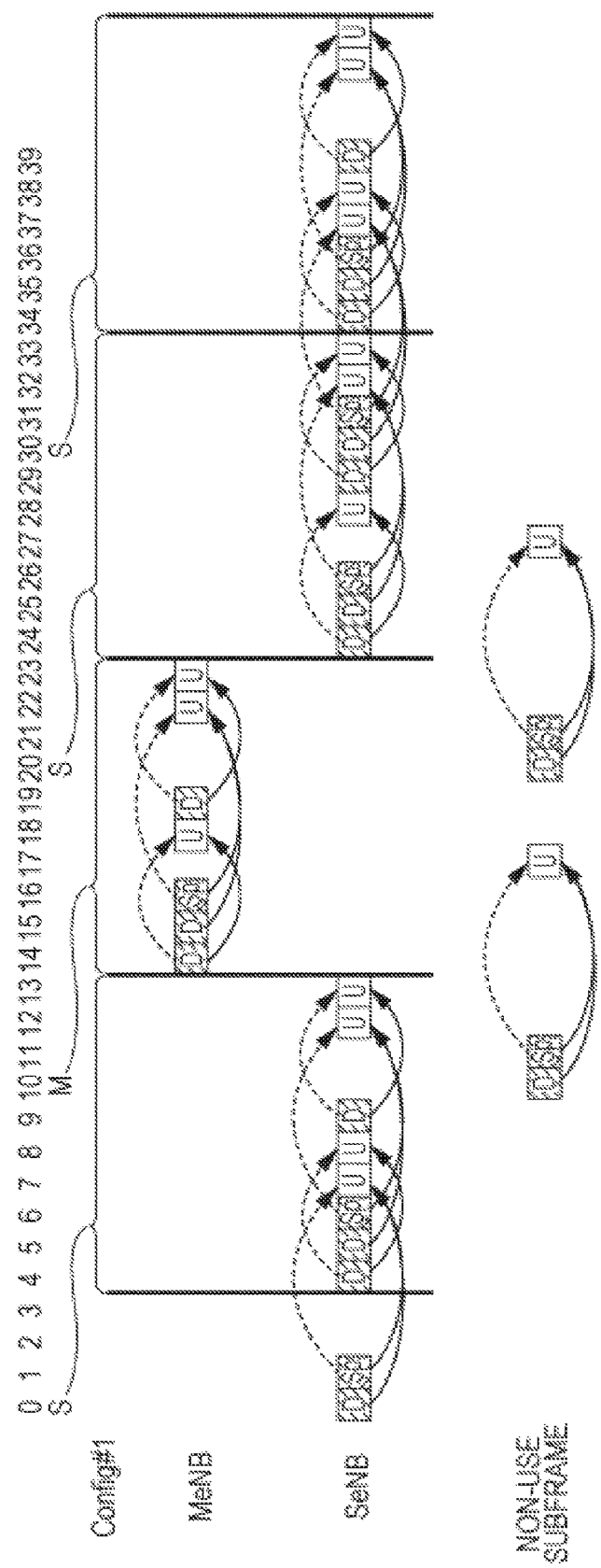
FIG. 22 is a diagram illustrating a resource allocation example for Config#1 according to the second embodiment of the present disclosure (operation example 1)

Config#1 (FIG. 22)

The timings of switching from a UL subframe to a DL subframe in FIG. 22 is as follows. One switching timing is the timing of switching from UL subframe #($10n+3$) (e.g., subframes #3, #13, #23, and #33) to DL subframe #($10n+4$) (e.g., subframes #4, #14, #24, and #34). Another switching timing is the timing of switching from UL subframe #($10n+8$) (e.g., subframes #8, #18, #28, and #38) to DL subframe #($10n+9$) (e.g., subframes #9, #19, #29, and #39). Of these, the DL subframe #($10n+4$) that has the smallest DL subframe No. in one frame serves as the timing to switch between the base station 100 (MeNB) and the base station 300 (SeNB). Accordingly, the base station 100 (MeNB, denoted by 'M') and the base station 300 (SeNB, denoted by 'S') are switched in a single frame unit at subframe #($10n+4$), as illustrated in FIG. 22.

The following DL/Sp/UL sets out of the multiple DL/Sp/UL sets in FIG. 22 span a frame before switching base stations and a frame after switching, and accordingly are not used. The DL/Sp/UL sets spanning a frame before switching base stations and a frame after switching are made up of subframe #($10n$), #($10n+1$), and #($10n+7$) in FIG. 22. These are subframes #10, #11, and #17, and subframes #20, #21, and #27, in FIG. 22. These subframes are subframes not used with regard to the mobile station 200. The combination of these subframes corresponds to Set 1 of the DL/Sp/UL sets in FIG. 7.

That is to say, of the DL/Sp/UL sets illustrated in FIG. 7, Set 1 is not assigned to the mobile station 200 in operation example 1. Note however, that in a case where consecutive frames are assigned to the same base station (subframes #24 through #43 in FIG. 22), no switching of base stations is performed during these frames. Accordingly, Set 1 (subframes #30, #31, and #37 in FIG. 22) can also be assigned to the mobile station 200.

Figure 23:
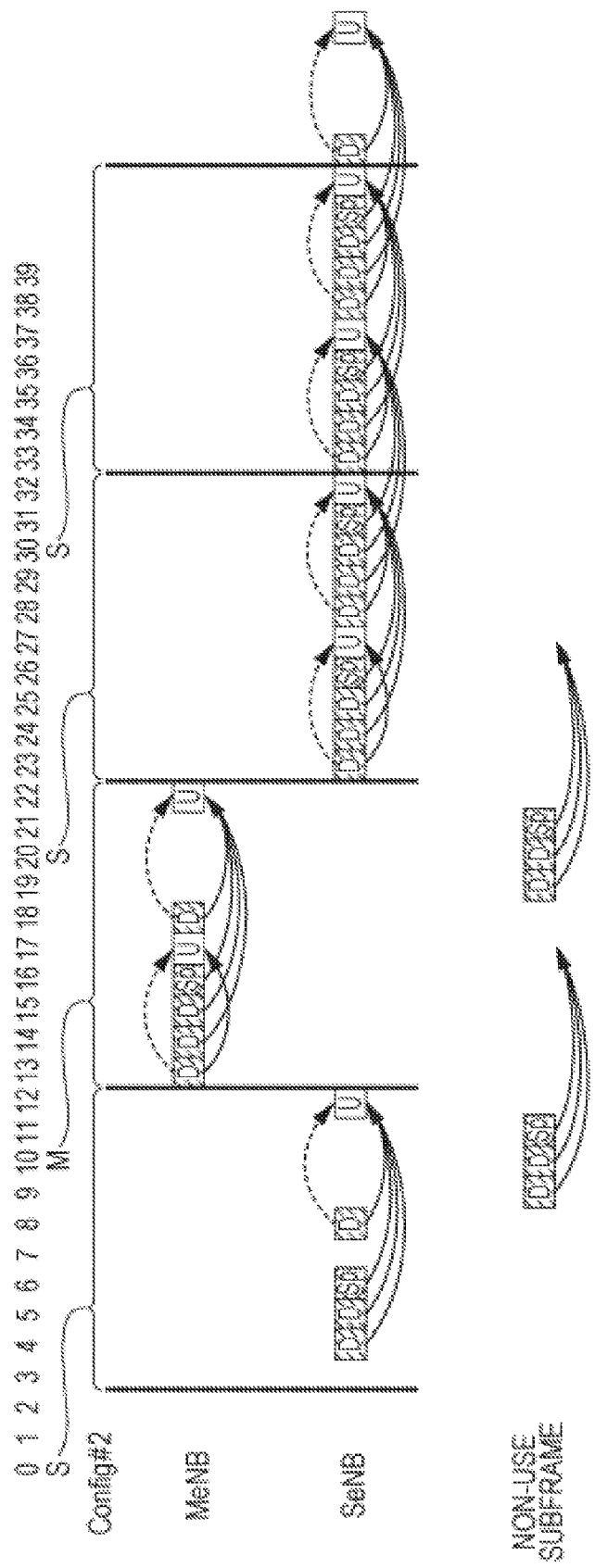
FIG. 23 is a diagram illustrating a resource allocation example for Config#2 according to the second embodiment of the present disclosure (operation example 1)

Config#2 (FIG. 23)

The timings of switching from a UL subframe to a DL subframe in FIG. 23 is as follows. One switching timing is the timing of switching from UL subframe #($10n+2$) to DL subframe #($10n+3$). Another switching timing is the timing of switching from UL subframe #($10n+7$) to DL subframe #($10n+8$). Of these, the DL subframe #($10n+3$) that has the smallest DL subframe No. in one frame serves as the timing to switch between the base station 100 (MeNB) and the base station 300 (SeNB). Accordingly, the base station 100 (MeNB, denoted by 'M') and the base station 300 (SeNB, denoted by 'S') are switched in a single frame unit at subframe #($10n+3$), as illustrated in FIG. 23.

The following DL/Sp/UL sets out of the multiple DL/Sp/UL sets in FIG. 23 span a frame before switching base stations and a frame after switching, and accordingly are not used. The DL/Sp/UL sets spanning a frame before switching base stations and a frame after switching are made up of subframe #(10n+9) in a certain frame, and subframes #(10n+10), #(10n+11), and #(10n+17) in the subsequent frame in FIG. 23. These are DL subframes #9, #10, #11, and UL subframe #17, and DL subframes #19, #20, #21, and UL subframe #27, in FIG. 23.

However, of these subframes, the UL subframes #17 and #27 are also correlated with other DL subframes #13 and #23 by UL grant-PUSCH timing and DL assignment (PDSCH)-HARQ ACK timing. Additionally, the DL subframes #13 and #23 are both subframes after switching base stations. That is to say, the subframes #13 and #23 and the subframes #17 and #27 are combinations that do not span from before switching base stations to after switching base stations.

Accordingly, the UL subframes #17 and #27 (subframe #(10n+7)) are handled as subframes with for the mobile station 200 in Config#2, as illustrated in FIG. 23. Accordingly, the DL subframes #9, #10, and #11, and DL subframes #19, #20, and #21 (subframes #(10n+9), #(10n+10), and #(10n+11)) are subframes not used with the mobile station 200. That is to say, in a case where a DL/Sp/UL set spans from before switching base stations to after switching base stations, the multiple subframes contained in that DL/Sp/UL set are not used with the mobile station 200.

Further, in a case where there is a UL subframe belonging to a DL/Sp/UL set in a certain frame after switching of base stations and also there is a DL subframe or special subframe included in the same DL/Sp/UL set and located within the same frame, this UL subframe is used with the mobile station 200. For example, the UL subframe #(10n+7) illustrated in FIG. 23 is used with the mobile station 200. On the other hand, in a case where there is a UL subframe belonging to a DL/Sp/UL set in a certain frame after switching of base stations but there is no DL subframe or special subframe included in the same DL/Sp/UL set and located within the same frame, this UL subframe is not used with the mobile station 200. For example, the UL subframes #(10n+12) and #(10n+22) in Config#0 are not used with the mobile station 200.

The combination of these DL subframes #9, #10, and #11, and DL subframes #19, #20, and #21, illustrated in FIG. 23, that are not used with the mobile station 200, corresponds to part of Set 2 of the DL/Sp/UL sets in FIG. 8.

That is to say, of the DL/Sp/UL sets illustrated in FIG. 8, part of Set 2 is not assigned to the mobile station 200 in operation example 1. Note however, that in a case where consecutive frames are assigned to the same base station, no switching of base stations is performed during these frames, so part of Set 2 can also be assigned to the mobile station 200. For example, subframes #23 through #42 are assigned to the same base station, so the subframes #29, #30, and #31, which are part of Set 2, can also be assigned to the mobile station 200.

Figure 24:
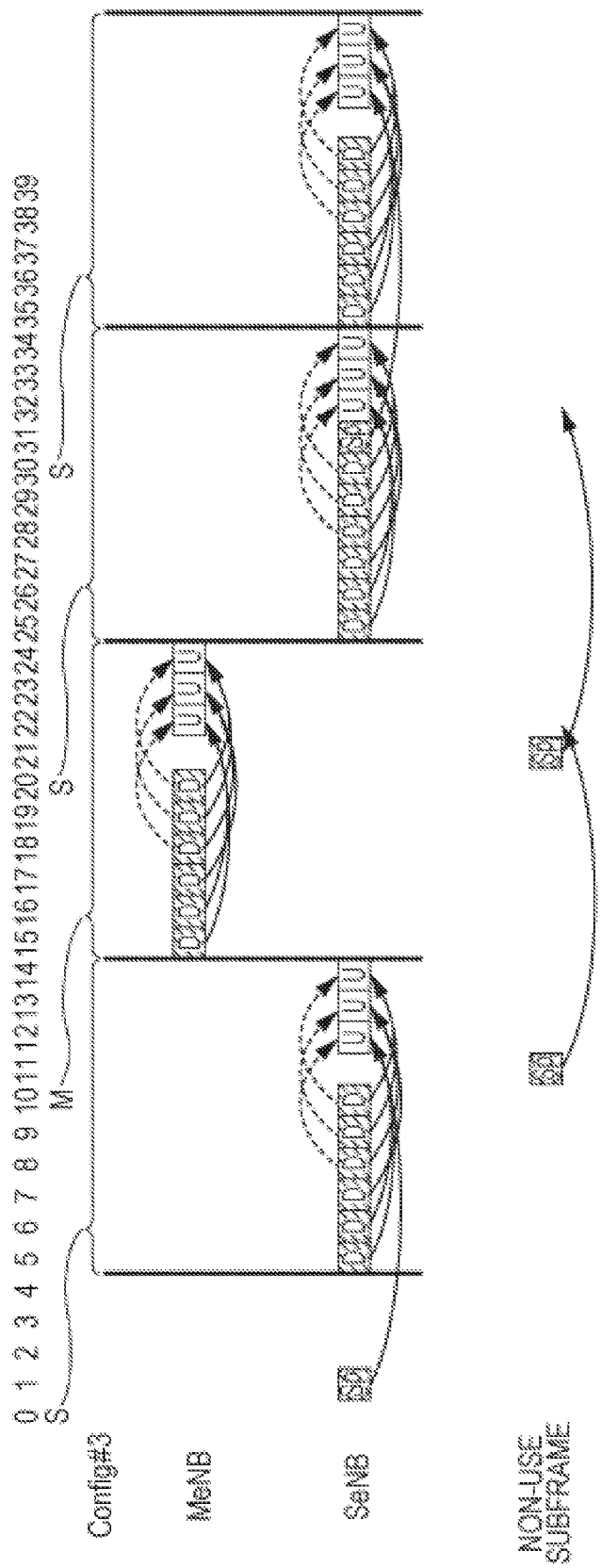
FIG. 24 is a diagram illustrating a resource allocation example for Config#3 according to the second embodiment of the present disclosure (operation example 1)

Config#3 (FIG. 24)

The timings of switching from a UL subframe to a DL subframe in FIG. 24 is from UL subframe #(10n+4) to DL subframe #(10n+5). Accordingly, the base station 100 (MeNB, denoted by 'M') and the base station 300 (SeNB, denoted by 'S') are switched in a single frame unit at DL subframe #(10n+5), as illustrated in FIG. 24.

The following DL/Sp/UL sets out of the multiple DL/Sp/UL sets in FIG. 24 span a frame before switching base stations and a frame after switching, and accordingly are not used. The DL/Sp/UL sets spanning a frame before switching base stations and a frame after switching are made up of subframe #(10n+1) in a certain frame, and subframe #(10n+12) in the subsequent frame in FIG. 24. These are special subframe #11 and UL subframe #22, and special subframe #21 and UL subframe #32, in FIG. 24.

However, of these subframes, the UL subframes #22 and #32 are also correlated with other DL subframes #15, #16, and #18, and DL subframes #25, #26, and #28, by UL grant-PUSCH timing and DL assignment(PDSCH)-HARQ ACK timing. Additionally, the above DL subframes are all subframes after switching base stations. That is to say, the subframes #15, #16, #18, and #22 and the subframes #25, #26, #28, and #32, are combinations that do not span from before switching base stations to after switching base stations.

Accordingly, the UL subframes #22 and #32 (subframe #(10n+2)) are handled as subframes with the mobile station 200 in Config#3, as illustrated in FIG. 24. Accordingly, the DL subframes #11 and #21 (subframe #(10n+1)) are subframes not used with the mobile station 200 in FIG. 24. Note however, that in a case where consecutive frames are assigned to the same base station (subframes #25 through #44 in FIG. 24), no switching of base stations is performed during these frames, so subframe #(10+1) (subframe #31 in FIG. 24) can also be assigned to the mobile station 200.

Figure 25:
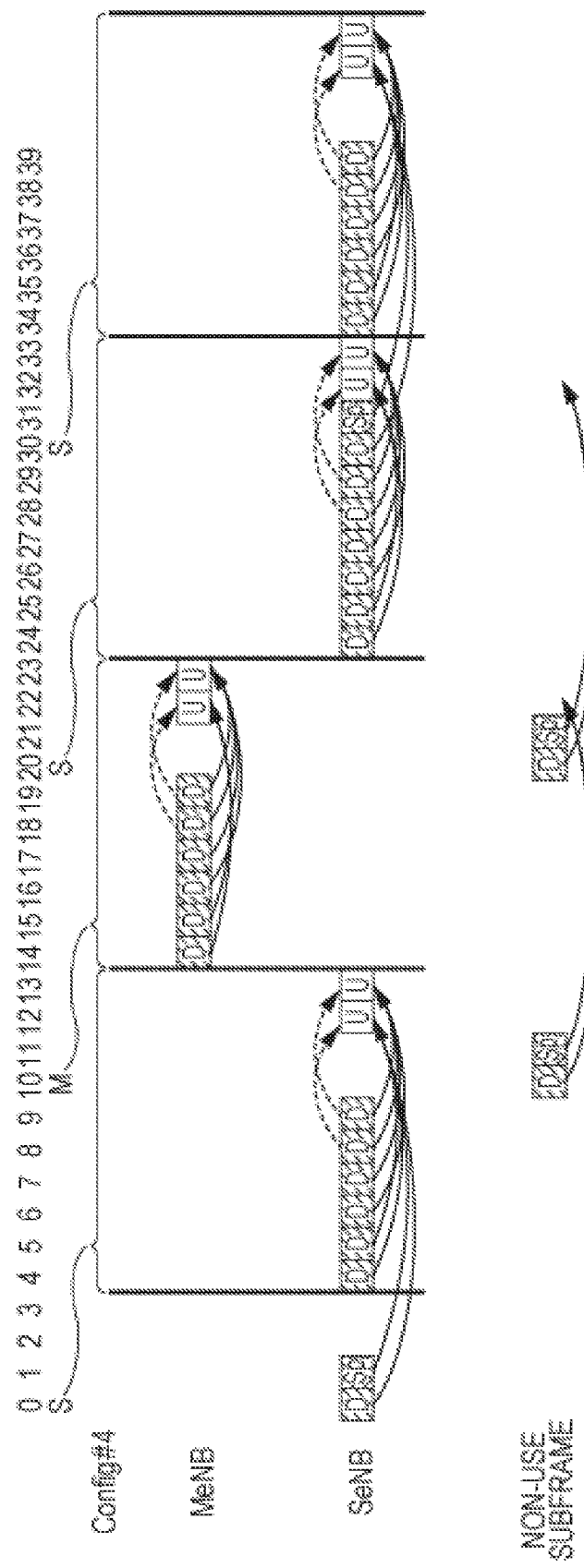
FIG. 25 is a diagram illustrating a resource allocation example for Config#4 according to the second embodiment of the present disclosure (operation example 1)

Config#4 (FIG. 25)

The timings of switching from a UL subframe to a DL subframe in FIG. 25 is from UL subframe #(10n+3) to DL subframe #(10n+4). Accordingly, the base station 100 (MeNB, denoted by 'M') and the base station 300 (SeNB, denoted by 'S') are switched in a single frame unit at subframe #(10n+4), as illustrated in FIG. 25.

The following DL/Sp/UL sets out of the multiple DL/Sp/UL sets in FIG. 25 span a frame before switching base stations and a frame after switching, and accordingly are not used. The DL/Sp/UL sets spanning a frame before switching base stations and a frame after switching are made up of subframes #(10n) and #(10n+1) in a certain frame, and subframe #(10n+12) in the subsequent frame in FIG. 25. These are DL subframes #10 and #11 and UL subframe #22, and DL subframes #20 and #21 and UL subframe #32, in FIG. 25.

However, of these subframes, the UL subframes #22 and #32 are also correlated with other DL subframes #14, #15, and #18, and DL subframes #24, #25, and #28, by UL grant-PUSCH timing and DL assignment(PDSCH)-HARQ ACK timing, in the same way as with Config#2 and Config#3. Additionally, the above DL subframes are all subframes after switching base stations. That is to say, the subframes #14, #15, #18, and #22 and the subframes #24, #25, #28, and #32, are combinations that do not span from before switching base stations to after switching base stations.

Accordingly, the UL subframes #22 and #32 (subframe #(10n+2)) are handled as subframes with the mobile station 200 in Config#4, as illustrated in FIG. 25. Accordingly, the DL subframes #10, #11, #20, and #21 (subframes #(10n) and #(10n+1)) are subframes not used with the mobile station 200 in FIG. 25. Note however, that in a case where consecutive frames are assigned to the same base station (subframes #24 through #43 in FIG. 25), no switching of base stations is performed during these frames, so subframes #(10n) and #(10+1) (subframes #30 and #31 in FIG. 25) can also be assigned to the mobile station 200.

Figure 26:
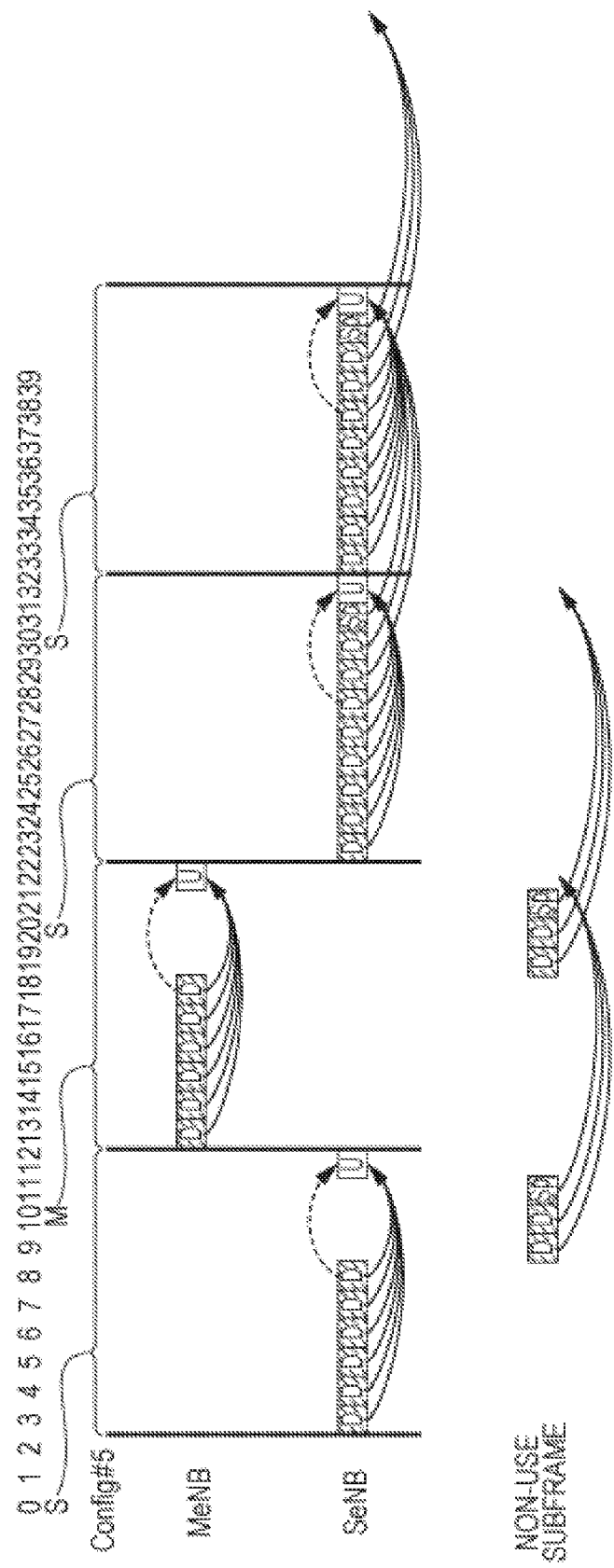
FIG. 26 is a diagram illustrating a resource allocation example for Config#5 according to the second embodiment of the present disclosure (operation example 1)

Config#5 (FIG. 26)

The timings of switching from a UL subframe to a DL subframe in FIG. 26 is from UL subframe #(10n+2) to DL subframe #(10n+3). Accordingly, the base station 100 (MeNB, denoted by 'M') and the base station 300 (SeNB, denoted by 'S') are switched in a single frame unit at DL subframe #(10n+3), as illustrated in FIG. 26.

The following DL/Sp/UL sets out of the multiple DL/Sp/UL sets in FIG. 26 span a frame before switching base stations and a frame after switching, and accordingly are not used. The DL/Sp/UL sets spanning a frame before switching base stations and a frame after switching are made up of subframe #(10n+9) in a certain frame, subframes #(10n+10) and #(10n+11) in the subsequent frame, and subframe #(10n+22) in yet one more subsequent in FIG. 26. These are DL subframes #9, #10, and #11, and UL subframe #22, and DL subframes #19, #20, and #21, and UL subframe #32, in FIG. 26.

However, of these subframes, the UL subframes #22 and #32 are also correlated with other DL subframes #13 through #18, and DL subframes #23 through #28, by UL grant-PUSCH timing and DL assignment(PDSCH)-HARQ ACK timing, in the same way as with Config#2 through Config#4. Additionally, the above DL subframes are all subframes after switching base stations. That is to say, the subframes #13 through #18 and #22 and the subframes #23 through #28 and #32 are combinations that do not span from before switching base stations to after switching base stations.

Accordingly, the UL subframes #22 and #32 (subframe #(10n+2)) are handled as subframes with the mobile station 200 in Config#5, as illustrated in FIG. 26. Accordingly, the DL subframes #9, #10, #11, #19, #20, and #21 (subframes #(10n+9) through #(10n+11)) are subframes not used with the mobile station 200 in FIG. 26. Note however, that in a case where consecutive frames are assigned to the same base station (subframes #23 through #42 in FIG. 26), no switching of base stations is performed during these frames, so subframes #(10n+9) through #(10+11) (subframes #29 through #31 in FIG. 26) can also be assigned to the mobile station 200.

Figure 27:
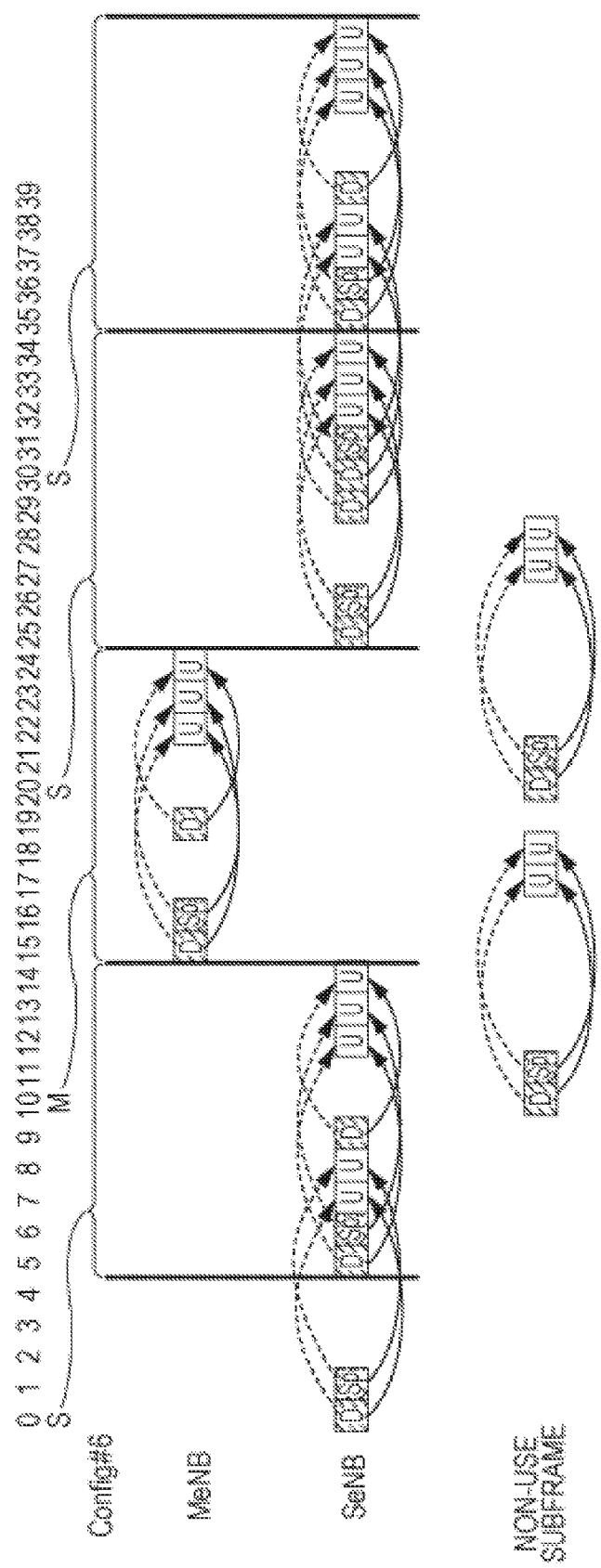
FIG. 27 is a diagram illustrating a resource allocation example for Config#6 according to the second embodiment of the present disclosure (operation example 1)

Config#6 (FIG. 27)

The timings of switching from a UL subframe to a DL subframe in FIG. 27 is from UL subframe #(10n+4) to DL subframe #(10n+5), and from UL subframe #(10n+8) to DL subframe #(10n+9). Of these, the DL subframe #(10n+5), which has the smallest DL subframe No. in one frame is the timing of switching the base station 100 (MeNB) and the base station 300 (SeNB). Accordingly, the base station 100 (MeNB, denoted by 'M') and the base station 300 (SeNB, denoted by 'S') are switched in a single frame unit at subframe #(10n+5), as illustrated in FIG. 27.

The following DL/Sp/UL sets out of the multiple DL/Sp/UL sets in FIG. 27 span a frame before switching base stations and a frame after switching, and accordingly are not used. The DL/Sp/UL sets spanning a frame before switching base stations and a frame after switching are made up of subframes #(10n), #(10n+1), #(10n+7), and #(10n+8) in FIG. 27. These are subframes #10, #11, #17 and #18, and subframes #20, #21, #27, and #28, in FIG. 27. These subframes are not used with the base stations 100 and 300, and the mobile station 200. These subframe combinations are equivalent to Set 1 and Set 2 of the DL/Sp/UL sets illustrated in FIG. 12. Further, of these subframes, the UL subframes #(10n+7) and #(10n+8) have no other DL subframes or special subframes after the base station switching timing (subframe #(10n+5) correlated by UL grant-PUSCH timing and DL assignment(PDSCH)-HARQ ACK timing.

Accordingly, of the DL/Sp/UL sets in FIG. 12, Set 1 and Set 2 are not assigned to the mobile station 200. Note however, that in a case where consecutive frames are assigned to the same base station (subframes #25 through #44 in FIG. 27), no switching of base stations is performed during these frames, so Set 1 and Set 2 (subframes #30, #31, #37, #38 in FIG. 27) can also be assigned to the mobile station 200.

The above has been a description of switching between the base station 100 (MeNB) and base station 300 (SeNB) in each UL-DL configuration (Config#0 through Config#6) in operation example 1. As described above, the base station communicating with the mobile station 200 is switched in a frame unit (10 msec unit or 10 subframe unit). Accordingly, the number of bits necessary for subframe assignment instruction (i.e., eNB assignment information) can be reduced in comparison with the first embodiment (switching in a subframe unit). For example, in a case of notifying in a four frames unit, the number of bits necessary for instructing assignment of subframes is 16 bits or eight bits in Config#1 and #2 in the first embodiment. On the other hand, the number of bits necessary for instructing assignment of subframes is four, regardless of the UL-DL configuration. For example, in the cases of the operation examples illustrated in FIGS. 20 and 22 through 27, the four bits representing the subframe assignment instruction are "1011" where MeNB is "0" and SeNB is "1" (or vice versa) in each bit.

Also, the short format is not used in operation example 1, so the base station 100 and base station 300 can use the same format with the mobile station 200 applying base station switching, as with other mobile stations.

In a case where a DL subframe notifying a UL grant and a UL subframe by which a PUSCH assigned by this UL grant is transmitted span frames before and after switching base stations, a Non-use subframe is generated in operation example 1. A Non-use subframe is a DL subframe or a UL subframe not used for PUSCH or PDSCH. Also, in a case where a DL subframe notifying a DL assignment(PDSCH) and a UL subframe by which an ACK/NACK as to this PDSCH is transmitted span frames before and after switching base stations, a Non-use subframe is generated. However, the base station 100 and base station 300 can effectively use resources by assigning subframes not used with the mobile station 200 (Non-use subframe) to other mobile stations.

In a case where conditions are satisfied, when setting the guard period described in the first embodiment, so that the short format is unnecessary, consecutive subframes may be assigned to different base stations in operation example 1, at not only the switching timing from UL subframe to DL subframe, but also at other switching timings (the "DL to DL", "UL to UL", "DL to Sp", and "Sp to UL", described in the first embodiment). That is to say, the base station communicating with the mobile station 200 can be switched at these timings.

Figure 28:
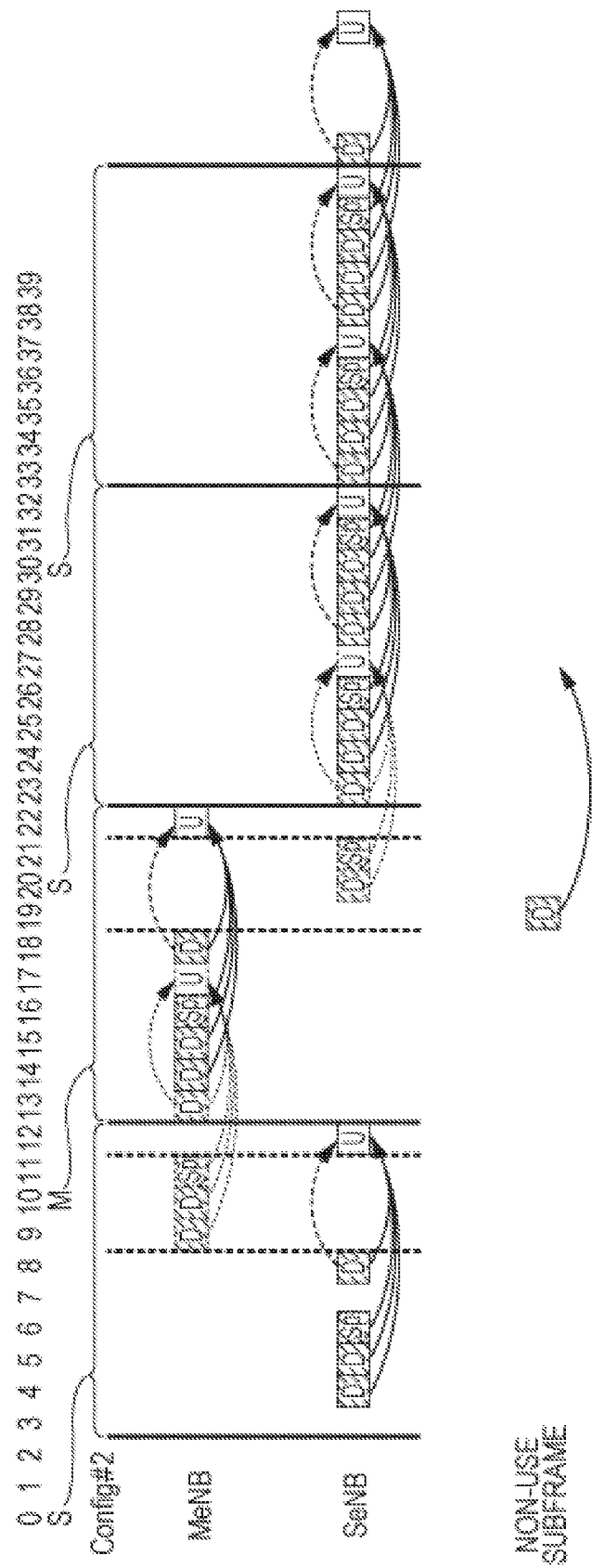
FIG. 28 is a diagram illustrating another resource allocation example according to the second embodiment of the present disclosure (operation example 1)

FIG. 28 illustrates an example in a case where Config#2 has been set to the mobile station 200. Assumption will be made regarding FIG. 28 that the Ta of the MeNB is longer than the TA of the SeNB, in the same way as in the first embodiment, and that the conditions is satisfied that guard period for the switching timing from DL subframe to DL subframe is contained within the period where the mobile station 200 does not transmit/receive (see FIGS. 17B and 16A). The above conditions is $$\text{guard period} \leq \tfrac{1}{2}(\text{MeNB TA} - \text{SeNB TA}).$$

In this case, consecutive subframes can be used at the time of switching from a DL subframe of the SeNB to a DL subframe of the MeNB. Further, consecutive subframes can be used at the time of switching from a UL subframe of the MeNB (UpPTS of a special subframe) to a UL subframe of the SeNB. At this time, the DL assignment(PDSCH)-HARQ ACK timing is referenced, and DL subframes and special subframes are assigned to the base station to which the UL subframe by which the ACK/NACK is transmitted belongs. For example, base stations can be switched at DL subframe #9 and UL subframes #12 and #22. Accordingly, the DL subframes #9 and #10, and special subframe #11, which can be used, are assigned to the base station 100 (MeNB), to which the UL subframe #17 correlated by the DL assignment (PDSCH)-HARQ ACK timing belongs. Accordingly, in this case, a subframe before the timing of switching base stations is assigned to the base station to be switched to, so the mobile station 200 performs operations to tentatively switch the base station at the subframe before the subframe at the timing of switching base stations.

Note that when switching from a DL subframe of the MeNB to a DL subframe of the SeNB, a subframe which cannot be used (subframe #19 in FIG. 28) is necessary to secure the guard period (see FIG. 17A). Also, when switching from a UL subframe of the SeNB (UpPTS of a special subframe) to a UL subframe of the SeNB, a subframe which cannot be used (subframe #21 in FIG. 28) is necessary to secure the guard period. FIG. 28 illustrates and example where only the DwPTS is used at the time of switching from a special subframe (subframe #21) to a UL subframe of the MeNB (subframe #22), and the UpPTS is used for the guard period.

This arrangement increases the number of subframes that can be used with the mobile station 200, and throughput can be improved. Specifically, the number of subframes that cannot be used with the mobile station 200 (Non-use subframe) is reduced in FIG. 28 as compared with FIG. 23.

Operation Example 2

In the following description, switching processing of the base station communicating with the mobile station 200, between the base station 100 (MeNB) and the base station 300 (SeNB), is performed in a single frame unit (10 msec), in the same way as operation example 1.

In each of the UL-DL configurations, the timing at which the base station communicating with the mobile station 200 is switched is, out of the switching timings from a UL subframe to a DL subframe (special subframe), the timing of which the DL subframe No. is the smallest. Accordingly, the timing for switching between the base station 100 (MeNB) and base station 300 (SeNB) differs for each UL-DL configuration.

On the other hand, the DL subframe immediately after switching at the timing of switching base stations is set as a guard period in operation example 2, to secure a guard period at the timing of having switched from a UL subframe to a DL subframe. Hereinafter, a DL subframe set as a guard period will be referred to as a "guard subframe".

That is to say, the base station switching timings of the UL-DL configurations in operation example 2 are the same as those of the operation example 1 (FIGS. 20 and 22 through 27). Operation example 2 differs from operation example 1 with regard to the point that the DL subframe immediately after switching becomes a guard subframe that cannot be used. Switching operations between the base station 100 (MeNB) and base station 300 (SeNB) in the UL-DL configurations (Config#0 through Config#6) in operation example 2 will be described in detail with reference to FIGS. 29 through 35.

Figure 29:
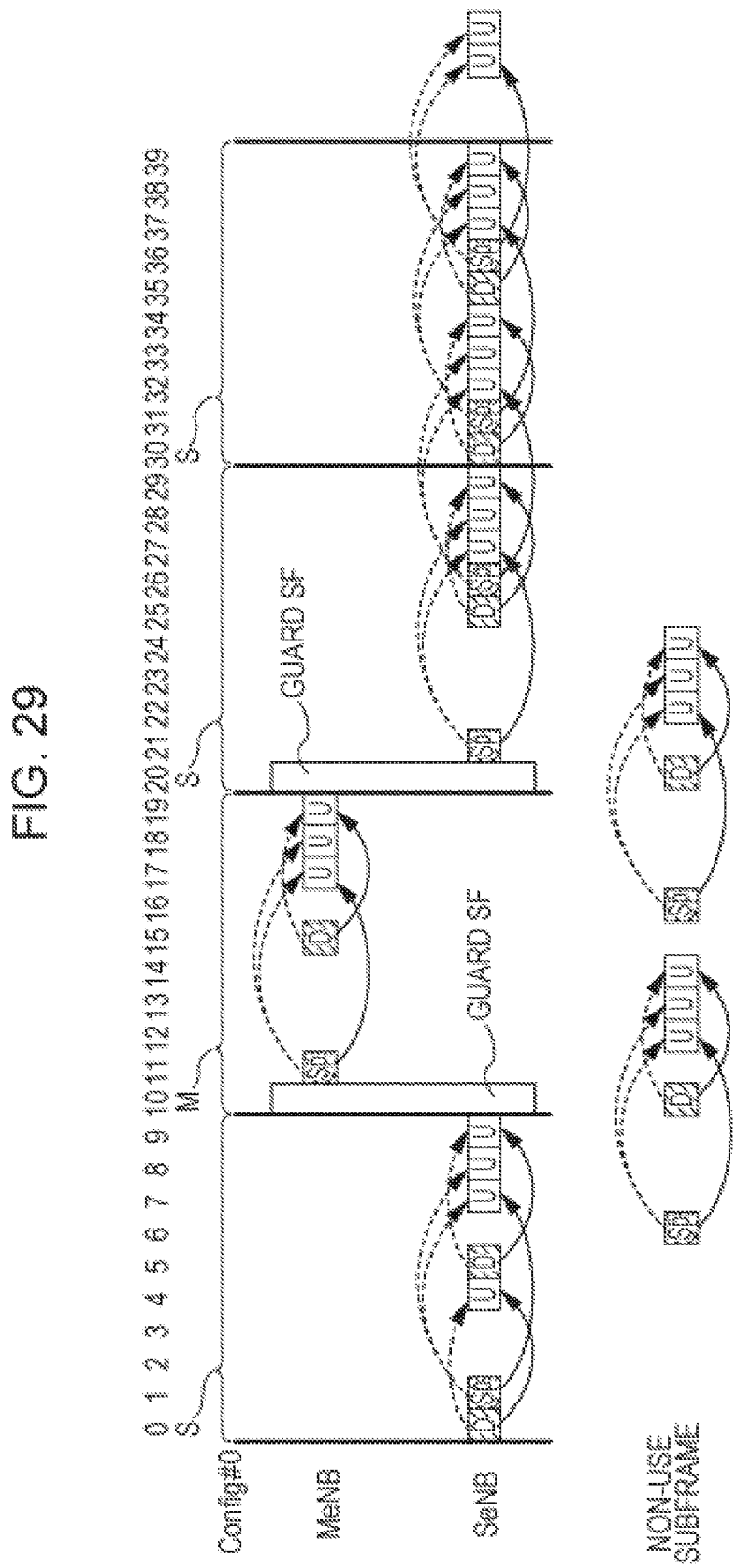
FIG. 29 is a diagram illustrating a resource allocation example for Config#0 according to the second embodiment of the present disclosure (operation example 2)

Config#0 (FIG. 29)

The timing of switching the base station 100 (MeNB) and base station 300 (SeNB) is subframe #(10$n$) (subframes #10 and #20 in FIG. 29). Accordingly, the subframes #10 and #20 illustrated in FIG. 29 are set as guard subframes, and are not assigned to the mobile station 200.

Due to the subframe #(10$n$) not being assigned, subframe #(10$n$+4) is not used with the mobile station 200, either. The reason is that the subframe #(10$n$+4) is correlated with the subframe #(10$n$) by UL grant-PUSCH timing and DL assignment(PDSCH)-HARQ ACK timing. The combination of subframe #(10$n$) and subframe #(10$n$+4) is equivalent to, of the DL/Sp/UL sets illustrated in FIG. 6, Set 1. That is to say, out of the DL/Sp/UL sets illustrated in FIG. 6, Set 1 is a subframe not used with the mobile station 200 (Non-use subframe) in operation example 2, in addition to Set 4 in the same way as operation example 1.

Figure 30:
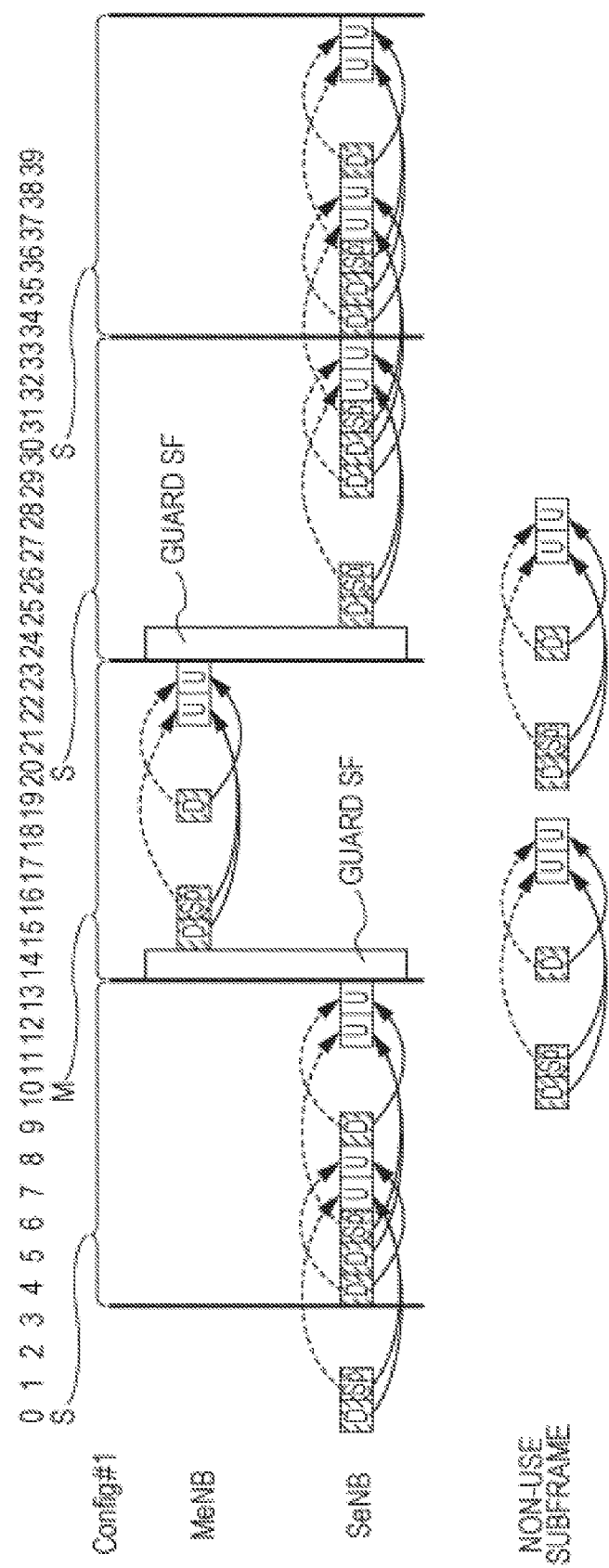
FIG. 30 is a diagram illustrating a resource allocation example for Config#1 according to the second embodiment of the present disclosure (operation example 2)

Config#1 (FIG. 30)

The timing of switching the base station 100 (MeNB) and base station 300 (SeNB) is subframe #(10$n$+4) (subframes #14 and #24 in FIG. 30). Accordingly, the subframes #14 and #24 illustrated in FIG. 30 are set as guard subframes, and are not assigned to the mobile station 200.

Due to the subframe #(10$n$+4) not being assigned, subframe #(10$n$+8) is not used with the mobile station 200, either. The reason is that the subframe #(10$n$+8) is correlated with the subframe #(10$n$+4) by UL grant-PUSCH timing and DL assignment(PDSCH)-HARQ ACK timing. The combination of subframe #(10$n$+4) and subframe #(10$n$+8) is equivalent to, of the DL/Sp/UL sets illustrated in FIG. 7, Set 2. That is to say, out of the DL/Sp/UL sets illustrated in FIG. 7, Set 2 is a subframe not used with the mobile station 200 (Non-use subframe) in operation example 2, in addition to Set 1 in the same way as operation example 1.

Figure 31:
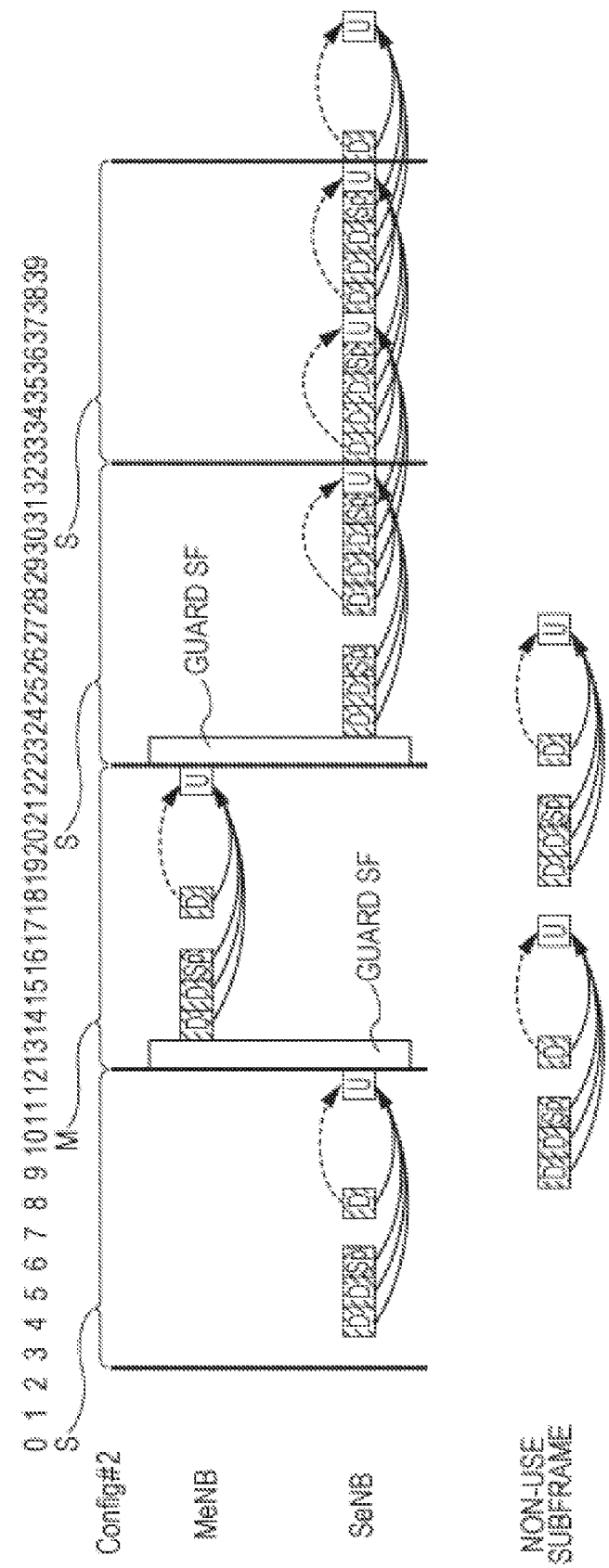
FIG. 31 is a diagram illustrating a resource allocation example for Config#2 according to the second embodiment of the present disclosure (operation example 2)

Config#2 (FIG. 31)

The timing of switching the base station 100 (MeNB) and base station 300 (SeNB) is subframe #(10$n$+3) (subframes #13 and #23 in FIG. 31). Accordingly, the subframes #13 and #23 illustrated in FIG. 31 are set as guard subframes, and are not assigned to the mobile station 200.

Due to the subframe #(10$n$+3) not being assigned, subframe #(10$n$+7) is not used with the mobile station 200, either. The reason is that the subframe #(10$n$+7) is correlated with the subframe #(10$n$+3) by UL grant-PUSCH timing and DL assignment(PDSCH)-HARQ ACK timing. The combination of subframe #(10$n$+3) and subframe #(10$n$+7) is equivalent to, of the DL/Sp/UL sets illustrated in FIG. 8, part of Set 2. More specifically, this is the remaining subframes from the subframes in Set 2 not used with the mobile station 200 in operation example 1 (FIG. 23). That is to say, out of the DL/Sp/UL sets illustrated in FIG. 8, in addition to the part of Set 2 the same as with operation example 1, the remaining subframes of Set 2 are not used with the mobile station 200 either. In other words, none of the subframes included in Set 2 are used with the mobile station 200 in operation example 2.

Figure 32:
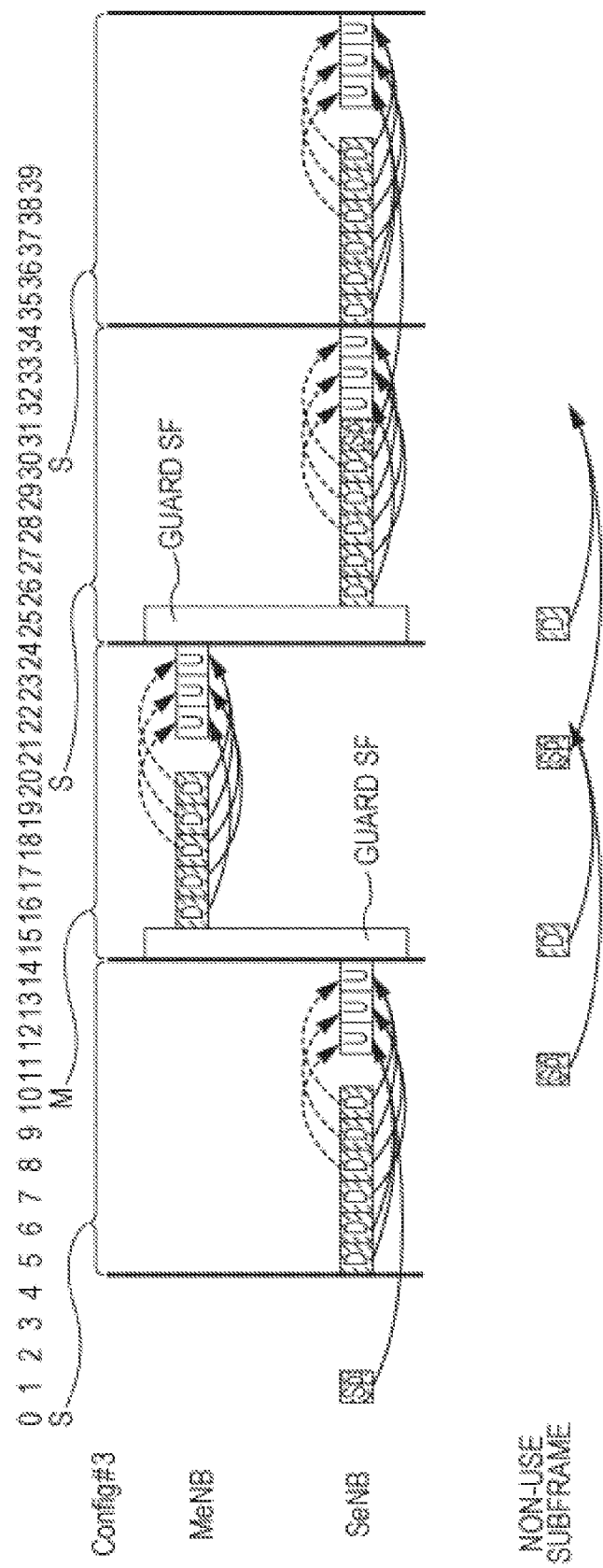
FIG. 32 is a diagram illustrating a resource allocation example for Config#3 according to the second embodiment of the present disclosure (operation example 2)

Config#3 (FIG. 32)

The timing of switching the base station 100 (MeNB) and base station 300 (SeNB) is subframe #(10$n$+5) (subframes #15 and #25 in FIG. 32). Accordingly, the subframes #15 and #25 illustrated in FIG. 32 are set as guard subframes, and are not assigned to the mobile station 200.

Now, the UL subframe #(10$n$+12) correlated with the DL subframe #(10$n$+5) by the DL assignment(PDSCH)-HARQ ACK timing is also correlated with the DL subframe #(10n+6) later than the base station switching timing. Accordingly, the DL subframe #(10n+5) (subframes #15 and #25 in FIG. 32) are not used with the mobile station 200, but the UL subframe #(10n+12) (subframes #22 and #32 in FIG. 32) are used. That is to say, in addition to the subframe #(10n+1) in the same way as operation example 1, the subframe #(10n+5) also is a subframe not used with the mobile station 200 in operation example 2.

Figure 33:
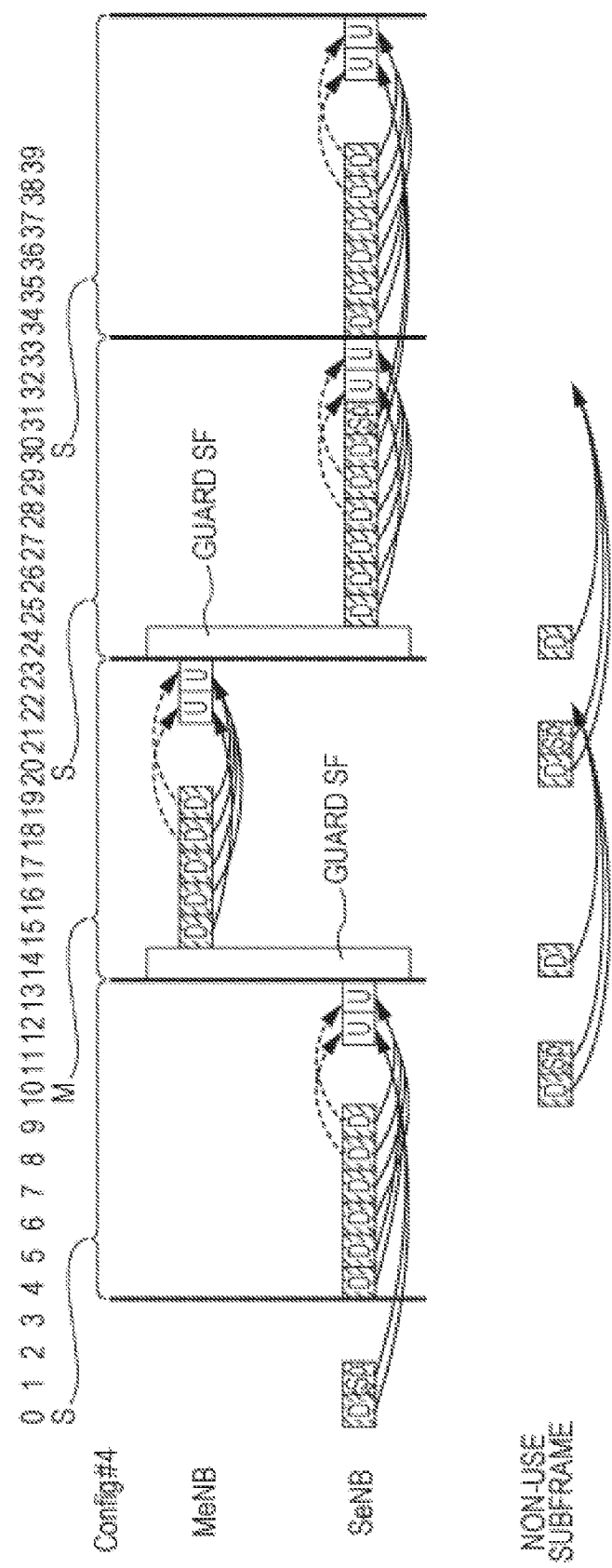
FIG. 33 is a diagram illustrating a resource allocation example for Config#4 according to the second embodiment of the present disclosure (operation example 2)

Config#4 (FIG. 33)

The timing of switching the base station 100 (MeNB) and base station 300 (SeNB) is subframe #(10n+4) (subframes #14 and #24 in FIG. 33). Accordingly, the subframes #14 and #24 illustrated in FIG. 33 are set as guard subframes, and are not assigned to the mobile station 200.

Now, the UL subframe #(10n+12) correlated with the DL subframe #(10n+4) by the DL assignment(PDSCH)-HARQ ACK timing is also correlated with the DL subframe #(10n+5) later than the base station switching timing. Accordingly, the DL subframe #(10n+4) (subframes #14 and #24 in FIG. 33) are not used with the mobile station 200, but the UL subframe #(10n+12) (subframes #22 and #32 in FIG. 33) are used. That is to say, in addition to the subframes #(10n) and #(10n+1) in the same way as operation example 1, the subframe #(10n+4) also is a subframe not used with the mobile station 200 in operation example 2.

Figure 34:
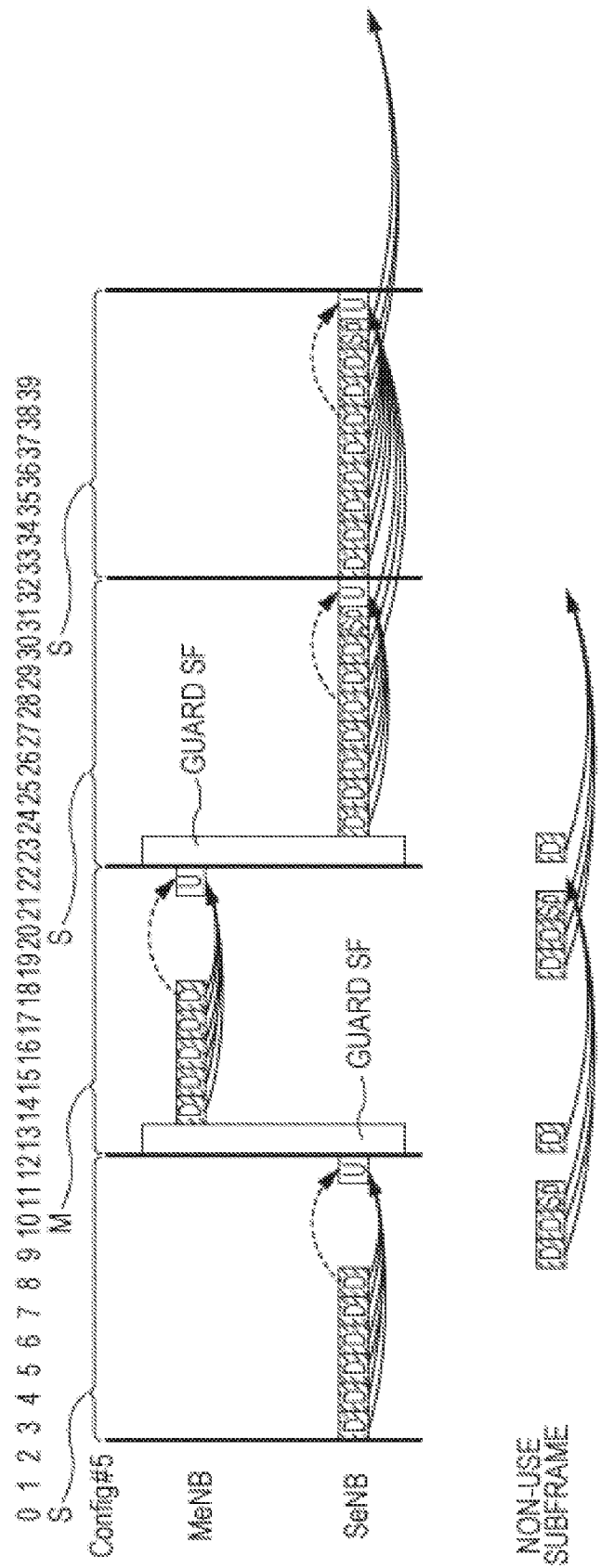
FIG. 34 is a diagram illustrating a resource allocation example for Config#5 according to the second embodiment of the present disclosure (operation example 2)

Config#5 (FIG. 34)

The timing of switching the base station 100 (MeNB) and base station 300 (SeNB) is subframe #(10n+3) (subframes #13 and #23 in FIG. 34). Accordingly, the subframes #13 and #23 illustrated in FIG. 34 are set as guard subframes, and are not assigned to the mobile station 200.

Now, the UL subframe #(10n+12) correlated with the DL subframe #(10n+3) by the DL assignment(PDSCH)-HARQ ACK timing is also correlated with the DL subframes #(10n+4) through #(10n+8) later than the base station switching timing. Accordingly, the DL subframe #(10n+3) (subframes #13 and #23 in FIG. 34) are not used with the mobile station 200, but the UL subframe #(10n+12) (subframes #22 and #32 in FIG. 34) are used. That is to say, in addition to the subframes #(10n+9), #(10n+10), and #(10n+11) in the same way as operation example 1, the subframe #(10n+13) also is a subframe not used with the mobile station 200 in operation example 2.

Figure 35:
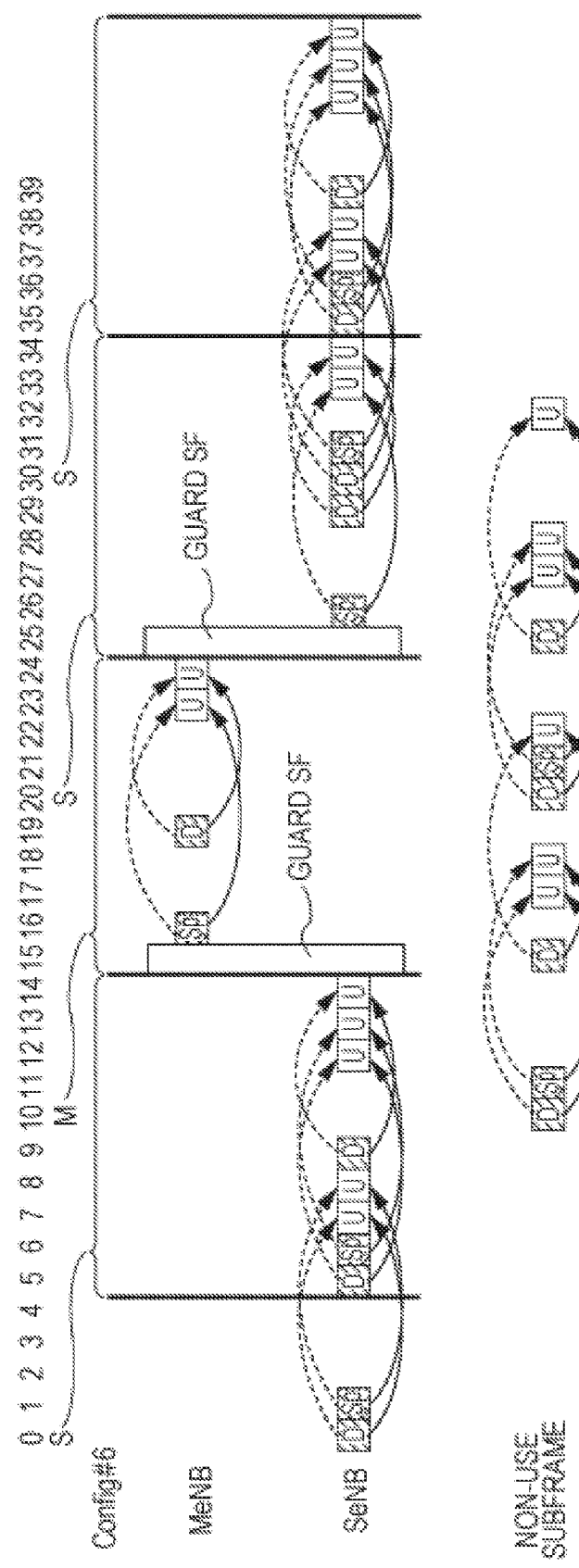
FIG. 35 is a diagram illustrating a resource allocation example for Config#6 according to the second embodiment of the present disclosure (operation example 2)

Config#6 (FIG. 35)

The timing of switching the base station 100 (MeNB) and base station 300 (SeNB) is subframe #(10n+5) (subframes #15 and #25 in FIG. 35). Accordingly, the subframes #15 and #25 illustrated in FIG. 35 are set as guard subframes, and are not assigned to the mobile station 200.

Due to the subframe #(10n+5) not being assigned, subframe #(10n+12) is not used with the mobile station 200, either. The reason is that the subframe #(10n+12) is correlated with the subframe #(10n+5) by UL grant-PUSCH timing and DL assignment(PDSCH)-HARQ ACK timing. The combination of subframe #(10n+5) and subframe #(10n+12) is equivalent to, of the DL/Sp/UL sets illustrated in FIG. 12, Set 3. That is to say, out of the DL/Sp/UL sets illustrated in FIG. 12, in addition to Sets 1 and 2 the same as with operation example 1, the subframes of Set 3 are not used with the mobile station 200 either.

The above has been a description of switching between the base station 100 (MeNB) and base station 300 (SeNB) in the UL-DL configurations (Config#0 through Config#6) according to operation example 2. As described above, the base station communicating with the mobile station 200 is switched in a frame unit (10 msec unit or 10 subframe unit).

Accordingly, the number of bits necessary for subframe assignment instruction (i.e., eNB assignment information) can be reduced in comparison with the first embodiment (switching in a subframe unit).

Also, of the subframes at the timing of switching base stations, subframes after switching are set as guard subframes in operation example 2, so a period for the guard period at the time of switching base stations can be sufficiently secured. Accordingly, the propagation latency between the base stations 100 and 300 and the mobile station 200 is particularly short in operation example 2. This is effective in a case where a guard period cannot be secured at the time of switching from a UL subframe to a DL subframe.

The probability that a UL subframe correlated with a DL subframe set as a guard subframe will not be usable is higher in operation example 2. However, there is no need for the base stations 100 and 300 and the mobile station 200 to determine whether a subframe is usable or not at the time of switching base stations. Accordingly, the processing at the base stations 100 and 300 and mobile station 200 can be simplified as compared with the first embodiment. Specifically, instruction of unusable subframes from the TA information generators 102 and 302 and the TA information receiver 206 to the signal assigners 105, 209, and 305 and the signal separators 108, 202, and 308 is unnecessary at the base stations 100 and 300 (FIG. 4) and the mobile station 200 (FIG. 5). It is sufficient for the signal assigners 105, 209, and 305 and the signal separators 108, 202, and 308 to determine that the subframe at the time of switching base stations (guard subframe) is always unusable.

Operation example 1 and operation example 2 according to the second embodiment have been described so far.

Variation 1 of Second Embodiment

In the above embodiment, signals other than signals assigned according to the UL grant-PUSCH timing and DL assignment(PDSCH)-HARQ ACK timing may be assigned to subframes not used with the mobile station 200. For example, of the subframes not used with the mobile station 200 (Non-use subframes), UL resources of UL subframes not related to the UL grant-PUSCH timing may be used for other purposes. Examples of such other uses include the following. One example is a PUSCH where UL resources can be assigned beforehand by semi-persistent scheduling (SPS). Another example is Sounding Reference Signal (SRS) where UL resources are periodically allocated by the upper layer. Besides these examples, another example is signals that can be transmitted even without assignment information (grant) having been notified. Alternatively, subframes not used with the mobile station 200 may be used for Channel Quality Indicator (CQI) reports. Moreover, the UpPTS of special subframes may be used for random-access channel (RACH) transmission.

Also, of the subframes not used with the mobile station 200 (Non-use subframes), the DL resources of DL subframes unrelated to the DL assignment(PDSCH)-HARQ ACK timing may be used for other purposes. Examples of such other uses include the following. One example is notification information such as Master Information Block (MIB), System Information Block (SIB), and so forth. Another example is synchronization signals such as Primary Synchronization Signal (PSS)/Secondary Synchronization Signal (SSS), and so forth. Another example is measurement signals such as cell-specific reference signals (CRS) and so forth. Besides these examples, another example is signals that do not need an ACK/NACK. Accordingly, UL resource and DL resources not used with the mobile station 200 can be effectively used.

Variation 2 of Second Embodiment

In a case where there are three or more consecutive subframes not used with the mobile station 200 (Non-use subframes) in the above-described operation example 1 and operation example 2, these unused subframes may be used as follows. Of the three or more consecutive subframes, the subframes on both ends may be used for base station switching processing (i.e., as guard subframes). Further, of the three or more consecutive subframes, subframes other than the subframes on both ends may be used for data assignment to the mobile station 200.

At this time, the DL assignment(PDSCH)-HARQ ACK timing is referenced, and usable DL subframes are assigned to the base station to which the UL subframe by which the ACK/NACK is transmitted belongs. Accordingly, a subframe before the timing of switching base stations is assigned to the base station to be switched to, so the mobile station 200 performs operations to tentatively switch the base station at the subframe before the subframe at the timing of switching base stations.

Figure 36:
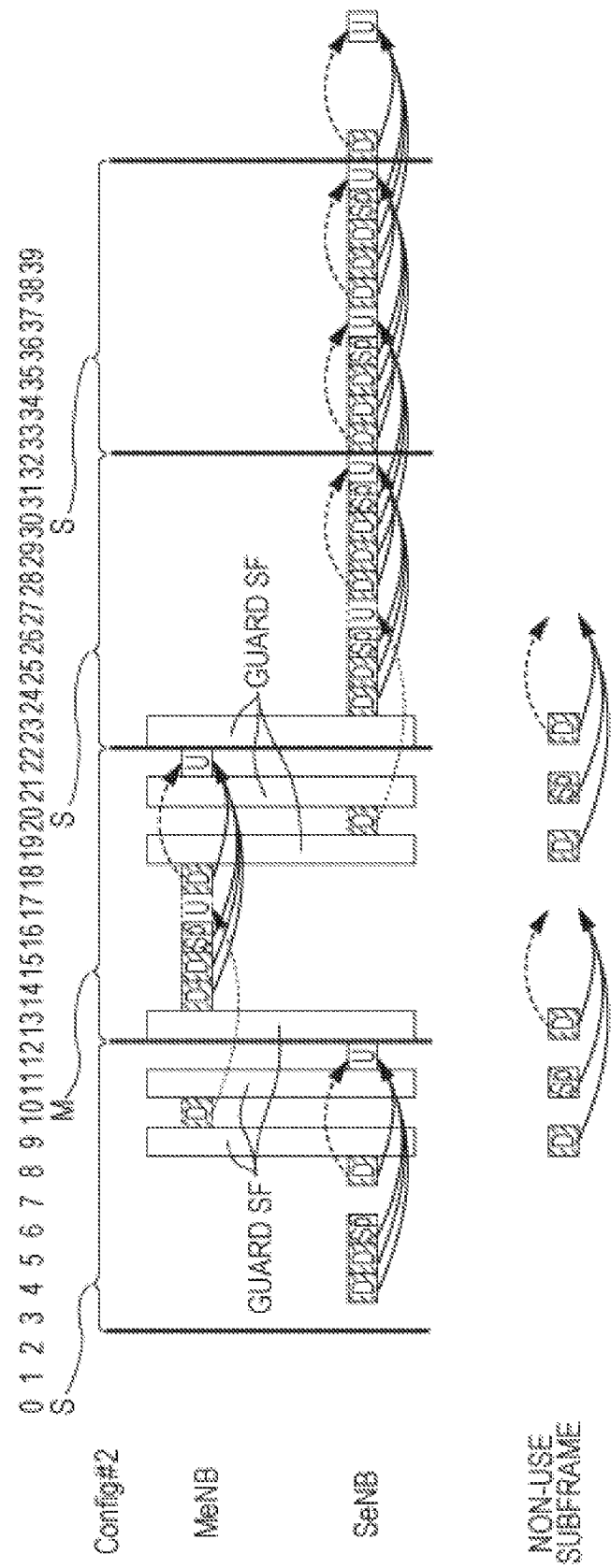
FIG. 36 is a diagram illustrating another resource allocation example according to the second embodiment of the present disclosure.

FIG. 36 illustrates operations according to Variation 2 in a case of Config#2, as an example. In operation example 2, the consecutive subframes #9, #10, and #11, and #19, #20, and #21, in Config#2 (see FIG. 31) are the subframes which cannot be used. Accordingly, the subframes #9 and #11, and #19 and #21, on the ends, are used as guard subframes in FIG. 36, so the intermediate subframes #10 and #20 are usable.

Also, the subframe regarding which an ACK/NACK is transmitted as to the PDSCH transmitted in subframe #10 is subframe #17, and the subframe regarding which an ACK/NACK is transmitted as to the PDSCH transmitted in subframe #20 is subframe #27. Accordingly, the DL subframes #10 and #20 are assigned to the same base station to which the UL subframes #17 and #27 belong. Thus, the number of subframes that can be used with the mobile station 200 increases, and throughput can be improved.

Embodiments of the present disclosure have been described so far.

Other Embodiments

Although an example where the present disclosure is carried out as a hardware configuration has been described in the above embodiments, the present disclosure can be realized by software in cooperation with hardware.

The functional blocks used in description of the above embodiments are typically realized as a large scale integration (LSI). These may each be independently formed as a single chip, or part or all may be included in a single chip. While an LSI has been mentioned, there are different names according to the degree of integration, such as an integrated circuit (IC), system LSI, super LSI, and ultra LSI.

The way in which the integrated circuit is formed is not restricted to LSIs, and may be realized by dedicated circuits or general-purpose processors. A field programmable gate array (FPGA) capable of being programmed after manufacturing the LSI, or a reconfigurable processor of which the connections and settings of circuit cells within the LSI can be reconfigured, may be used.

Moreover, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

A base station device according to the present disclosure includes: an assigner that sets, in a subframe assigned based on assignment information indicating assignment of a plurality of subframes included in a configuration pattern set to a mobile station device that communicates with a plurality of base station devices, a signal to be transmitted to the mobile station device, the configuration pattern being one of a plurality of configuration patterns for a frame made up of a plurality of subframes including a downlink subframe and an uplink subframe; and a separator that receives signals from the mobile station device, and separates a signal addressed to its own device from the received signals, based on assignment information. In each of the plurality of configuration patterns is set a first correlation correlating a downlink subframe by which uplink assignment information is transmitted, with an uplink subframe by which an uplink signal assigned by the uplink assignment information is transmitted, and a second correlation correlating a downlink subframe by which downlink assignment information and a downlink signal assigned by the downlink assignment information are transmitted, with an uplink subframe by which an acknowledgement signal corresponding to the downlink signal is transmitted. Each of the plurality of configuration patterns includes a plurality of sets made up of subframes correlated by the first correlation and the second correlation, the plurality of subframes being assigned to each of the plurality of base station devices in a set unit.

The base station device according to the present disclosure further includes a determiner. In an arrangement where switching processing of a base station device with which the mobile station device communicates is performed in a subframe unit and the plurality of base station devices includes a first base station device and a second base station device, the determiner determines, based on a first timing advance (TA) between the first base station device and the mobile station device, a second TA between the second base station device and the mobile station device, and a switching timing between a subframe assigned to the first base station device and a subframe assigned to the second base station device, whether or not to reduce symbols within a subframe immediately before or immediately after the switching timing, to set a time required at the mobile station device for switching processing of base station devices.

In the base station device according to the present disclosure, in a case where the switching processing is to be performed at a timing of switching from an uplink subframe to a downlink subframe, if time required for the switching processing is no more than a value that is half the total value of the first TA and the second TA, the determiner determines that symbols within a subframe immediately before or immediately after the switching timing are not to be reduced, and if time required for the switching processing is more than the value that is half the total value, the determiner determines that symbols within a subframe immediately before or immediately after the switching timing are to be reduced.

In the base station device according to the present disclosure, in a case where the switching processing is to be performed at a timing of switching from an uplink subframe to an uplink subframe, and also, if the TA of a base station device to which an uplink subframe before switching has been assigned is longer than the TA of another base station device to which an uplink subframe after switching has been assigned in the first TA and the second TA, if time required for the switching processing is no more than a value that is half the difference between the first TA and the second TA, the determiner determines that symbols within a subframe immediately before or immediately after the switching timing are not to be reduced, and if time required for the switching processing is more than the value that is half the difference, the determiner determines that symbols within a subframe immediately before or immediately after the switching timing are to be reduced.

In the base station device according to the present disclosure, in a case where the switching processing is to be performed at a timing of switching from a downlink subframe to a downlink subframe, and also, if the TA of a base station to which a downlink subframe before switching has been assigned is shorter than the TA of another base station device to which a downlink subframe after switching has been assigned in the first TA and the second TA, if time required for the switching processing is no more than a value that is half the difference between the first TA and the second TA, the determiner determines that symbols within a subframe immediately before or immediately after the switching timing are not to be reduced, and if time required for the switching processing is more than the value that is half the difference, the determiner determines that symbols within a subframe immediately before or immediately after the switching timing are to be reduced.

In the base station device according to the present disclosure, switching processing of a base station with which the mobile station device communicates is performed in one-frame unit. In each of the plurality of configuration patterns, the timing of the switching processing is at the timing of a frame including a subframe of which a subframe No. is the smallest, out of timings of switching from an uplink subframe to a downlink subframe.

In the base station device according to the present disclosure, in a case where a downlink subframe and an uplink subframe, included in one set out of a plurality of sets including in a configuration pattern set to the mobile station device, span a frame immediately before the switching timing and a frame immediately after the switching timing, the downlink subframe is not used with the mobile station device. In a case where another downlink subframe exists, that has been correlated with the uplink subframe by the first correlation or the second correlation, and set after the switching timing, the uplink subframe is used with the mobile station device, and in a case where the other downlink subframe does not exist, the uplink subframe is not used with the mobile station device.

In the base station device according to the present disclosure, the downlink subframe immediately after switching at the timing of switching processing is set as time required for the switching processing.

In the base station device according to the present disclosure, a signal is assigned to the downlink subframe or uplink subframe not used with the mobile station device other than a signal assigned according to the first correlation and the second correlation.

In the base station device according to the present disclosure, in a case that there are there or more consecutive subframes in the downlink subframes or the uplink subframes not used with the mobile station device, subframes at both ends of the three or more subframes are used for the switching processing, and subframes of the three or more subframes other than the subframes at both ends are used for data assignment with the mobile station device.

A mobile station device according to the present disclosure includes: a separator that receives signals from a plurality of base station devices, and separates, from the received signals, signals transmitted from each of the plurality of base station devices, based on assignment information indicating assignment of a plurality of subframes included in a configuration pattern set to its own device, the configuration pattern being one of a plurality of configuration patterns for a frame made up of a plurality of subframes including a downlink subframe and an uplink subframe; and an assigner that assigns signals to be transmitted to each of the plurality of base station devices, based on the assignment information. In each of the plurality of configuration patterns is set a first correlation correlating a downlink subframe by which uplink assignment information is transmitted, with an uplink subframe by which an uplink signal assigned by the uplink assignment information is transmitted, and a second correlation correlating a downlink subframe by which downlink assignment information and a downlink signal assigned by the downlink assignment information are transmitted, with an uplink subframe by which an acknowledgement signal corresponding to the downlink signal is transmitted. Each of the plurality of configuration patterns includes a plurality of sets made up of subframes correlated by the first correlation and the second correlation, the plurality of subframes being assigned to each of the plurality of base station devices in a set.

A communication method according to the present disclosure includes: setting, in a subframe assigned based on assignment information indicating assignment of a plurality of subframes included in a configuration pattern set to a mobile station device that communicates with a plurality of base station devices, a signal to be transmitted to the mobile station device, the configuration pattern being one of a plurality of configuration patterns for a frame made up of a plurality of subframes including a downlink subframe and an uplink subframe; and receiving signals from the mobile station device, and separating a signal addressed to an own device from the received signals, based on assignment information. In each of the plurality of configuration patterns is set a first correlation correlating a downlink subframe by which uplink assignment information is transmitted, with an uplink subframe by which an uplink signal assigned by the uplink assignment information is transmitted, and a second correlation correlating a downlink subframe by which downlink assignment information and a downlink signal assigned by the downlink assignment information are transmitted, with an uplink subframe by which an acknowledgement signal corresponding to the downlink signal is transmitted. Each of the plurality of configuration patterns includes a plurality of sets made up of subframes correlated by the first correlation and the second correlation, the plurality of subframes being assigned to each of the plurality of base station devices in a set unit.

A communication method according to the present disclosure includes: receiving signals from a plurality of base station devices, and separating signals transmitted from each of the plural of base station devices, based on assignment information indicating assignment of a plurality of subframes included in a configuration pattern set to an own device, the configuration pattern being one of a plurality of configuration patterns for a frame made up of a plurality of subframes including a downlink subframe and an uplink subframe; and assigning signals to be transmitted to each of the plurality of base station devices, based on the assignment information. In each of the plurality of configuration patterns is set a first correlation correlating a downlink subframe by which uplink assignment information is transmitted, with an uplink subframe by which an uplink signal assigned by the uplink assignment information is transmitted, and a second correlation correlating a downlink subframe by which downlink assignment information and a downlink signal assigned by the downlink assignment information are transmitted, with an uplink subframe by which an acknowledgement signal corresponding to the downlink signal is transmitted. Each of the plurality of configuration patterns includes a plurality of sets made up of subframes correlated by the first correlation and the second correlation, the plurality of subframes being assigned to each of the plurality of base station devices in a set unit.

The present disclosure is useful in application to mobile communication systems and the like.

What is claimed is:

1. A base station device comprising:
control circuitry which, in operation, generates subframe assignment information that indicates one or more sets of subframes, each set including a first pair of a UL (uplink) grant downlink subframe and a corresponding PUSCH (physical uplink shared channel) uplink subframe and a second pair of a DL (downlink) assignment downlink subframe and a corresponding ACK/NACK (acknowledgment/negative acknowledgment) uplink subframe, wherein the one or more sets of subframes are included in two or three consecutive frames in each of a plurality of configuration patterns, each configuration pattern defining transmission timings of at least one uplink subframe, at least one downlink subframe, and at least one special subframe within a frame;
mapping circuitry which, in operation, maps the UL grant downlink subframe and the DL assignment downlink subframe according to the subframe assignment information;
a transmitter which, in operation, transmits the subframe assignment information, the UL grant downlink subframe, and the DL assignment downlink subframe to a mobile station device; and
a receiver which, in operation, receives the PUSCH uplink subframe and the ACK/NACK uplink subframe according to the subframe assignment information.

2. The base station device according to claim 1, which is used with a second base station device to support dual connectivity of the mobile terminal device and configured to
determine whether or not to reduce symbols within a subframe immediately before or immediately after a switching timing of a switching processing in which communication with the mobile terminal device switches between the base station device and the second base station device based on:
a first timing advance (TA) between the base station device and the mobile station device;
a second TA between the second base station device and the mobile station device; and
the switching timing between the base station device and the second base station device.

3. The base station device according to claim 2, wherein at the switching timing of switching from an uplink subframe to a downlink subframe,
the symbols within the subframe immediately before or immediately after the switching timing are not reduced if time required for the switching processing is equal to or less than a value that is half the total value of the first TA and the second TA, and
the symbols within the subframe are reduced if the time required for the switching processing is larger than the value that is half the total value.

4. The base station device according to claim 2, wherein at the switching timing of switching from an uplink subframe to an uplink subframe, if the TA of one of the base station devices to which an uplink subframe before the switching timing is assigned is longer than the TA of the other of the base station devices to which an uplink subframe after the switching timing is assigned,
the symbols within the subframe immediately before or immediately after the switching timing are not reduced if time required for the switching processing is equal to or smaller than a value that is half the difference between the first TA and the second TA, and
the symbols within the subframe are reduced if the time required for the switching processing is larger than the value that is half the difference.

5. The base station device according to claim 2, wherein at the switching timing of switching from a downlink subframe to a downlink subframe, if the TA of one of the base station devices to which a downlink subframe before the switching timing is assigned is shorter than the TA of the other of the base station devices to which a downlink subframe after the switching timing is assigned,
the symbols within the subframe immediately before or immediately after the switching timing are not reduced if time required for the switching processing is equal to or smaller than a value that is half the difference between the first TA and the second TA, and
the symbols within the subframe are reduced if the time required for the switching processing is larger than the value that is half the difference.

6. The base station device according to claim 1, wherein a switching processing of the mobile station device between the base station device and a second base station device is performed in a frame, and
in each of the plurality of configuration patterns, the timing of the switching processing is at a frame that includes a subframe whose subframe number is the smallest, among timings of switching from an uplink subframe to a downlink subframe.

7. The base station device according to claim 6, wherein in a case where a downlink subframe and an uplink subframe, included in one of the one or more sets that are included in a configuration pattern, span across a frame immediately before the switching timing and a frame immediately after the switching timing, the downlink subframe is not used for the mobile station device,
in a case where another downlink subframe exists, which is correlated with the uplink subframe and is mapped after the switching timing, the uplink subframe is used for the mobile station device, and
in a case where the other downlink subframe does not exist, the uplink subframe is not used for the mobile station device.

8. The base station device according to claim 7, wherein when three or more consecutive subframes are not used for the mobile station device, subframes at both ends among the three or more consecutive subframes are used for the switching processing.

9. The base station device according to claim 6, wherein the downlink subframe immediately after the timing of the switching processing is set as time required for the switching processing.

10. A mobile station device comprising:
a receiver which, in operation, receives, from a base station device, subframe assignment information that indicates one or more sets of subframes, each set including a first pair of a UL (uplink) grant downlink subframe and a corresponding PUSCH (physical uplink shared channel) uplink subframe and a second pair of a DL (downlink) assignment downlink subframe and a corresponding ACK/NACK (acknowledgment/negative acknowledgment) uplink subframe, wherein the one or more sets of subframes are included in two or three consecutive frames in each of a plurality of configuration patterns, each configuration pattern defining transmission timings of at least one uplink subframe, at least one downlink subframe, and at least one special subframe within a frame;
wherein the receiver, in operation, receives the UL grant downlink subframe and the DL assignment downlink subframe according to the subframe assignment information; and
a transmitter which, in operation, transmits the PUSCH uplink subframe and the ACK/NACK uplink subframe according to the subframe assignment information.

11. A communication method comprising:
generating subframe assignment information that indicates one or more sets of subframes, each set including a first pair of a UL (uplink) grant downlink subframe and a corresponding PUSCH (physical uplink shared channel) uplink subframe and a second pair of a DL (downlink) assignment downlink subframe and a corresponding ACK/NACK (acknowledgment/negative acknowledgment) uplink subframe, wherein the one or more sets of subframes are included in two or three consecutive frames in each of a plurality of configuration patterns, each configuration pattern defining transmission timings of at least one uplink subframe, at least one downlink subframe, and at least one special subframe within a frame;
mapping the UL grant downlink subframe and the DL assignment downlink subframe according to the subframe assignment information;
transmitting the subframe assignment information, the UL grant downlink subframe, and the DL assignment downlink subframe to a mobile station device; and
receiving the PUSCH uplink subframe and the ACK/NACK uplink subframe according to the subframe assignment information.

12. A communication method comprising:
receiving, from a base station device, subframe assignment information that indicates one or more sets of subframes, each set including a first pair of a UL (uplink) grant downlink subframe and a corresponding PUSCH (physical uplink shared channel) uplink subframe and a second pair of a IL (downlink) assignment downlink subframe and a corresponding ACK/NACK (acknowledgment-negative acknowledgment) uplink subframe, wherein the one or more sets of subframes are included in two or three consecutive frames in each of a plurality of configuration patterns, each configuration pattern defining transmission timings of at least one uplink subframe, at least one downlink subframe, and at least one special subframe within a frame;
receiving the UL grant downlink subframe and the DL assignment downlink subframe according to the subframe assignment information; and
transmitting the PUSCH uplink subframe and the ACK/NACK uplink subframe according to the subframe assignment information.

* * * * *